(12) United States Patent
Sugihara et al.

(10) Patent No.: US 12,105,869 B2
(45) Date of Patent: Oct. 1, 2024

(54) INFORMATION PROCESSING APPARATUS AND INFORMATION PROCESSING METHOD

(71) Applicant: SONY CORPORATION, Tokyo (JP)

(72) Inventors: Kenji Sugihara, Tokyo (JP); Mari Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 385 days.

(21) Appl. No.: 17/250,621

(22) PCT Filed: Aug. 7, 2019

(86) PCT No.: PCT/JP2019/031136
§ 371 (c)(1),
(2) Date: Feb. 11, 2021

(87) PCT Pub. No.: WO2020/039933
PCT Pub. Date: Feb. 27, 2020

(65) Prior Publication Data
US 2021/0165484 A1   Jun. 3, 2021

(30) Foreign Application Priority Data

Aug. 24, 2018   (JP) ................. 2018-157423

(51) Int. Cl.
G06F 3/01    (2006.01)
H04N 13/268  (2018.01)
H04N 13/00   (2018.01)

(52) U.S. Cl.
CPC .............. *G06F 3/013* (2013.01); *G06F 3/017* (2013.01); *H04N 13/268* (2018.05); *H04N 2013/0081* (2013.01)

(58) Field of Classification Search
None
See application file for complete search history.

(56) References Cited

U.S. PATENT DOCUMENTS

2012/0257035 A1   10/2012  Larsen
2016/0018885 A1*  1/2016   Kimura .................. G06F 3/013
                                                    345/156
2016/0098093 A1*  4/2016   Cheon ............. H04N 21/41265
                                                    345/156

FOREIGN PATENT DOCUMENTS

CN    102749990 A    10/2012
CN    105009034 A    10/2015
(Continued)

OTHER PUBLICATIONS

International Search Report and Written Opinion of PCT Application No. PCT/JP2019/031136, issued on Oct. 8, 2019, 11 pages of ISRWO.

*Primary Examiner* — Parul H Gupta
(74) *Attorney, Agent, or Firm* — CHIP LAW GROUP

(57) ABSTRACT

An information processing device according to an embodiment of the present technology includes a movement-information acquisition unit, a gaze-information acquisition unit, and a display control unit. The movement-information acquisition unit acquires movement information about a gesture by a user. The gaze-information acquisition unit acquires information about a gazing point of the user. The display control unit controls a display device on the basis of the movement information. The display control unit causes the display device to display a first virtual object including information relating to a target object in a first region related to the target object, and to vary, on the basis of a position of the gazing point in duration for which the user is making the gesture, how the first virtual object is displayed.

18 Claims, 21 Drawing Sheets

(56) References Cited

FOREIGN PATENT DOCUMENTS

| | | |
|---|---|---|
| CN | 105487652 A | 4/2016 |
| EP | 2523069 A2 | 11/2012 |
| EP | 3002949 A1 | 4/2016 |
| JP | 2012-221498 A | 11/2012 |
| JP | 2014-174747 A | 9/2014 |
| JP | 2018-077876 A | 5/2018 |
| KR | 10-2016-0039499 A | 4/2016 |
| WO | 2014/136373 A1 | 9/2014 |

* cited by examiner

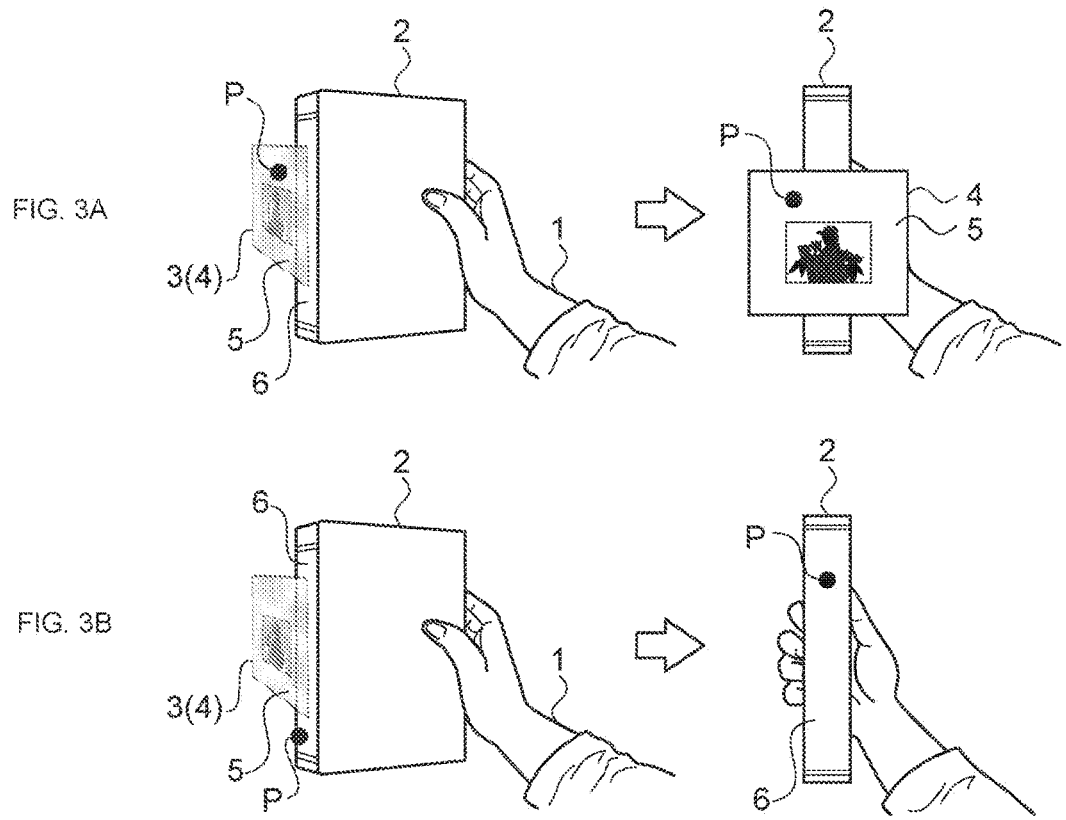
FIG. 3A
FIG. 3B
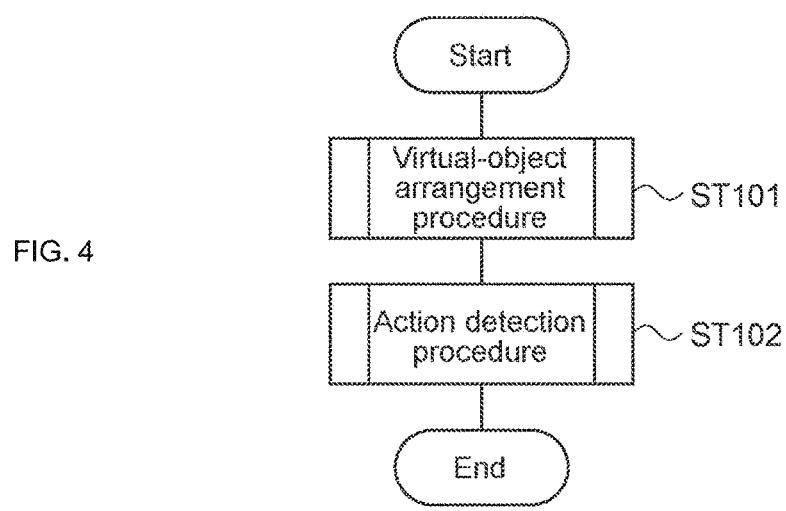
FIG. 4

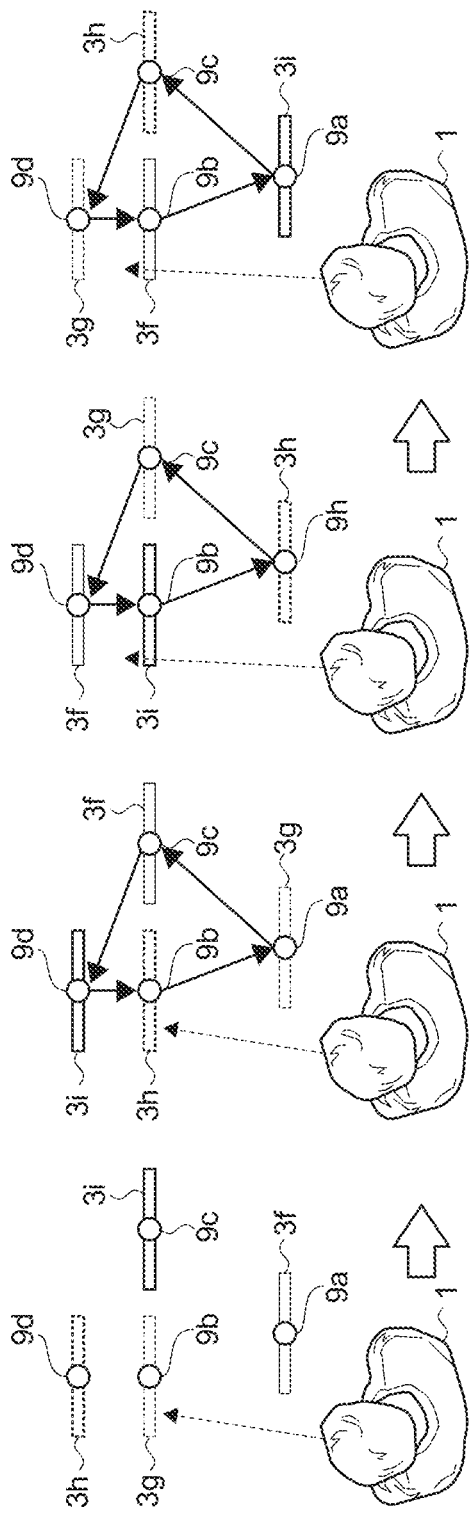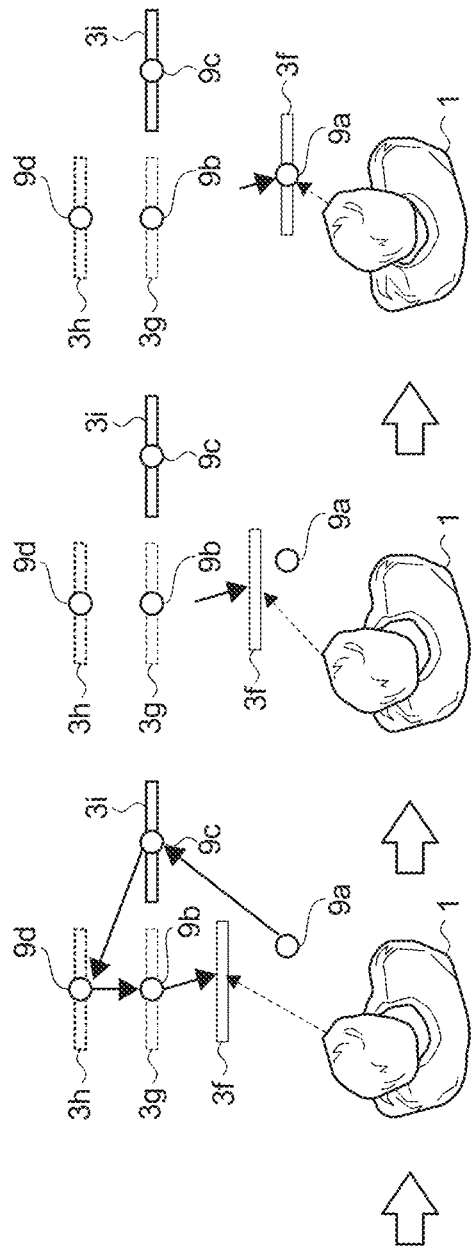

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/031136 filed on Aug. 7, 2019, which claims priority benefit of Japanese Patent Application No. JP 2018-157423 filed in the Japan Patent Office on Aug. 24, 2018. Each of the above-referenced applications is hereby incorporated herein by reference in its entirety.

TECHNICAL FIELD

The present technology relates to an information processing device, an information processing method, and a program that are applicable to display control of information.

BACKGROUND ART

Hitherto, technologies for displaying virtual objects have been developed. For example, by displaying the virtual objects with use of display devices such as an HMD (Head Mount Display) and the like, various information can be presented to a user.

For example, Patent Literature 1 discloses an HMD that displays a virtual operation object on its display screen. The HMD disclosed in Patent Literature 1 recognizes shapes and positions of hands of the user so as to control, for example, a display position of the operation object (UI panel) on the display screen. Specifically, if an operator makes a hand shape, for example, to hold the UI panel with his/her thumb and index finger, the UI panel is displayed at a position between the thumb and the index finger in a real space. This enables the operator to correctly select, for example, a desired one of icons displayed on the UI panel (refer mainly to paragraphs [0017], [0020], [0037], and [0038] of the specification of Patent Literature 1, and FIG. 2 and FIG. 6 of the same).

CITATION LIST

Patent Literature

Patent Literature 1: Japanese Patent Application Laid-open No. 2018-77876

DISCLOSURE OF INVENTION

Technical Problem

It is conceivable that, in the future, the technologies for presenting the various information with use of the virtual objects are used in various scenes such as amusement, education, and shopping. There have been demands for technologies for naturally presenting information in which the user is interested.

In view of such circumstances, the present technology has been made to achieve an object to provide an information processing device, an information processing method, and a program that are capable of naturally presenting information in which the user is interested.

Solution to Problem

In order to achieve the above-mentioned object, according to an embodiment of the present technology, there is provided an information processing device including a movement-information acquisition unit, a gaze-information acquisition unit, and a display control unit.

The movement-information acquisition unit acquires movement information about a gesture by a user.

The gaze-information acquisition unit acquires information about a gazing point of the user.

The display control unit controls a display device on the basis of the movement information.

The display control unit causes the display device
   to display a first virtual object including information relating to a target object in a first region related to the target object, and
   to vary, on the basis of a position of the gazing point in duration for which the user is making the gesture, how the first virtual object is displayed.

In this information processing device, the movement information about the gesture by the user, and the information about the gazing point of the user are acquired, and the display device is controlled on the basis of the movement information. On the display device, the first virtual object including the information relating to the target object is displayed in the first display region related to the target object. How the first virtual object is displayed is controlled to vary on the basis of the position of the gazing point of the user making the gesture. By varying how the first virtual object is displayed in accordance with the gazing point of the user in such a way, information in which the user is interested can be naturally presented.

According to another embodiment of the present technology, there is provided an information processing method that is performed by a computer system, the information processing method including:
   acquiring movement information about a gesture by a user;
   acquiring information about a gazing point of the user; and
   controlling a display device on the basis of the movement information,
   the display device being controlled so that a first virtual object including information relating to a target object is displayed in a first region related to the target object,
   the display device being controlled so that how the first virtual object is displayed is varied on the basis of a position of the gazing point in duration for which the user is making the gesture.

According to a still another embodiment of the present technology, there is provided a program for causing a computer system to perform the steps of:
   acquiring movement information about a gesture by a user;
   acquiring information about a gazing point of the user;
   controlling a display device on the basis of the movement information;
   controlling the display device so that a first virtual object including information relating to a target object is displayed in a first region related to the target object; and
   controlling the display device so that how the first virtual object is displayed is varied on the basis of a position of the gazing point in duration for which the user is making the gesture.

Advantageous Effects of Invention

As described above, according to the present technology, information in which the user is interested can be naturally

BRIEF DESCRIPTION OF DRAWINGS

FIGS. 3A and 3B Explanatory schematic views of an outline of display control in the HMD.

FIG. 4 A flowchart showing an example of the display control in the HMD.

FIGS. 33A, 33B, 33C, 33D, 33E, 33F, and 33G Schematic view illustrating a yet another example of how the looking-in UI is displayed.

MODE(S) FOR CARRYING OUT THE INVENTION

Hereinbelow, embodiments according to the present technology are described with reference to the drawings.

First Embodiment

[Configuration of HMD]

Figure 1:
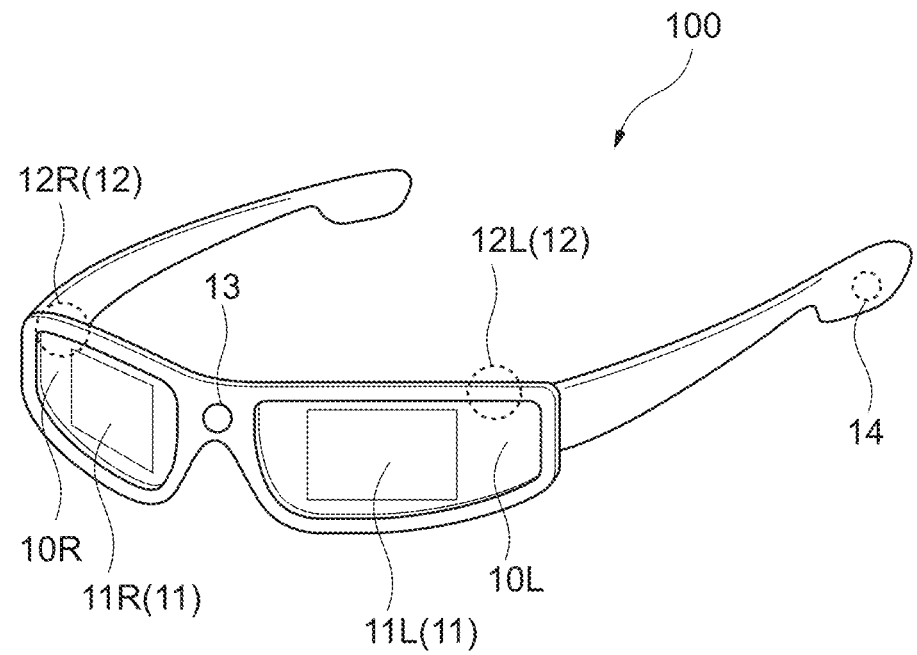
FIG. 1 A schematic view of an external appearance of an HMD according to a first embodiment of the present technology.
Figure 2:
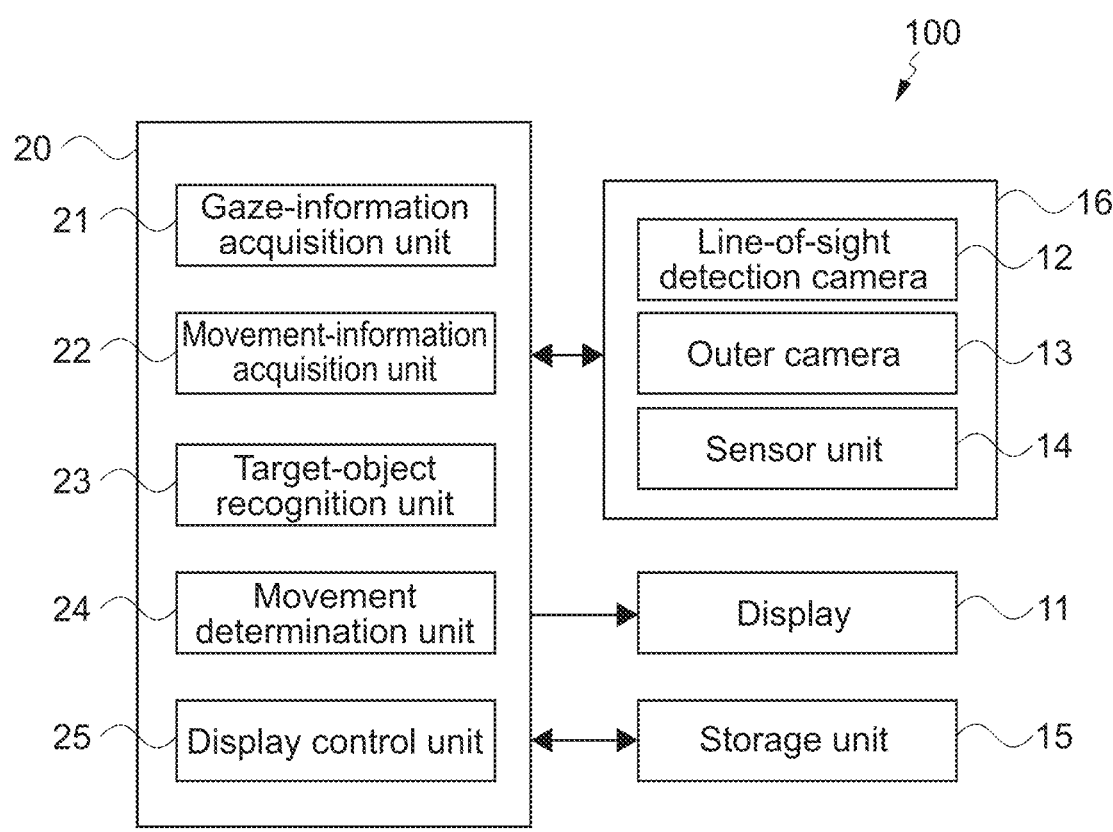
FIG. 2 A block diagram showing a configuration example of the HMD illustrated in FIG. 1

FIG. 1 is a schematic view of an external appearance of an HMD according to a first embodiment of the present technology. FIG. 2 is a block diagram showing a configuration example of the HMD illustrated in FIG. 1. This HMD 200 illustrated in FIG. 1 is an eyeglass-type device that includes a transmissive display and that is put on the head of a user in use.

The HMD 100 includes a left lens 10L, a right lens 10R, a left-eye display 11L, a right-eye display 11R, a left-eye camera 12L, a right-eye camera 12R, an outer camera 13, and a sensor unit 14. In addition, the HMD 100 includes a storage unit 15 and a controller 20. Note that, in FIG. 1, none of the storage unit 15 and the controller 20 is illustrated.

The left lens 10L and the right lens 10R are arranged respectively in front of the left eye and the right eye of the user. The left-eye display 11L and the right-eye display 11R are provided respectively in the left lens 10L and the right lens 10R in a manner that a field of view of the user is covered.

The left-eye display 11L and the right-eye display 11R are each the transmissive display, and respectively display, for example, an image for the left eye and an image for the right eye. The user who wears the HMD 100 can visually recognize a real scene, and at the same time, can visually recognize the images to be displayed respectively on the displays. This enables the user to experience, for example, presence of augmented reality (AR).

Note that, on an outside of the left-eye display 11L and the right-eye display 11R (side opposite to a side where the eyes of the user are present), dimming elements (not shown) and the like may be provided. The dimming elements are elements capable of adjusting an intensity of light that transmits through the elements themselves. By providing the dimming element, for example, the real scene to be visually recognized through both the displays by the user can be regulated. With this, the images to be displayed on both the displays and visually recognized by the user can be highlighted. In this way, the user can experience virtual reality (VR) and the like.

As the left-eye display 11L and the right-eye display 11R, for example, transmissive OLED displays, LCD (Liquid Crystal Displays, liquid crystal display elements) displays, or the like are used. In addition, as the dimming elements, for example, dimming glass, dimming sheets, liquid crystal shutters, and the like that are capable of electrically controlling transmittance are used. The left-eye display 11L and the right-eye display 11R of this embodiment correspond to a display device. Hereinbelow, the left-eye display 11L and the right-eye display 11R may be collectively referred to as a display 11.

The left-eye camera 12L and the right-eye camera 12R are provided at arbitrary positions where the left eye and the right eye of the user can be captured. For example, on the basis of images of the left eye and the right eye, which are taken by the left-eye camera 12L and the right-eye camera 12R, line-of-sight information indicating a gazing point P is acquired. The gazing point P is described in detail below.

As the left-eye camera 12L and the right-eye camera 12R, for example, digital cameras including image sensors such as CMOS (Complementary Metal-Oxide Semiconductor) sensors or CCD (Charge Coupled Device) sensors are used. Alternatively, for example, infrared cameras equipped with infrared light sources such as infrared LEDs may be used. Hereinbelow, the left-eye camera 12L and the right-eye camera 12R may be collectively referred to as a line-of-sight detection camera 12.

The outer camera 13, which is arranged toward the side opposite to the side where the eyes of the user are present, takes images in a real space in the field of view of the user. As the outer camera 13, for example, the digital camera including the image sensor such as the CMOS (Complementary Metal-Oxide Semiconductor) sensor or the CCD (Charge Coupled Device) sensor is used. Note that, as the outer camera 13, for example, cameras capable of detecting, for example, depth information of the real space, specifically, a stereo camera and a camera that includes, for example, a TOF (Time of Flight) sensor may be used.

The sensor unit 14 is a unit arranged at a predetermined position in the HMD 100 and including various built-in sensors. The sensor unit 14 includes, for example, an acceleration sensor, a gyroscopic sensor, a geomagnetic sensor (nine-axis sensor), a GPS sensor, and the like. For example, an IMU (inertial measurement unit) or the like serves as the sensor unit 14.

The sensor unit 14 detect, for example, movements and postures (such as running, walking, and stopping) by the user wearing the HMD 100, a position of the user, and the like. In addition, the sensor unit 14 detects, as the movements by the user, for example, movements and postures of the head of the user (such as a turn and a tilt in an upper-and-lower direction or a right-and-left direction). Alternatively, the sensor unit 14 may include sensors capable of acquiring biological information of the user, such as a heart-rate sensor, a perspiration sensor, a temperature (body-temperature) sensor, and a brain-wave sensor.

As shown in FIG. 2, in this embodiment, a sensor section 16 includes the line-of-sight detection camera 12 (left-eye camera 12L and right-eye camera 12R), the outer camera 13, and the sensor unit 14. Output from the various sensors included in the sensor section 16 is input to the controller 20.

The storage unit 15 is a non-volatile storage device such as an HDD (Hard Disk Drive), an SSD (Solid State Drive), a flash memory, or other solid-state memories. The storage unit 15 stores a control program for controlling an operation of an entirety of the HMD 100, an application program for performing the information processing method according to the present technology, and various data. A method of installing the application programs and the like into the HMD 100 is not limited. For example, the installation may be performed by arbitrary methods via various recording media, networks, and the like.

The controller 20 controls respective operations of blocks in the HMD 100. The controller 20 has a hardware configuration necessary for a computer, such as a CPU, memories (a RAM and a ROM), and the like. In executing various processes, the CPU loads the control program stored in the storage unit 15 into the RAM. The controller 20 of this embodiment corresponds to an information processing device.

As the controller 20, there may be used, for example, PLDs (Programmable Logic Devices) such as an FPGA (Field Programmable Gate Array), or other devices such as an ASIC (Application Specific Integrated Circuit). Alternatively, for example, processors such as a GPU (Graphics Processing Unit) may be used as the controller 20.

Note that, the controller 20 and the storage unit 15 may be provided separately from a body of the HMD 100. For example, in order to control the HMD 100, the body of the HMD 100, the controller 20, and the like may communicate with each other via, for example, a communication unit (not shown). There is no limitation, for example, on a scheme of the communication, and arbitrary communication schemes such as a LAN, WiFi, and Bluetooth (trademark) may be used.

In this embodiment, the CPU of the controller 20 executes a program according to this embodiment. With this, a gaze-information acquisition unit 21, a movement-information acquisition unit 22, a target-object recognition unit 23, a movement determination unit 24, and a display control unit 25 serve as functional blocks. In addition, these functional blocks perform the information processing method according to this embodiment. Note that, in order that the units respectively serve as the functional blocks, dedicated hardware such as an IC (Integrated Circuit) may be used as appropriate.

The gaze-information acquisition unit 21 acquires information about the gazing point P of the user. The information about the gazing point P of the user (hereinafter, abbreviated as gaze information) is, for example, information that enables detection and estimation of the gazing point P of the user. Typically, the gaze information is information about a line-of-sight direction of the user. As a matter of course, the gaze information is not limited to the information about the line-of-sight direction. For example, other information such as that about an orientation of the HMD 100, that is, an orientation of the head of the user, may be acquired as the gaze information. Alternatively, information about the gazing point P itself of the user may be acquired as the gaze information.

In addition, the gaze-information acquisition unit 21 detects the gazing point P of the user on the basis of the gaze information. The gazing point P of the user is detected, for example, as position coordinates in a predetermined coordinate system to be used in the HMD 100 (controller 20). In other words, detecting the gazing point P of the user corresponds to detecting a position of the gazing point P in the predetermined coordinate system.

For example, the images of the left eyeball and the right eyeball of the user are taken by the line-of-sight detection camera 12, and are input as the gaze information. On the basis of the images of the eyeballs, the line-of-sight direction of the user is calculated. From this line-of-sight direction, the gazing point P of the user is detected. For example, in a configuration including the infrared camera (line-of-sight detection camera 12) and the infrared light source, images of the eyeballs reflecting infrared light emitted from the infrared light sources (bright spots) are taken. In this case, the line-of-sight direction is estimated from the bright spots of the infrared light and positions of pupils. In this way, the gazing point P is detected. Alternatively, for example, a method of estimating the line-of-sight direction and the gazing point P relative to feature points such as eye corners on the basis of the images of the eyeballs may be employed.

Still alternatively, for example, the gazing point P of the user may be detected on the basis of eye potential. Generally, in the eyeballs of humans, a corneal (pupil) side is positively charged, and a retinal side opposite thereto is negatively charged. By providing, for example, predetermined potential sensors (not shown) to the HMD 100, potential variation in response to movements of the eyeballs can be detected. On the basis of information about this potential variation (gazing-point information), the line-of-sight direction and the gazing point P of the user are detected.

Yet alternatively, for example, the gazing point P of the user may be detected on the basis of the orientation of the head of the user. In this case, information about the orientation (posture) of the head (HMD 100) of the user is detected by the sensor unit 14, and is used as the gazing-point information. There is no limitation, for example, on a method of detecting the gazing point P of the user, and, for example, arbitrary algorithms that enable the detection of the gazing point P may be used. Yet alternatively, the gazing point P may be detected by using machine learning such as deep learning. Yet alternatively, the gazing point P may be detected by combining the above-described methods with each other, or the gazing point P may be detected by switching the above-described methods to each other as appropriate.

The movement-information acquisition unit 22 acquires movement information about gestures by the user. Herein, the gestures by the user refer to the movements by the user. Specifically, examples of the gestures by the user include ones using his/her hand (hand gestures), specifically, include movements by the user of, for example, reaching for an object, touching the object, grabbing the object, lifting the object, tilting the object, turning the object, putting the object, and releasing the object.

In addition, the examples of the gestures by the user include other ones using the head (head gestures), specifically, include other movements by the user of, for example, tilting his/her head to the right and left, tilting the head forward and backward, and turning the head (neck). In addition, the examples of the gestures by the user include still other movements of, for example, moving the line of sight (gazing point), opening/closing eyelids, and blinking. There is no limitation, for example, on the movements that are included as the examples of the gestures by the user. The examples of the gestures by the user also include yet other movements such as crouching, sitting, and standing, and the movements such as walking, running, and stopping.

The movement information about the gestures by the user is, for example, information that enables recognition of the gestures (movements) by the user. Specifically, a video or the like of the hand of the user is taken by the outer camera 13, and is used as movement information about the hand gestures by the user. In addition, specifically, the information about the movement (such as variation in posture) of the head (HMD 100) of the user is detected by the sensor unit 14, and is used as movement information about the head gestures.

The movement-information acquisition unit 22 executes processes of recognizing the gestures by the user on the basis of the acquired movement information. For example, the hand of the user is detected from information of the video (information of the images) taken by the outer camera 13.

On the basis of results of the detection, a process of recognizing movements of the hand of the user, that is, the hand gestures, is executed. Specifically, regions of fingers, a palm, and the like of the user are detected from their colors, contours, shapes, and the like, and the movements of the hand are detected on the basis of an angle, an arrangement, and the like of each of the fingers. Alternatively, for example, recognition processes using machine learning and the like may be executed.

In addition, for example, a process of recognizing the head gestures and the like from the movements of the head of the user, which are detected by the sensor unit 14, is executed. Specifically, movements by the user of, for example, tilting the head and looking down (looking downward), turning or tiling the head to the right or left, and the like are recognized. Note that, by using the sensor unit 14, movements in varying a position and the posture of the head by moving an entirety of the upper body also can be detected. Such variation in position and posture of the head in conjunction with the movements of the upper body may be recognized as the head gestures.

In addition, the gestures by the user may be recognized by recognizing the object being a target for the movements by the user (object recognition). For example, if the user grabs the target object, the target object varies in position or posture in conjunction with the movement of the hand of the user. Thus, from the variation in position or posture of the target object, movements by the user of, for example, turning or moving the hand can be recognized. In this case, information about the position, the posture, and the like of the target object is the movement information. Note that, the information about the position, the posture, and the like of the target object is acquired by the target-object recognition unit 23.

The target-object recognition unit 23 executes processes of recognizing the target object. The target object is, for example, a real object arranged in the real space. The real object is an object that the user wearing the HMD 100 can actually touch. For example, an item displayed in a store or the like is the target object. Alternatively, arbitrary real objects in the real space may be used as the target objects.

As described below, in the HMD 100, how objects are displayed are controlled relative to the target object. Thus, the target object is also an object to be a target for processes such as a control process in the HMD 100.

The target-object recognition unit 23 executes the processes of recognizing the target object on the basis of, for example, the images taken by the outer camera 13. Specifically, information for recognizing the real object to be the target object (recognition information) is stored, for example, in the storage unit 15. In the recognition process, on the basis of the recognition information, presence/absence of an object to be the target object is detected from the images taken by the outer camera 13. In addition, if the target object is present, a position, a posture, and the like of the target object are detected.

As the recognition information, for example, information about amounts of characteristics such as an external appearance, a shape, a surface pattern, and the like of the real object is stored. With this, the target object can be easily recognized by using image processing technologies such as pattern matching. Further, by adding a recognition marker or the like to the real object to be the target in advance, for example, accuracy of the recognition process can be increased, and a processing time period of the same can be shortened.

Still further, as the recognition information, information about positions such as an arrangement position of the real object (specifically, display position in the store) may be stored. With this, for example, the real object can be recognized when the user approaches this real object. As a result, for example, efficiency and the like of the recognition process can be increased. In addition, there is no limitation, for example, on a specific method of recognizing the target object.

Note that, the target object may be a virtual object. Specifically, the virtual object or the like arranged in a virtual space to be displayed on the displays of the HMD 100 may be used as the target object. The target object is described in detail below.

The movement determination unit 24 executes processes of determining the gesture by the user, which is recognized by the movement-information acquisition unit 22. In these determination process, for example, it is determined to which of the various movements of, for example, tilting the object, turning the object, and putting the object the gesture by the user corresponds. In other words, the determination processes are also processes of determining a type of the gesture by the user.

For example, from the movements of the hand of the user (such as opening/closing the fingers and turning a wrist), which are recognized by the movement-information acquisition unit 22, or from results of the recognition of the target object, it is determined that the hand gesture has been made. Alternatively, from the movement of the head of the user (specifically, an angle, a direction, and the like in tilting or turning the head), it is determined that the head gesture has been made. In addition, there is no limitation, for example, on a specific method of the determination process.

The display control unit 25 controls the display 11 on the basis of the movement information. More specifically, the display control unit 25 controls, on the basis of the movement information, how the virtual object such as various content is displayed on the display 11. Examples of the control of how the virtual object is displayed include arbitrary control for displaying the virtual object, such as control of a shape, a position, an external appearance, a movement, and the like of the virtual object, and control of switching, selection, turning ON/OFF, and the like of how the virtual object is displayed.

Herein, the control of the display 11 encompasses control of states of the images (virtual objects) to be displayed on the display 11. Thus, for example, generating image data by controlling shapes and the like of images to be display targets, and causing the display 11 to display this image data are encompassed in the control of the display 11. Hereinbelow, the control of the images to be displayed on the display 11 may be abbreviated as control of the display 11.

[Display Control in HMD]

FIGS. 3A and 3B are explanatory schematic views of an outline of the display control in the HMD 100. FIG. 3A is a schematic view illustrating an example of the display control. and FIG. 3B is a schematic view illustrating another example of the display control. In the examples schematically illustrated in A of FIGS. 3A and B, a virtual object is displayed at a time when a user 1 picks up a book being a target object 2.

For example, if the target object 2 is present in a field of view of the user 1 (imaging range of the outer camera 13), the target-object recognition unit 23 recognizes the target object 2. When the target object 2 is recognized, a virtual object 3 including information relating to the target object 2 is displayed on the display 11. Hereinbelow, the virtual object 3 including the information relating to the target object 2 is referred to as a related virtual object 4. The related virtual object 4 of this embodiment corresponds to a first virtual object.

The related virtual object 4 is, for example, the virtual object 3 for displaying additional information about the target object 2. Specifically, as illustrated in FIGS. 3A and B, if the target object 2 is a book, reviews of the book, an article about an author of the book, a promotional video movie, or the like is displayed as the related virtual object 4. There is no limitation, for example, on types of the information to be the related virtual object 4. Specifically, for example, arbitrary additional information about the target object 2 may be used as the related virtual object 4.

A position or a posture of the related virtual object 4, that is, how the related virtual object 4 is displayed on the display 11 is set on the basis of, for example, the results of the processes of recognizing the target object 2. Specifically, the display control unit 25 causes the display 11 to display the related virtual object 4 in a display region 5 related to the target object 2 in accordance with a position or a posture of the target object 2.

On the left in FIG. 3A, a state in which the user 1 has picked up the book and directed a front surface (such as a front cover) of the book toward the user 1 is illustrated. In this state, the related virtual object 4 is displayed, for example, near a lateral surface of the book being the target object 2 (near a spine of the book in the illustration). In this case, the vicinity of the lateral surface of the book is the display region 5.

Note that, if the user 1 moves the book to the right and left, the display position of the related virtual object 4 moves to the right and left in conjunction with these movements. Alternatively, also if the field of view of the user 1 moves to vary the position of the book and how the book looks (its posture) in the field of view of the user 1 (on display 11), the display position and the posture of the related virtual object 4 vary in conjunction with this movement. In other words, the related virtual object 4 is displayed to be localized in the predetermined display region 5 related to the target object 2 (book).

Note that, as illustrated on the left in FIG. 3A, the related virtual object 4 is obliquely displayed near the lateral surface of the book in accordance with the position and the posture of the book being the target object 2. A state in which the related virtual object 4 is obliquely displayed in such a way is, for example, a state in which it is difficult to visually recognize an entirety of the related virtual object 4 in detail. In other words, on the left in FIG. 3A, the related virtual object 4 is displayed intentionally under a state in which it is difficult to view the related virtual object 4.

In such a way, the display control unit 25 causes the display 11 to display the related virtual object 4 including the information relating to the target object 2 in the display region 5 related to the target object 2. Note that, the position where the display region 5 is set is not limited to that in the above-described example. The display region 5 is described in detail below. The display region 5 of this embodiment corresponds to a first region.

If the user 1 has been interested in content of the related virtual object 4, the user 1 is highly likely to look at the related virtual object 4. For example, on the left in FIG. 3A, the gazing point P (solid circle in the illustration) of the user 1 is detected on the related virtual object 4. In other words, the user 1 looks at the related virtual object 4 (display region 5). This state is also a state in which, for example, the user 1 is highly likely to have been interested in the content of the related virtual object 4.

In addition, under the state in which the related virtual object 4 is obliquely displayed near the lateral surface of the target object 2, the user 1 is likely to make a movement for visually recognizing the related virtual object 4, such as the movement of turning the target object 2 (hand gesture of turning the object). In other words, in order to view information localized to the lateral surface, a movement of, for example, turning an object itself being a target for the localization is likely to be made.

For example, on the right in FIG. 3A, the book is turned such that the lateral surface side (spine side) of the book is directed to the user 1. If the gazing point P of the user 1 remains on the related virtual object 4 while the hand gesture of turning this book is being made, as illustrated on the right in FIG. 3A, the related virtual object 4 is displayed toward the front of the user with the related virtual object 4 overlapping with the lateral surface of the book. This enables the user 1 to check the content of the related virtual object 4.

In addition, as illustrated on the left in FIG. 3B, if the gazing point P of the user 1 is detected on a position overlapping with the lateral surface (spine) under the state in which the related virtual object 4 is obliquely displayed near the lateral surface of the target object 2, the user 1 is highly likely to have been interested, for example, in content and the like printed on the lateral surface of the book.

For example, on the right in FIG. 3B, the book is turned such that the lateral surface side of the book is directed to the user 1. If the gazing point P of the user 1 remains on the lateral surface of the book while the hand gesture of turning this book is being made, as illustrated on the right in FIG. 3B, the related virtual object 4 is not displayed such that the user can check the content and the like printed on the lateral surface of the book.

In such a way, on the basis of the positions of the gazing point P in the duration for which the user 1 is making a gesture, the display control unit 25 varies how the related virtual object 4 is displayed. With this, information displayed at a position that the user 1 looks at, that is, information in which the user 1 is interested can be naturally presented. From another viewpoint, the interest of the user 1 is estimated from the gazing point P of the user 1 or the information about his/her gesture, whereby appropriate information can be displayed or hidden.

In addition, as described with reference to the left in FIG. 3A, at the time point when the user 1 picks up the target object 2, the related virtual object 4 is obliquely displayed on the lateral surface side. By displaying, in such a way, the related virtual object 4 in the region related to the target object 2 (display region 5) under the state in which it is difficult to view the related virtual object 4, the gesture of, for example, turning the target object 2 can be induced.

By inducing such gestures, interest targets for the user can be distinguished from each other. Specifically, in the examples illustrated in FIGS. 3A and 3B, it is determined whether the target object 2 has been turned, and, if the target object 2 has been turned, by recognizing what is looked at during the turning, it is determined whether the user has been interested in the target object 2 itself in his/her hand, or interested in the content (related virtual object 4). On the basis of this determination, for example, whether the content is displayed or hidden is controlled. Thus, information in which the user 1 is interested can be presented with high accuracy.

FIG. 4 is a flowchart showing an example of the display control in the HMD 100. A procedure shown in FIG. 4 is a loop process to be repeatedly executed under a state in which the HMD 100 has been activated. This loop process is, for example, started/ended simultaneously with activation/deactivation of the HMD 100. Alternatively, this loop process may be executed if a mode or the like of controlling how the related virtual object 4 and the like are displayed is selected.

First, a procedure of arranging the related virtual object 4 (virtual-object arrangement procedure) is executed (Step 101). The arrangement of the related virtual object 4 is, for example, a process of setting the position, the posture, and the like of the related virtual object 4 to be displayed.

After the related virtual object 4 has been arranged, a process of detecting the gestures by the user 1 (action detection procedure) is executed (Step 102). Specifically, the action detection procedure is a procedure of controlling, by detecting the gesture or the like induced by displaying the related virtual object 4, how the related virtual object 4 is displayed.

For example, under the state in which the controller (HMD 100) has been activated (active mode), the virtual-object arrangement procedure and the action detection procedure are repeated in a predetermined cycle. Hereinbelow, the virtual-object arrangement procedure and the action detection procedure are specifically described.

Figure 5:
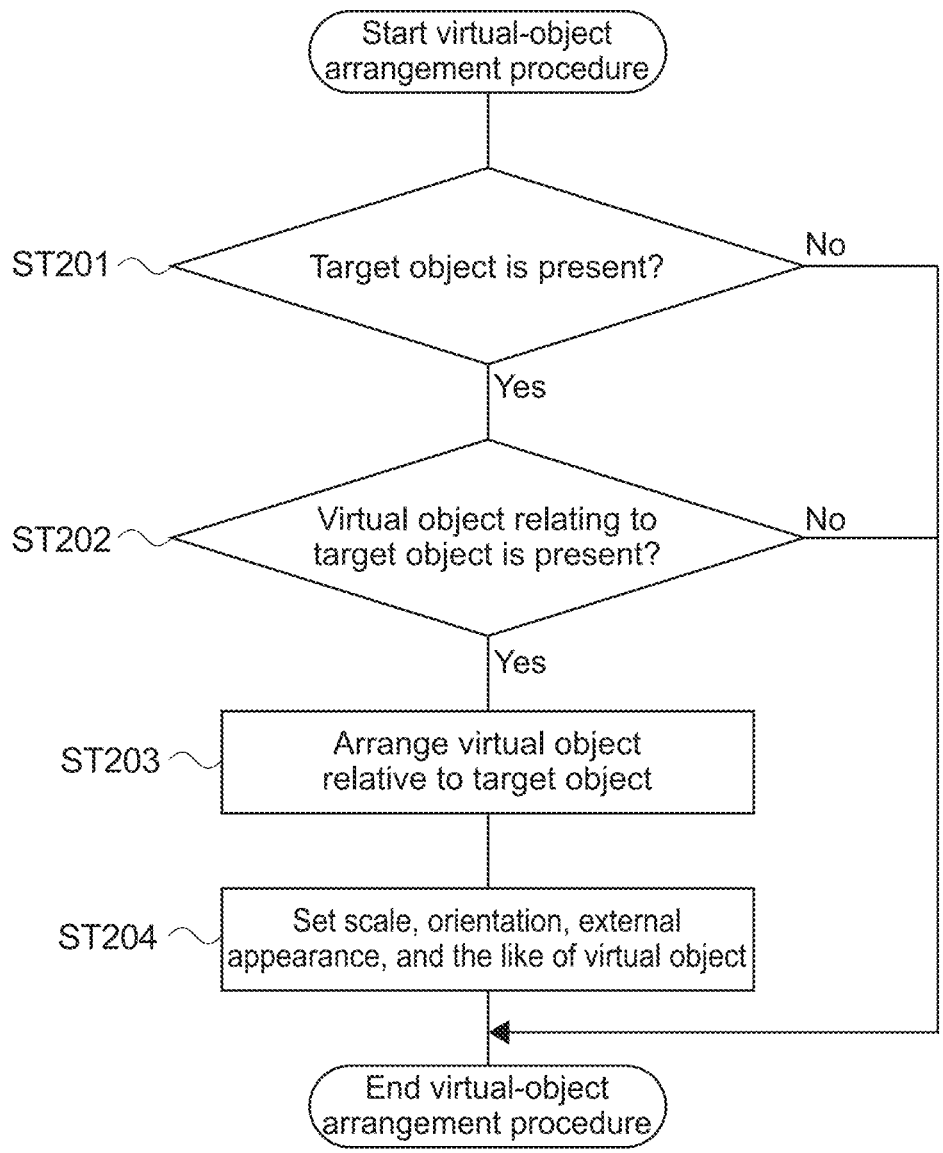
FIG. 5 A flowchart showing an example of a virtual-object arrangement procedure.

FIG. 5 is a flowchart showing an example of the virtual-object arrangement procedure. In the virtual-object arrangement procedure, first, it is determined whether or not the target object 2 is present in the field of view of the user (Step 201). For example, the outer camera 13 takes the images of the field of view of the user 1. The target-object recognition unit 23 executes the processes of recognizing the target object 2 on the basis of the image of the field of view of the user 1. Then, on the basis of results of the detection of the target object 2, the display control unit 25 determines whether the target object 2 is present/absent.

If it is determined that the target object 2 is absent (No in Step 201), the virtual-object arrangement procedure is ended. Meanwhile, if it is determined that the target object 2 is present (Yes in Step 201), it is determined whether or not the related virtual object 4 relating to the recognized target object 2 is present (Step 202).

For example, the storage unit 15 stores not only recognition information for recognizing the target object 2, but also the related virtual object 4 relating to this target object (additional information such as reviews or a video movie). Alternatively, via the communication unit (not shown) or the like installed in the HMD 100, information about the related virtual object 4 may be acquired from a database connected, for example, to a predetermined network. These storage unit 15 and database are searched as appropriate, and it is determined whether the related virtual object 4 is present/absent.

If it is determined that the related virtual object 4 is absent (No in Step 202), the virtual-object arrangement procedure is ended. Meanwhile, if it is determined that the related virtual object 4 is present (Yes in Step 202), the related virtual object 4 is arranged relative to the target object 2 (Step 203).

In Step 203, the region where the related virtual object 4 is displayed (display region 5) is set. The display region 5 is set as appropriate in accordance, for example, with a shape, a type, and the like of the target object 2. Hereinbelow, the case where the related virtual object 4 is displayed near the lateral surface of the target object 2 (hereinafter, referred to as a lateral UI) (User Interface)) is described as an example.

As a matter of course, the related virtual object 4 may be displayed not only near the lateral surface, but also, for example, on a bottom surface or a back surface.

In addition, the display region 5 may be set in accordance, for example, with action by the user 1 or a distance to the target object 2. Specifically, if the distance between the user 1 and the target object 2 is closed to be smaller than a predetermined distance, the display region 5 is set near a predetermined lateral surface (such as right-hand surface/left-hand surface) of the target object 2. Alternatively, for example, if the user 1 grabs the target object 2, the display region 5 is set near the predetermined lateral surface of the target object 2.

Still alternatively, the display region 5 may be set in accordance with which of the hands the user 1 grabs the target object 2. For example, if the user 1 grabs the target object 2 with his/her right hand (left hand), the display region 5 is set on the left (right). Yet alternatively, the display region 5 may be set in accordance with a position on the target object 2 that the user 1 grabs. In addition, a method of setting the display region 5 is not limited.

After the display region 5 has been set, display parameters such as a scale, an orientation, and an external appearance of the related virtual object 4 are set (Step 204). The display parameters of the related virtual object 4 are set such that the user 1 unconsciously makes a predetermined gesture. In other words, the display parameters are set such that the predetermined gesture is induced. Then, on the basis of these preset display parameters, the related virtual object 4 is displayed in the display region 5.

In addition, in the HMD 100, the display 11 is controlled such that the related virtual object 4 is displayed in a manner that a relative positional relationship between a part of the real object and the related virtual object 4 is fixed. Specifically, a distance, an arrangement angle, an arrangement position, and the like of the related virtual object 4 are maintained relative to the part (such as the lateral surface or the like) of the real object being the target object 2.

Note that, as described below, for example, if the target object 2 is moved, a process of changing a display state (display parameters) of the related virtual object 4 in conjunction with the movement is executed. For example, if the movement of moving the target object 2 is stopped halfway, how the related virtual object 4 is displayed is controlled such that the relative positional relationship at that timing is maintained.

With this, a correlation between the target object 2 and the related virtual object 4 can be explicitly demonstrated. In addition, by moving the target object 2, the related virtual object 4 becomes accessible. In other words, a capability to enable viewing of details of the content of the related virtual object 4 can be easily demonstrated. As a result, for example, easy-to-use NUIs (Natural User Interfaces) can be provided.

Figure 6:
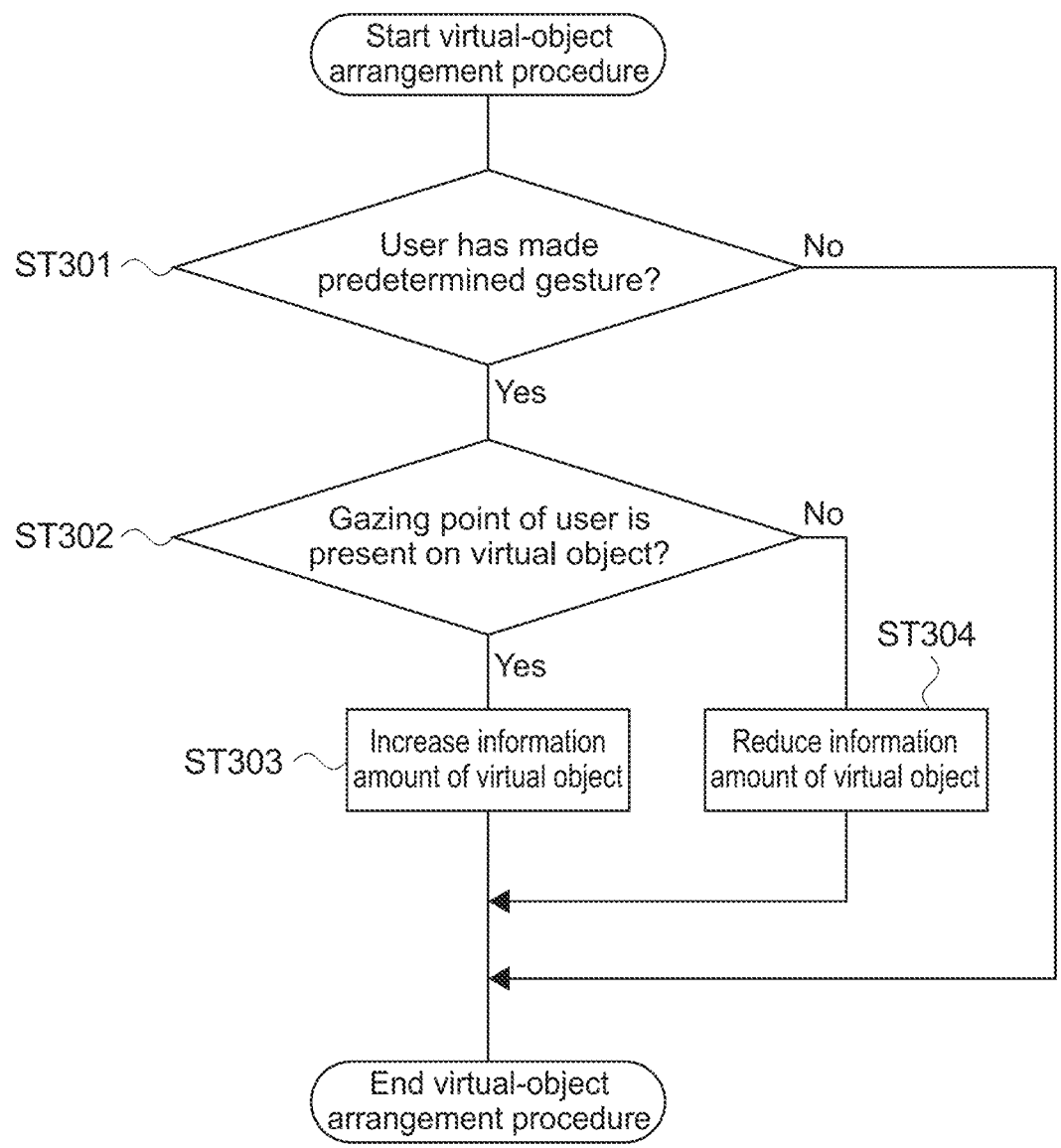
FIG. 6 A flowchart showing an example of an action detection procedure.

FIG. 6 is a flowchart showing an example of the action detection procedure. As described above, in the action detection procedure, the gesture by the user 1 is detected, and a process of varying how the related virtual object 4 is displayed is executed in accordance with the gazing point P of the user at that time point.

It is determined whether the user 1 has made the predetermined gesture (Step 301). For example, the movement-information acquisition unit 22 detects the gesture by the user 1, and the movement determination unit 24 determines, on the basis of a result of the detection of the gesture, whether or not this gesture is the predetermined gesture.

For example, in the lateral UI, the predetermined gesture is the hand gesture of turning the target object 2. In Step 301, for example, it is determined whether or not the movement of turning the target object 2 (book), which is described mainly with reference to FIGS. 3A and 3B, has been made. Note that, a type of the predetermined gesture is set as appropriate in accordance with a type of the display control (type of the UI).

If it is determined that the gesture by the user 1 is not the predetermined gesture (No in Step 301), the action detection procedure is ended, and another virtual-object arrangement procedure is executed. In addition, if it is determined that the gesture by the user 1 is the predetermined gesture (Yes in Step 301), it is determined whether the gazing point P of the user 1 has overlapped with the related virtual object 4 (Step 302).

For example, it is determined whether or not the position of the gazing point P detected by the gaze-information acquisition unit 21 has overlapped with the related virtual object 4, that is, whether or not the position is present in the display region 5. Note that, a determination that position of the gazing point P has overlapped with the related virtual object 4 may be made if the position has remained overlapped for a predetermined time period. With this, a case where the gazing point P merely passes across the related virtual object 4 can be excluded. As a result, targets that the user 1 looks at can be determined with high accuracy.

If the gazing point P of the user 1 has overlapped with the related virtual object 4 (Yes in Step 301), a process of increasing an information amount of the related virtual object 4 is executed. More specifically, the information amount of the related virtual object 4 is increased in response to the gesture by the user 1.

As the process of increasing the information amount, for example, a process of varying the obliquely-displayed image to an image to be displayed to the front (refer to FIG. 3A) is executed. In addition, as other examples of the process of increasing the information amount, there may be mentioned, for example, a process of varying low resolution of the image to high resolution, varying content to more detailed content, or varying still images into a moving image (such as movie). As a matter of course, not only these exemplified processes, but also arbitrary processes of increasing the information amount of the related virtual object 4 may be executed.

For example, as illustrated in A of FIG. 3A, if the gazing point P of the user 1 has overlapped with the content (related virtual object 4) while the user 1 is turning the book (target object 2), the content which has been obliquely displayed is displayed to the front. With this, the information amount is increased. In other words, the content in which the user 1 is interested is displayed in more detail. In such a way, in the HMD 100, if the gazing point P of the user 1 is present in the display region 5 while the user 1 is making a gesture, the display 11 is controlled such that the information amount of the related virtual object 4 is increased.

Meanwhile, if the gazing point P of the user 1 has not overlapped with the related virtual object 4 (No in Step 301), a process of reducing the information amount of the related virtual object 4 is executed. In other words, if the gazing point P is present in a region out of the display region 5 where the related virtual object 4 is displayed (hereinafter, abbreviated as non-display region 6), the information amount of the related virtual object 4 is reduced. The non-display region 6 of this embodiment corresponds to a second region.

The non-display region 6 is a region where the related virtual object 4 is absent. In other words, it is conceivable that a state in which the gazing point P is present in the non-display region 6 is at least a state in which the user does not have much interest in the related virtual object 4. In such a case, the information amount of the related virtual object 4 is reduced.

In this embodiment, the non-display region 6 is set in a predetermined range. Specifically, a region that does not overlap with the related virtual object 4 and is encompassed in the predetermined range that has been set in advance is set as the non-display region 6. There is no limitation, for example, on a method of setting the non-display region 6. For example, the range to be the non-display region 6 may be set as appropriate in accordance, for example, with an expected one of the gestures by the user 1, and the shape of the target object 2.

Specifically, in the lateral UI, the non-display region 6 is set on the lateral surface of the target object 2. More specifically, on the left in FIG. 3B, on the spine of the book, that is, on the lateral surface of the target object 2, a region where the spine is visible by not overlapping with the related virtual object 4 is the non-display region 6. Note that, a region where the spine of the book and the related virtual object 4 overlap with each other is not the non-display region 6 but the display region 5.

Alternatively, the non-display region 6 may be set on the back surface of the target object 2. For example, if the target object 2 is the book, a cover on a side opposite to a side where the cover on a side that the user 1 has visually recognized is present (such as back cover) corresponds to the back surface of the target object 2. It is conceivable that, if the user 1 has been interested in the back surface of the book, the user 1 turns the book to view its back side. For example, it is conceivable that, while the book is being turned, the gazing point P of the user 1 passes, for example, the front surface and the lateral surface of the book, and then stops in the back surface shape when the back surface of the book is brought to the front.

In such a way, by detecting how long the gazing point P stops (such as gazing time period) as appropriate, it can be determined that in which of the front surface, the lateral surface, the back surface, and the like the user 1 has been interested. In addition, there is no limitation, for example, on the range in which the non-display region 6 is set.

If the gazing point P is detected in the non-display region 6, for example, whether the related virtual object 4 is displayed is switched to OFF. Alternatively, how the related virtual object 4 is displayed is controlled such that transparency of the related virtual object 4 is gradually increased to cause the related virtual object 4 to fade out. Still alternatively, the related virtual object 4 is moved to get out of the field of view. The information amount is reduced, for example, by such processes. In addition, the process of reducing the information amount is not limited.

For example, as illustrated in FIG. 3B, if the gazing point P of the user has been out of the content (related virtual object 4) while the user 1 is turning the book, the displayed content is turned OFF in response to the gesture by the user 1 of turning the target object 2. In other words, the content in which the user 1 is uninterested is cleared, and in this state, the spine of the book, at which the user 1 has gazed, can be checked. In such a way, in the HMD 100, if the gazing point P of the user 1 is present in the non-display region 6 out of the display region 5 while the user 1 is making a gesture, the display 11 is controlled such that the information amount of the related virtual object 4 is reduced.

After the display control of the related virtual object 4 has ended, the action detection procedure is ended, and, for example, another virtual-object arrangement procedure is started. Note that, the virtual-object arrangement procedure and the action detection procedure described with reference to FIG. 5 and FIG. 6 are merely examples, and other display-control processes and the like may be incorporated as appropriate. Alternatively, for example, a cancellation procedure including cancellation processes halfway in the loop process, and starting another loop process may be executed.

[Lateral UI]

Figure 7:
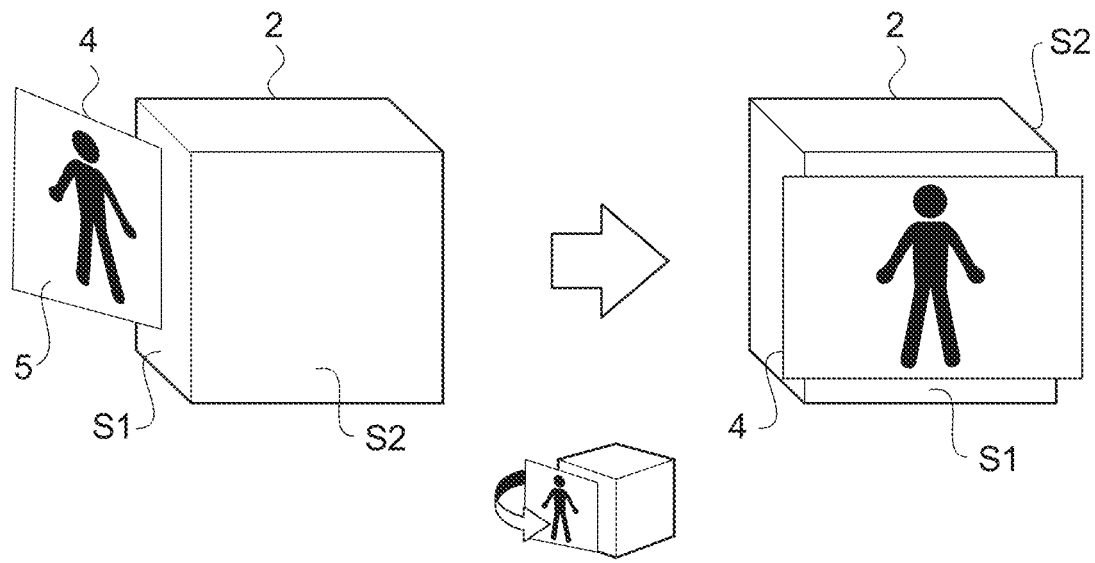
FIG. 7 A schematic view illustrating an example of how a lateral UI is displayed.

FIG. 7 is a schematic view illustrating an example of how the lateral UI is displayed. In the example illustrated in FIG. 7, an object having a rectangular-parallelepiped shape (such as package of a commercial item) is illustrated as the target object 2 in a perspective view. Note that, on the left and the right in FIG. 7, states before and after the user 1 has turned the target object 2 are illustrated, respectively. Hereinbelow, a surface to be a left-hand surface as viewed from the user 1 before the target object 2 is turned by the user 1 is referred to as a first surface S1, and a surface to be the front surface as viewed from the user 1 before the target object 2 is turned by the user 1 is referred to as a second surface S2. Note that, in FIG. 7, the display region 5 is set near the first surface S1.

In an initial state of the lateral UI, the related virtual object 4 is displayed to induce the user 1 holding the target object 2 to make the gesture of turning the target object 2. For example, the display parameters (such as arrangement, angle, shape, external appearance, and size) are set to enable the user 1 to understand the content of the related virtual object 4 to some extent, and to bring the user 1 to view the related virtual object 4 in more detail. Specifically, of the display parameters, the arrangement and the angle are set to make it difficult to view the details of the related virtual object 4 that has not been turned. It is conceivable that the turning gesture can be induced in this way.

In addition, the position where the related virtual object 4 is displayed is set near a center of the first surface S1. With this, for example, even if a plurality of target objects 2 is present, links between the target objects 2 and the related virtual object 4 correlating with each other can be easily demonstrated.

In the lateral UI, as illustrated on the left in FIG. 7, the related virtual object 4 is displayed substantially at the center of the first surface S1. In addition, the related virtual object 4 is displayed to assume, as its initial state (state before being turned), a state in which the related virtual object 4 is inclined at 45° toward the user relative to a state in which respective normal directions of the related virtual object 4 and the first surface S1 align with each other. In other words, in the initial state, the related virtual object 4 is presented obliquely to the user 1.

With this, the related virtual object 4 can be presented such that presence thereat of the related virtual object 4 can be understood, and that its content can be understood to some extent. Further, by intentionally bringing the related virtual object 4 into the state in which it is difficult to view the related virtual object 4, the user 1 can be brought to view the content in more detail. Still further, since the related virtual object 4 is localized to the lateral surface of the target object 2, it is possible to induce the interested user 1 to make the gesture of turning the target object 2.

Note that, there is no limitation, for example, on the inclination angle toward the user. For example, an angle higher than 45° (such as 50° or 60°) or a lower angle (such as 40° or) 30° may be set. Note that, if the angle is excessively high, the content is fully understood, with the result that the turning movement may not be induced. Meanwhile, if the angle is low (refer to FIG. 8), the related virtual object 4 itself may not be recognized. As a countermeasure, it is desired that the inclination angle toward the user be set to an angle at which the turning movement can be induced.

It is assumed that, in watching the related virtual object 4 by turning the target object 2, the user 1 turns the target object 2 such that the lateral surface (first surface S1) of the target object 2 comes to the front. In this case, if the related virtual object 4 is inclined at 45° as in the initial state with the first surface S1 having come to the front, visibility may be impaired.

For example, if the user 1 has turned the target object 2 (Yes in Step 301 in FIG. 6), and has visually recognized the related virtual object 4 while turning the target object 2 (Yes in Step 302), the process of increasing the information amount of the related virtual object 4 is executed (Step 303). In this embodiment, in increasing the information amount, a process of cancelling an initial value of 45° in conjunction with the turning movement by the user 1 is executed.

For example, as illustrated on the right in FIG. 7, when the first surface S1 has come to the front, a display angle is corrected such that the normal direction of the related virtual object 4 and the normal direction of the first surface S1 substantially align with each other. With this, by turning the target object 2, the related virtual object 4 that is difficult to view can be changed into a state in which the related virtual object 4 is easier to view. As a result, details of the content can be naturally presented to the user 1 having gazed at the related virtual object 4.

Figure 8:
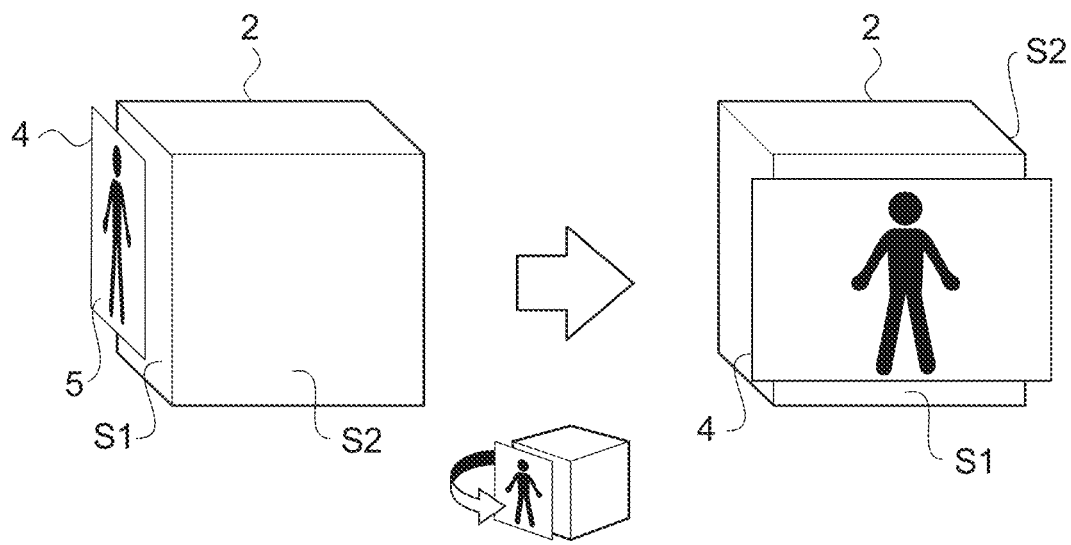
FIG. 8 A schematic view illustrating a comparative example of how a related virtual object is displayed.

FIG. 8 is a schematic view illustrating a comparative example of how the related virtual object 4 is displayed. In FIG. 8, the related virtual object 4 in the initial state is displayed such that the normal direction of the related virtual object 4 and the normal direction of the first surface S1 being the lateral surface of the target object 2 substantially align with each other. In addition, in FIG. 8, a positional relationship in the initial state is maintained even during the turning movement.

For example, even if the related virtual object 4 is displayed as illustrated in FIG. 8, the content of the related virtual object 4 can be checked by turning the target object 2. Meanwhile, as illustrated on the left in FIG. 8, if the related virtual object 4 is arranged in a manner that the respective normal directions of the lateral surfaces align with each other, visibility of the related virtual object 4 significantly decreases. As a result, it is assumed that it is difficult to induce the turning.

In addition, low visibility from the user 1 causes difficulties in determining whether or not his/her line of sight has impinged. As a result, accuracy, for example, in determining whether or not the gazing point P is present on the related virtual object 4 (Step 302 in FIG. 6) may decrease.

Thus, by obliquely displaying the related virtual object 4 in the initial state as illustrated in FIG. 7, the turning gesture by the user 1 can be induced, and the interest targets for the user 1 can be distinguished from each other with high accuracy.

Figure 9:
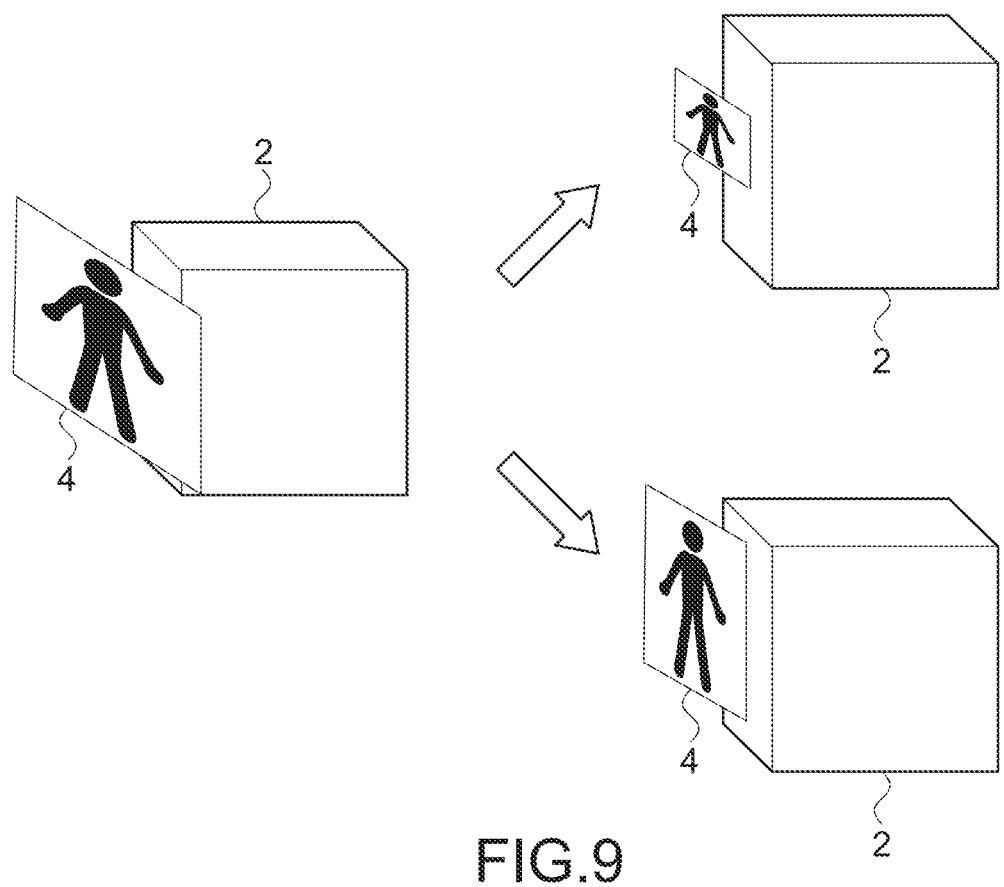
FIG. 9 An explanatory schematic view illustrating a display example in an initial state of the lateral UI.
Figure 10:
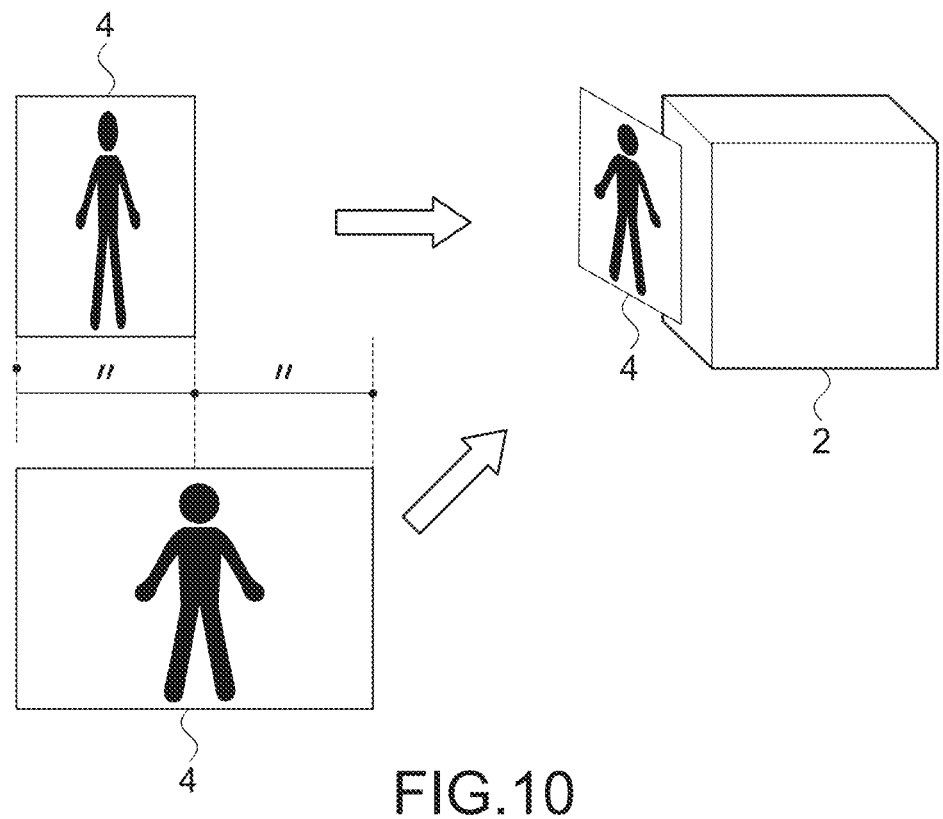
FIG. 10 An explanatory schematic view illustrating another display example in the initial state of the lateral UI.

FIG. 9 and FIG. 10 are each an explanatory schematic view illustrating a display example in the initial state of the lateral UI. In the following, with reference to FIG. 9 and FIG. 10, how the related virtual object 4 is displayed is controlled in the initial state of the lateral UI (for example, Step 204 in FIG. 5) is described.

FIG. 9 schematically illustrates a display example at a time when related virtual objects 4 in different sizes are used. It is conceivable that, as illustrated on the left in FIG. 9, depending on the size of the related virtual object 4, the lateral surface of the target object 2 is covered. As a result, it may be difficult to distinguish whether the gazing point P of the user is present on the lateral surface (first surface S1) or on the related virtual object 4 from each other.

As a countermeasure, for example, it is conceivable to reduce the related virtual object 4 in accordance with the size of the lateral surface of the target object 2. Specifically, if the related virtual object 4 is reduced with its aspect ratio maintained (as illustrated at the upper-right part of FIG. 9), its image is reduced in both its upper-and-lower direction and right-and-left direction. In accordance therewith, the line of sight may need to be detected with higher accuracy. In addition, as the related virtual object 4 is reduced in size, visual recognition by the user 1 becomes more difficult. As a result, it may become more difficult to bring the user 1 to "view (≈turn) the related virtual object 4 in more detail."

Thus, in this embodiment, a reduction process utilizing that the related virtual object 4 is obliquely arranged is executed. FIG. 10 schematically illustrates an example of expansion/reduction of the related virtual object 4 in perspective. The related virtual object 4 illustrated on the right in FIG. 10 is displayed while reduced in the right-and-left direction.

If the image or the like is obliquely displayed, the right-and-left direction of its the front is recognized as a three-dimensional depth direction. At this time, the depth direction looks distorted due to the perspective, and hence the user 1 does not sensitively recognize the expansion and the reduction of the image itself. As a result, even if the image that has been reduced in the right-and-left direction (upper-left part of FIG. 10) is obliquely displayed, this image can be naturally recognized exactly as an image that has not been reduced in the right-and-left direction (lower left part of FIG. 10) is obliquely displayed. In other words, even if the image is reduced in the right-and-left direction, by obliquely displaying the image, the user 1 is unlikely to feel unnatural.

In the HMD 100, the related virtual object 4 which is reduced only in the right-and-left direction (depth direction) is displayed near the lateral surface of the target object 2 (lower-right part of FIG. 9). With this, visibility of both the lateral surface of the target object 2 and the related virtual object 4 can be secured, and distinguishment between the interest targets based on the line of sight (gazing point P) can be facilitated. As a matter of course, in accordance with the size and the visibility of the related virtual object 4, and with requirements of a range of the impingement, the related virtual object 4 may be reduced in the upper-and-lower direction.

In such a way, in this embodiment, the display 11 is controlled such that, before the user 1 makes a gesture, the related virtual object 4 is displayed such that at least a part of the lateral surface of the target object 2 can be visually recognized. With this, the interest targets for the user 1 can be distinguished from each other with high accuracy, and information that the user 1 needs can be properly displayed.

Figure 11A:
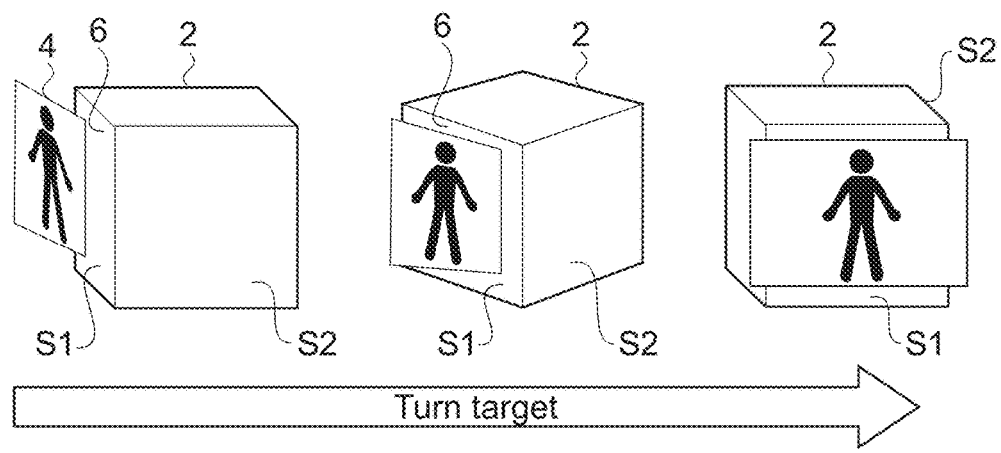
FIGS. 11A and 11B Explanatory schematic views illustrating a display example in an active state of the lateral UI.
Figure 11B:
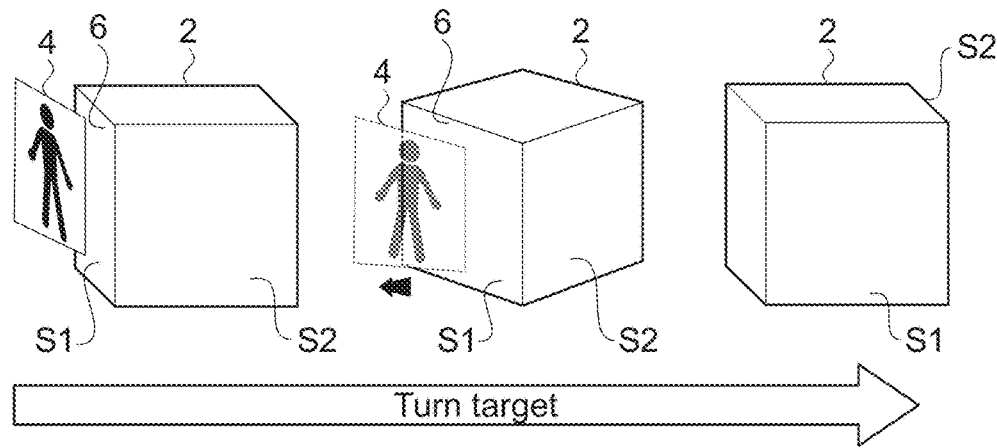

FIGS. 11A and 11B are explanatory schematic views illustrating a display example in an active state of the lateral UI. FIG. 11A is a comparative example of the display control, and FIG. 11B is an example of display control in the active state. Note that, the active state is, for example, a state in which the user 1 is making the predetermined gesture (in this case, gesture of turning the target object 2).

As illustrated in FIG. 11A, for example, the user 1 holding the target object 2 in his/her hand turns the target object 2 such that the lateral surface (first surface S1) comes to the front under a state in which, for example, a relative display position of the related virtual object 4 is fixed. In this case, it is conceivable that it becomes more difficult to view the first surface S1 as the target object 2 is turned further. In other words, in the middle of turning the target object 2 (center part of A of FIG. 11A), the first surface S1 may be covered with the related virtual object 4.

If the first surface S1 is covered with the related virtual object 4, it may be difficult to determine whether the line of sight (gazing point P) of the user 1 is directed to the first surface S1 or to the related virtual object 4. As a result, it is difficult to distinguish the targets in which the user 1 is interested from each other. For example, a situation where the related virtual object 4 is displayed to the user 1 who has been interested in the first surface S1 may occur.

In this embodiment, in the active state, if the gazing point P of the user 1 is present in the non-display region 6 (first surface S1), a process of sliding the related virtual object 4 and a process of increasing the transparency of the related virtual object 4 are executed. These processes are processes to be executed, for example, in Step 304 in FIG. 6.

FIG. 11B illustrates the process of sliding the related virtual object 4 in conjunction with the turning. For example, if the user 1 turns the target object 2 while viewing the first surface S1 (non-display region 6), the related virtual object 4 is slid along a predetermined direction (solid arrow in the illustration) so as not to overlap with the first surface S1. For example, the depth direction is set as the predetermined direction. Alternatively, for example, the right-and-left direction (left direction in the illustration) or the upper-and-lower direction of a screen may be set as the predetermined direction.

In addition, as the target object 2 is turned further, the transparency of the related virtual object 4 is increased. In other words, the related virtual object 4 becomes more transparent, whereby the information amount is reduced. Note that, the transparency need not necessarily be increased, and arbitrary fade-out processes using the reduction in size, trimming of the image, and the like may be executed.

In such a way, in this embodiment, if the gazing point P of the user is present in the non-display region 6 while the user 1 is making a gesture, the display 11 is controlled such that the information amount of the related virtual object 4 is continuously reduced in response to the gesture. With this, the visibility of the lateral surface (non-display region 6) of the target object 2 can be secured.

Further, if the gazing point P of the user 1 is maintained in the non-display region 6 while the user 1 is making a gesture, the display 11 is controlled such that the related virtual object 4 is not displayed at a time point when the gesture is finished. With this, as illustrated on the right in FIG. 11B, the user 1 can visually recognize the content printed on the first surface S1 turned to the front, the first surface S1 being the lateral surface in the initial state.

Still further, the sliding process in conjunction with the turning is advantageous also in naturally notifying the user 1 of states, and in inducing action. For example, it is conceivable that, even if the user 1 himself/herself has turned the target to view the related virtual object 4 (that is, turned the target while viewing the related virtual object 4), depending on accuracy of a line-of-sight recognizer, it may be determined that the user 1 is viewing the lateral surface (first surface S1) of the target object 2.

In this case, although the related virtual object 4 is slid while increased in transparency, since the user 1 wants to view the related virtual object 4, the user 1 keeps sight of this related virtual object 4. By detecting this movement, it can be determined that the user 1 "wants to view the related virtual object 4 that is about to be cleared." Thus, the sliding process and the transparentizing process are cancelled, which enables the user 1 to start watching the related virtual object 4. By moving an interest target in such a way, the movement of the line-of-sight of the user 1 can be induced, and the process of fading out the related virtual object 4 can be cancelled in a natural manner.

Note that, it is conceivable that the user 1 looks at another region while watching the related virtual object 4. In such a case, it is determined that the user 1 has lost interest in the related virtual object 4 that the user 1 was watching until then. On the basis of this determination, for example, the process of reducing the information amount of the related virtual object 4 is executed. Note that, the determination as to whether or not the user 1 has lost the interest can be made as appropriate on the basis of, for example, a time period in which the user 1 gazes at a certain region, and the like.

Alternatively, for example, at a time point when the user 1 releases the target object 2, it is determined that the interest in the target object 2 has been lost, and processes of, for example, stopping/hiding all the content are executed. Still alternatively, the content may continue to be displayed with how the related virtual object 4 is displayed initialized. In addition, there is no limitation, for example, on a method of ending the displaying of the related virtual object 4.

Figure 12:
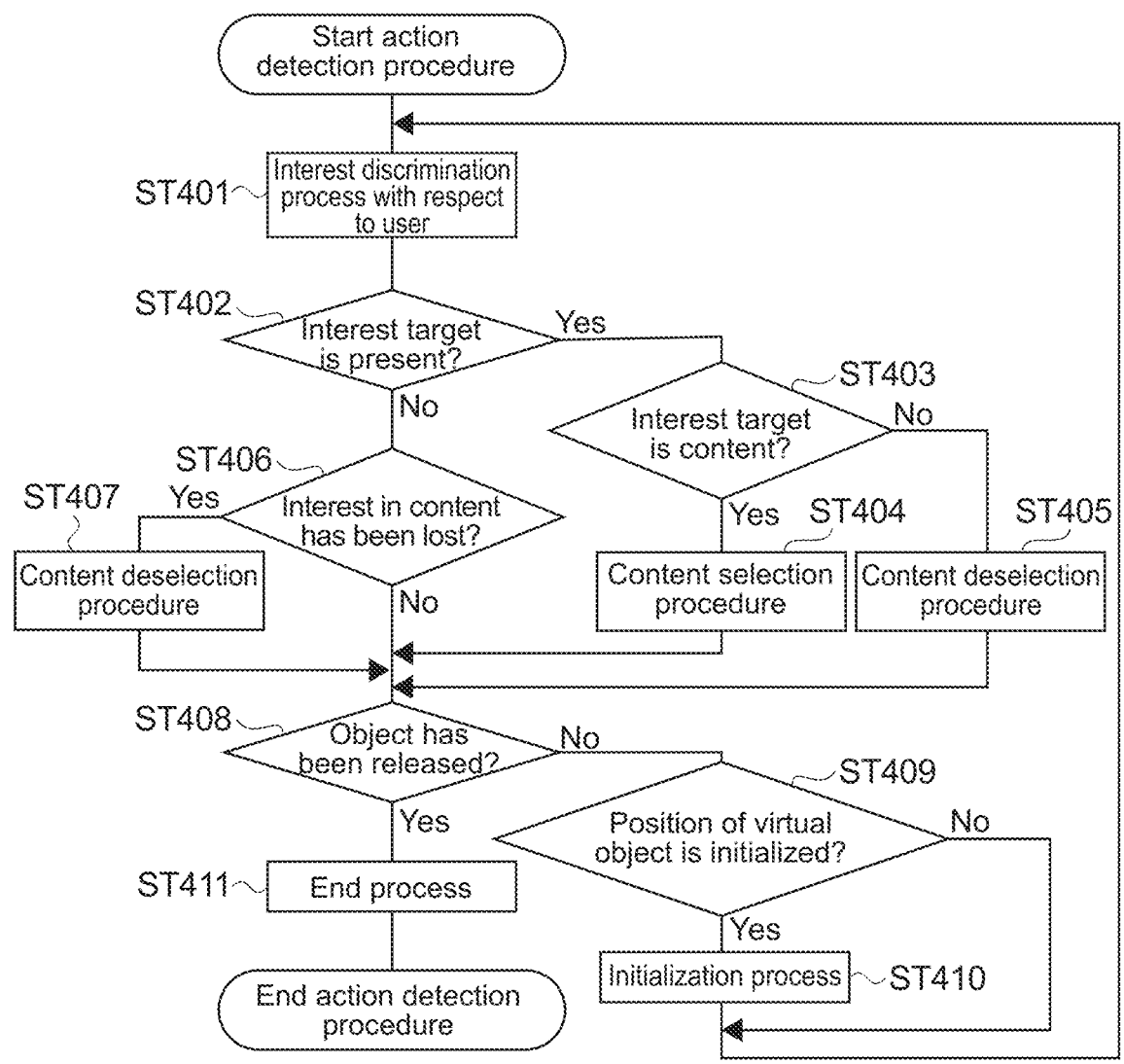
FIG. 12 A flowchart showing an example of specific processes in the action detection procedure.
Figure 13:
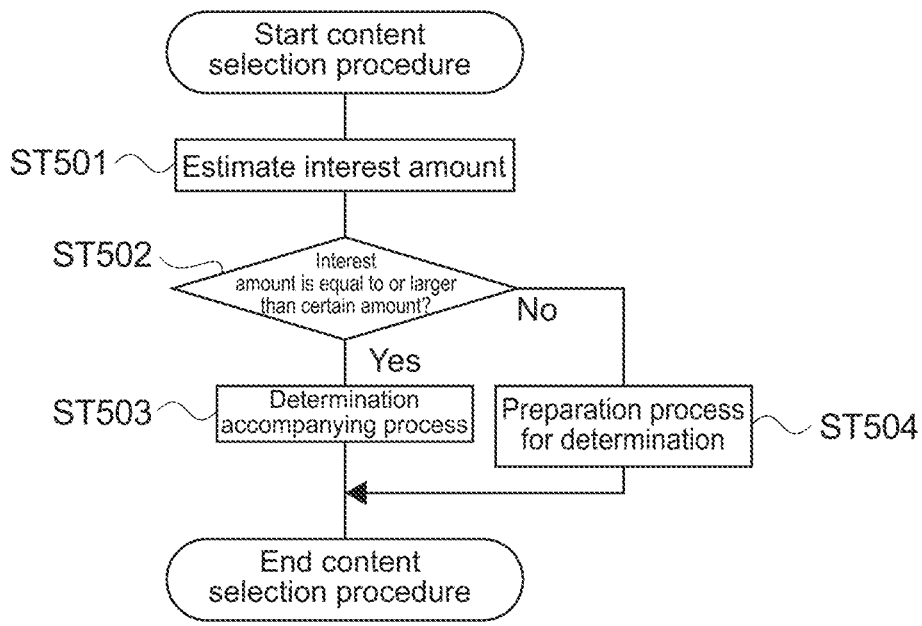
FIG. 13 A flowchart showing an example of a content selection procedure shown FIG. 12.
Figure 14:
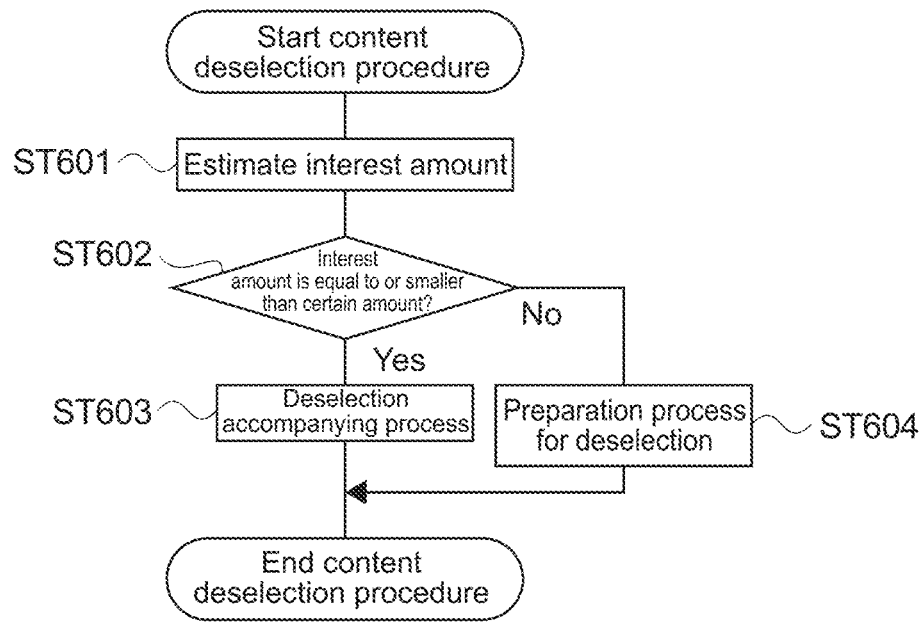
FIG. 14 A flowchart showing an example of a content deselection procedure shown in FIG. 12.

FIG. 12 is a flowchart showing an example of specific processes in the action detection procedure. FIG. 13 is a flowchart showing an example of a content selection procedure shown in FIG. 12. FIG. 14 is a flowchart showing an example of a content deselection procedure shown in FIG. 12. The processes shown in FIG. 12 are an example of, for example, details of the processes in the action detection procedure shown in FIG. 6. Note that, the procedures shown in FIG. 12 to FIG. 14 are procedures that are applicable to other UIs as described below.

In the following, with reference to FIG. 12 to FIG. 14, the examples of the specific processes in the lateral UI are described. Note that, the following description is made on a premise that the real object being the target object 2 is present in the field of view of the user 1, and the related virtual object 4 is displayed in the display region 5 on the real object.

An interest discrimination process is executed with respect to the user 1 (Step 401). In the lateral UI, as the interest discrimination process, it is discriminated whether or not the user 1 has picked up and turned the target object 2 (real object). In addition, an object that the user 1 is viewing while the user 1 is turning the target object 2 is discriminated as the interest target. For example, if the gazing point P is present in the display region 5 during the turning movement, the related virtual object 4 is determined as the interest target. Meanwhile, if the gazing point P is present in the non-display region 6 during the turning movement, the target object 2 is the interest target.

Note that, for example, if the user 1 has not picked up the target object 2, has picked up but has not turned the target object 2, or is viewing a position out of the display region 5 or the non-display region 6 while turning the target object 2, it is determined that the interest target is absent.

On the basis of results of the interest discrimination process, it is determined whether or not the interest target for the user is present (Step 402). If it is determined that the interest target is present (Yes in Step 402). it is determined whether or not the interest target is the related virtual object (content) (Step 403). If the interest target is the related virtual object 4 (Yes in Step 403), the content selection procedure is executed (Step 404).

As shown in FIG. 13, in the content selection procedure, the interest amount is estimated (Step 501). Herein, the interest amount is a parameter for determining a degree of interest of the user 1 in the related virtual object 4 being the interest target. In the lateral UI, an amount of turning the target object 2, a time period of gazing at the related virtual object 4, and an extent of directing the related virtual object 4 to the user 1 are estimated as the interest amount. A method of estimating the interest amount is not limited.

For example, as the amount of turning the target object 2 becomes larger, or as the time period of gazing at the related virtual object 4 (time period in which the gazing point P is present in the display region 5) becomes longer, it is estimated that the user 1 has been interested in the content being the related virtual object 4, that is, the interest amount is large. In addition, as the related virtual object 4 is arranged to come closer to the front of the user 1, it is estimated that the interest amount is large. With this, it is possible to distinguish whether the target object 2 has been turned such that the related virtual object 4 comes to the front, or the target object 2 has been turned for other purposes.

It is determined whether or not the interest amount is equal to or larger than a certain amount (Step 502). For example, it is determined whether or not the interest amount is larger than a threshold α of the amount of the interest of the user 1 in the related virtual object 4. The threshold α of the interest amount is set as appropriate such that, for example, the related virtual object 4 can be properly displayed.

If the interest amount is equal to or larger than the certain amount (threshold α) (Yes in Step 502), it is determined that the related virtual object 4 is the interest target for the user, and a determination accompanying process is executed (Step 503). For example, as the determination accompanying process, a process of reproducing, for example, movie content included in the related virtual object 4 is started. Alternatively, for example, an UI operation of notifying that the related virtual object 4 has been selected is accepted. With this, the content to be displayed of the related virtual object 4 is changed to more detailed content. Alternatively, a process of, for example, increasing the resolution is executed. These processes are examples of the process of increasing the information amount of the related virtual object.

If the interest amount is smaller than the certain amount (threshold α) (No in Step 502), a preparation process for executing the determination process is executed (Step 504). The preparation process is, for example, a process of explicitly displaying the related virtual object 4 by adjusting the display parameters such as the position, the orientation, the size, and the transparency of the related virtual object 4. Specifically, for example, a process of enlarging the related virtual object 4 such that the related virtual object 4 is visually perceived exactly as the related virtual object 4 is approaching the user 1. With this, under a state in which, for example, the content of the related virtual object 4 has not been reproduced, the related virtual object 4 is displayed to be more visible. In this way, it is possible to explicitly demonstrate that the related virtual object 4 is likely to be selected.

Referring back to FIG. 12, if the interest target is not the content (No in Step 403), the content deselection procedure is executed (Step 405). In this case, the target object 2 has been estimated as the interest target.

As shown in FIG. 14, in the content deselection procedure, the interest amount of the related virtual object 4 is estimated (Step 601). For example, even while the content deselection procedure is being executed, the related virtual object 4 may be displayed. In such a state, the interest amount of the related virtual object 4 is estimated, for example, by a method similar to that of Step 501 in FIG. 13.

It is determined whether or not the interest amount is equal to or smaller than the certain amount (Step 602). For example, the estimated interest amount is compared with a predetermined threshold β. This threshold β to be compared is set, for example, to a value smaller than the threshold α used in Step 502 in FIG. 13. The threshold β of the interest amount is set as appropriate such that, for example, the related virtual object 4 can be properly hidden. Note that, the threshold β and the threshold a may be set equal to each other.

If the interest amount is equal to or smaller than the certain amount (threshold β) (Yes in Step 602), it is determined that the related virtual object 4 is not the interest target for the user 1, and a deselection accompanying process is executed (Step 603). For example, as the deselection accompanying process, a process of hiding the related virtual object 4 relating to a direction of the turning by the user 1 is executed. With this, for example, even in a case where the plurality of related virtual objects 4 is displayed, unwanted ones of the related virtual objects 4 can be cleared.

Alternatively, for example, as the deselection accompanying process, a process of hiding all the plurality of related virtual objects 4 is executed. Still alternatively, information to be presented is changed in accordance with the turning direction. These processes are examples of the process of reducing the information amount of the related virtual object. Note that, the case where the plurality of related virtual objects 4 is displayed is described below mainly with reference to FIG. 15.

If the interest amount is larger than the certain amount (threshold β) (No in Step 602), a preparation process for executing the deselection process is executed (Step 604). This preparation process is, for example, a process of transparentizing (hiding) the related virtual object 4 by adjusting the display parameters such as the position, the orientation, the size, and the transparency of the related virtual object 4. With this, the related virtual object 4 is displayed to be less visible or away from the gazing point. As a result, it is possible to naturally notify that that the related virtual object 4 is going to be hidden.

Referring back to FIG. 12, if the interest target for the user 1 is not discriminated (No in Step 402), it is determined whether or not the interest in the related virtual object 4 (content) has been lost (Step 406). For example, in the interest discrimination process (refer to Step 401), depending, for example, on accuracy in detecting the gazing point P or the shape of the real object (target object 2), it may be difficult to properly discriminate the interest target. In such a case, in order to determine whether or not to hide the related virtual object 4, it is determined whether or not the interest has been lost.

For example, the interest amount of the related virtual object 4, which is described with reference to FIG. 13 and FIG. 14, and the like are estimated, and it is determined whether or not the interest amount is smaller than the predetermined threshold. If it is determined that the interest amount is smaller than the threshold, that is, the user 1 has lost the interest in the related virtual object 4 (Yes in Step 406), the content deselection procedure shown in FIG. 14 is executed (Step 407).

Meanwhile, if it is determined that the interest amount is larger than the threshold, that is, the user 1 has not lost the interest in the related virtual object 4 (No in Step 406), Step 408 is executed. With this, for example, in such a case where the interest has failed to be properly discriminated, and a case where the user 1 becomes interested in the related virtual object 4 during the turning, the related virtual object 4 can continue to be displayed.

Note that, also when the content selection procedure of Step 404, and the content deselection procedures of Step 405 and Step 407 are executed, Step 408 is executed. In Step 408, it is determined whether or not the user 1 has released the real object (object) being the target object 2. The determination as to whether or not the user 1 has released the object is made as appropriate on the basis of, for example, the movement information acquired by the movement-information acquisition unit 22, and the like.

If it is determined that the user 1 has not released the object (No in Step 408), it is determined whether or not to initialize the display position of the related virtual object 4 (Step 409). In the lateral UI, as the determination as to whether or not to perform the initialization, it is determined whether or not the user 1 has stopped turning the target object 2. In other words, it is determined whether or not the user 1 has returned the front surface of the target object 2 (second surface S2) to the front (refer mainly to FIG. 7).

If the user stops turning the target object 2, it is determined to initialize, for example, the display position of the related virtual object 4 (No in Step 409), and an initialization process is executed (Step 410). In the initialization process, for example, as illustrated on the right in FIG. 7, values of the display parameters of the related virtual object 4 are initialized to those that are preset before the target object 2 is turned. With this, an initial external appearance before the user 1 picks up the target object 2 can be restored.

If the user has not stopped turning the target object 2, it is determined not to execute the initialization process (No in Step 409), and the interest determination process of Step 401 is executed again. In other words, if the user 1 has held an item (target object 2), and maintained the item turned, for example, the state in which the related virtual object 4 is displayed, or the state in which the related virtual object 4 is hidden is maintained. Then, at a subsequent timing, the procedure is executed again in accordance with the interest of the user 1.

Meanwhile, if the user 1 has released the target object 2 (Yes in Step 408), an end process is executed (Step 411). In the end process, all the related virtual objects 4 are hidden. Alternatively, as in the initialization process (refer to Step 410), how all the related virtual objects 4 are displayed is initialized. In addition, there is no limitation, for example, on specific content of the end process, and arbitrary processes of ending the display control of the related virtual object 4 may be executed.

In such a way, in the action detection procedure shown in FIG. 12, the action to be induced by the displayed related-virtual object 4 (content) (induced movement) is detected, and the interest targets for the user 1 are distinguished from each other on the basis of the action. Then, in accordance with the interest targets distinguished from each other, for example, the process of displaying the content or the process of hiding the content is executed as appropriate. With this, the content and information about the item, each of which is to be the interest target for the user 1, can be naturally presented to the user 1.

For example, the processes of determining the gesture and identifying the gazing point P (Steps 301 and 302), which are described with reference to FIG. 6, are executed by executing Steps 401, 402, 403, and 406 in FIG. 12. In addition, the process of increasing the information amount of the related virtual object 4 (Step 303) is executed, for example, as the content selection procedure (Step 404). The process of reducing the information amount of the related virtual object 4 (Step 304) is executed, for example, as the content deselection procedure in FIG. 12 (Step 405 or 407).

Figure 15:
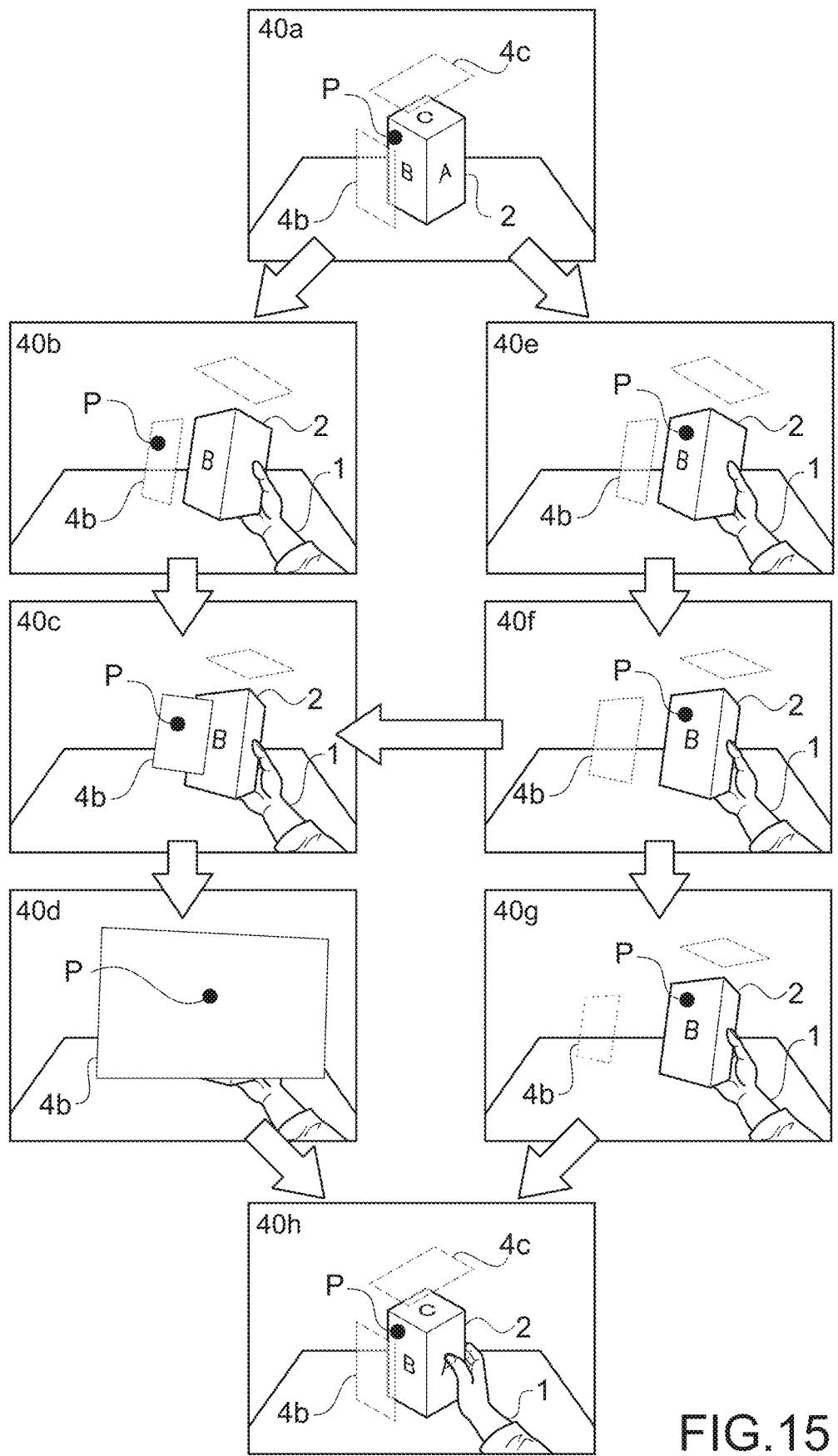
FIG. 15 A schematic view illustrating an operation procedure in the lateral UI.

FIG. 15 is a schematic view illustrating an example of an operation procedure in the lateral UI. FIG. 15 schematically illustrates eight field-of-view images 40 (40a to 40h) depicting the field of view of the user 1. Hereinbelow, with reference to all the field-of-view images 40a to 40h, the operation procedure in the lateral UI is described. Note that, solid circles in the field-of-view images 40 each indicate the gazing point P of the user 1. The gazing point P is not displayed in a real procedure.

The field-of-view image 40a is one of the field-of-view images 40 as viewed from the user 1 under a state in which the target object 2 is included in the field of view of the user (imaging range of the outer camera 13). In the field-of-view image 40a, the target object 2 that has the rectangular-parallelepiped shape and that is put with its bottom surface facing down on a desk is detected, and two related virtual objects 4b and 4c are displayed around the target object 2.

The related virtual object 4b is displayed near a lateral surface B of the target object 2 in the rectangular-parallelepiped shape. Meanwhile, the related virtual object 4c is displayed near a top surface C of the target object 2 in the rectangular-parallelepiped shape. Note that, in FIG. 15, respective display positions, arrangement angles, and the like of the related virtual objects 4b and 4c are schematically illustrated. Actually, both the related virtual objects 4b and 4c are displayed in accordance with the arrangement described mainly with reference to FIGS. 7, 8, 9, 10, 11A, and 11B.

As depicted in the field-of-view image 40b, at a time point when the user 1 picks up the target object 2, the gazing point P of the user 1 is present on the related virtual object 4b (display region 5). In this state, the lateral surface B has not yet been brought to the front of the user 1, and it has not yet been determined that the turning movement has been made.

As depicted in the field-of-view image 40c, if the user 1 turns the target object 2 while viewing the related virtual object 4b such that the lateral surface B comes to the front, although the lateral surface B has not perfectly come to the front, transparency of the related virtual object 4b is reduced. With this, content is more easily viewed. In addition, the arrangement (angle) of the related virtual object 4b is adjusted such that the related virtual object 4b comes to the front of the user 1. In such a way, the preparation process (refer to Step 504 in FIG. 13) is executed for displaying the related virtual object 4b.

In the field-of-view image 40d, on a premise that the interest target for the user 1 is the related virtual object 4b, the related virtual object 4b is enlarged, and content or the like is reproduced in front of the user 1. For example, a texture of the related virtual object 4b, which is a still image until then, is switched to a moving image, and, for example, a video movie relating to the target object 2 is reproduced. In such a way, if the interest amount of the user 1 exceeds a certain amount, the determination accompanying process (such as content reproduction process) (refer to Step 503 in FIG. 13) is executed for displaying the related virtual object 4*b*. Note that, during the execution of the determination accompanying process, for example, the related virtual object 4*c* is hidden.

Note that, for example, if the gazing point P of the user 1 is directed to an outside of the related virtual object 4*b*, or if the target object 2 is turned back, the content reproduction or the like is stopped, and the operation procedure returns to a state of the preparation process as depicted in the field-of-view image 40*c*. Further, as depicted in the field-of-view image 40*h*, if the user 1 makes a gesture of, for example, putting the target object 2 onto the desk and releasing the target object 2, the display positions of the related virtual objects 4*b* and 4*c* are initialized.

Still further, as depicted in the field-of-view image 40*e*, if the user 1 in the initial state depicted in the field-of-view image 40*a* picks up the target object 2 while viewing the lateral surface B (non-display region 6), in the state immediately after the user 1 has picked up the target object 2, as in the field-of-view image 40*b*, it has not yet been determined, for example, whether or not the turning movement has been made.

As depicted in the field-of-view image 40*f*, if the user 1 turns the target object 2 while viewing the lateral surface B of the target object 2 such that the lateral surface B comes to the front, the interest target for the user 1 is discriminated as the lateral surface B (target object 2), and the preparation process (Step 604 in FIG. 14) is executed for hiding the related virtual object 4. For example, the related virtual object 4 is slid in a direction away from the lateral surface B, and is transparentized by being increased in transparency (fade-out process). Also during this process, the gazing point P of the user 1 interested in the target object 2 remains directed to the lateral surface B.

Note that, the turning in the field-of-view images 40*a*, 40*e*, and 40*f* is performed such that the lateral surface B comes to the front. Thus, for example, the fade-out process or the like is not executed on the related virtual object 4*c* arranged near the top surface C, and the related virtual object 4*c* continues to be displayed as it is. With this, for example, if the user 1 has become interested in the related virtual object 4*c*, the display control can be performed as appropriate such that its content is displayed.

As depicted in the field-of-view image 40*g*, on a premise that the gazing point P of the user 1 remains on the lateral surface B, it is determined that an amount of the interest in the related virtual object 4*b* is smaller than a certain value, and the deselection accompanying process (Step 603 in FIG. 14) is executed. As a result, the related virtual object 4*b* is perfectly hidden, which enables the user 1 to concentrate on viewing, for example, the content printed on the lateral surface B of the target object 2.

For example, once the user 1 takes his/her eyes off the lateral surface B, the related virtual object 4*b* and the like may be displayed again. Meanwhile, if the target object 2 is returned onto the desk, the related virtual objects 4*b* and 4*c* are displayed at the display positions in the initial state (field-of-view image 40*h*).

Note that, as depicted in the field-of-view image 40*f*, while the target object 2 is being turned, the gazing point P of the user 1 (dotted circle in the image) may slide from the lateral surface B toward the related virtual object 4*b* to fade out. In this case, the user 1 is highly likely to be interested in the related virtual object 4*b*, and the amount of the interest of the user 1 in the related virtual object 4*b* increases.

For example, if the interest amount exceeds the certain amount for a reason that the related virtual object 4 is gazed at for a long time period, the fade-out process is cancelled, and the preparation process for displaying the related virtual object 4*b* is started. In other words, the transparentized related-virtual object 4*b* is explicitly displayed again, that is, the state depicted in the field-of-view image 40*f* shifts to the state depicted in the field-of-view image 40*c*.

In such a way, by moving one of the interest targets (related virtual object 4), which one is the interest target for the user 1 can be distinguished with high accuracy. With this, for example, even under a state in which it is difficult to distinguish the interest targets from each other on the basis of the position of the gazing point P, or even if the interest target for the user 1 is switched halfway, desired information (related virtual object 4*b* or lateral surface B) can be properly presented. As a result, information in which the user 1 is interested can be naturally presented.

[Removing UI]

A UI on which how the related virtual object 4 is displayed is controlled in response to a gesture by the user 1 of removing a real object being the target object 2 (hereinafter, abbreviated as removing UI) is described. The removing UI is designed to induce the gesture of removing the target object 2, that is, moving the target object 2.

Figure 16:
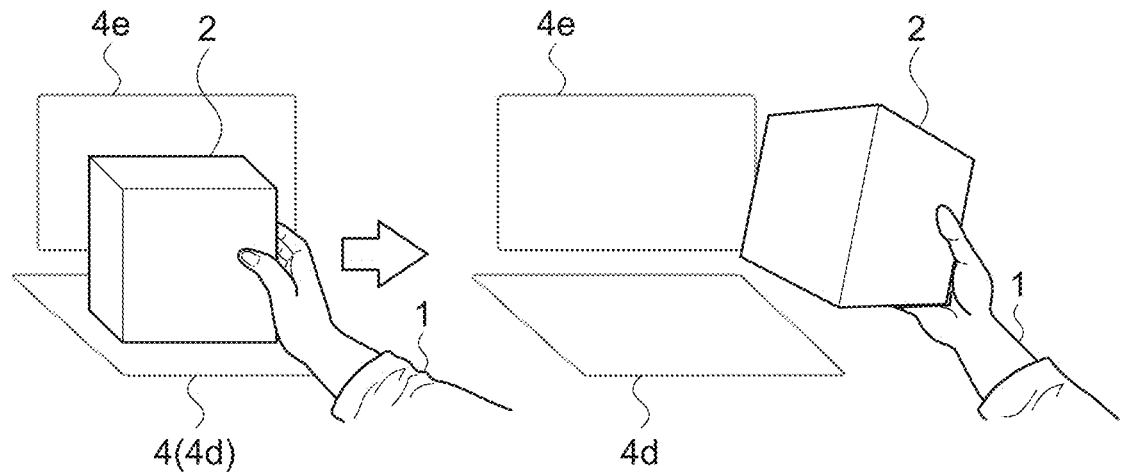
FIG. 16 A schematic view illustrating an example of how a removing UI is displayed.

FIG. 16 is a schematic view illustrating an example of how the removing UI is displayed. Respectively on the left and the right in FIG. 16, states before and after the target object 2 is removed are schematically illustrated. In addition, in the example illustrated in FIG. 16, two related virtual object 4*d* and 4*e* are displayed around one target object 2.

In an initial state of the removing UI, the related virtual objects 4 are displayed to bring the user 1 to remove the target object 2. In order to bring the user 1 to remove the target object 2, a trigger to display the related virtual objects 4 at a timing before the user 1 picks up the target object 2 is needed. Thus, in the removing UI, for example, the related virtual objects 4 start to be displayed by a trigger of "detection of the target object 2."

The display parameters (such as arrangement, angle, shape, external appearance, and size) of each of the related virtual objects 4 are set to enable the user 1 to understand the content of the related virtual objects 4 to some extent, and to bring the user 1 to view the related virtual objects 4 in more detail. Specifically, of these display parameters, the arrangements are made to make it difficult to view the details of the related virtual objects 4 without removing the target object 2. It is conceivable that the gesture of removing (moving) the target object 2 can be induced in this way.

Specifically, the related virtual objects 4 are arranged under and behind the target object 2. In other words, the related virtual objects 4 are arranged at positions of being covered with the target object 2. In the example illustrated on the left in FIG. 16, the related virtual objects 4*d* and 4*e* are arranged respectively under and behind the target object 2. Note that, respective external appearances (shapes) of the related virtual objects 4*d* and 4*e* are set as appropriate such that it can be understood that the related virtual objects 4*d* and 4*e* are covered with the target object 2.

By arranging the related virtual objects 4 under and behind the target object 2 in such a way, the related virtual objects 4 can be displayed with their content intentionally hidden. This makes it possible, for example, to induce the user 1 interested in the content of the related virtual objects 4 to make the movement of removing the target object 2.

Note that, in the removing UI, while the gesture of moving the target object 2 is being made (as on the right in FIG. 16), for example, display positions of the related virtual objects 4 are changed from the initial display positions. Thus, unlike the above-described lateral UI, in the removing UI, the display control of, for example, localizing the related virtual objects 4, for example, to the lateral surfaces of the target object 2 is not performed.

In addition, in the removing UI, it is determined whether the user 1 has become interested in the target object 2 itself in his/her hand, or become interested in the related virtual objects 4 (content). This distinguishment between the interest targets is performed by discriminating whether the user 1 has made the movement of removing the target object 2, and what the user 1 is viewing at that time.

For example, if the user 1 does not view the related virtual objects 4 at a time of picking up the target object 2, it is estimated that the user 1 has been uninterested in the related virtual objects 4 for a reason that the user 1 has been interested in the target object 2 itself, the user 1 merely wants to change the position of the target object 2, or other. Thus, in this case, the related virtual objects 4 (content) are faded out. This process enables observation of the target object 2 not to be hindered when the user 1 is interested in the target object 2 itself, and enables the related virtual objects 4 to be presented only when the user 1 is interested in the related virtual objects 4.

Figure 17:
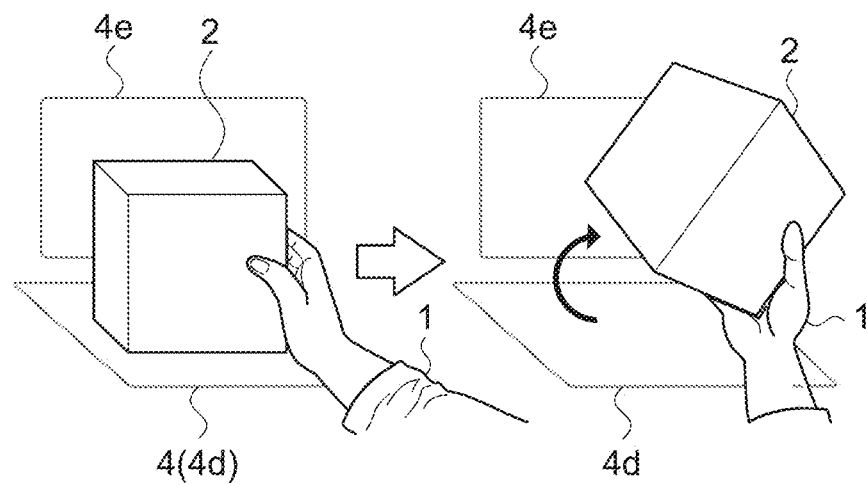
FIG. 17 A schematic view illustrating another example of how the removing UI is displayed.

FIG. 17 is a schematic view illustrating another example of how the removing UI is displayed. Respectively on the left and the right in FIG. 17, states before and after the target object 2 is tilted are schematically illustrated. As illustrated in FIG. 17, merely by tilting the target object 2, for example, a display area of the covered related-virtual objects 4 can be increased.

The removing UI is applicable also to a case where such a gesture of tilting the target object 2 is made. For example, by discriminating what the user 1 is looking while the user 1 is making the tilting movement, the interest targets can be distinguished from each other. In such a way, the removing UI is applicable not only to the case where the related virtual objects 4 and the target object 2 are spaced away from each other (refer to FIG. 16), but also to arbitrary gestures of cancelling the covering, such as the gesture of tilting the target object 2.

Now, with reference as appropriate to the flowcharts shown in FIG. 4 to FIG. 6 and FIG. 12 to FIG. 14, how the related virtual objects 4 are displayed is controlled in the removing UI is described. Note that, redundant description of the processes and the like common to those in the above-described lateral UI may be omitted.

First, the virtual-object arrangement procedure is started (Step 101 in FIG. 4), and initial states of the related virtual objects 4 are set. In the virtual-object arrangement procedure, the target object 2 is detected, and the virtual object 3 relating to this target object 2 is detected (Steps 201 and 202 in FIG. 5).

In the removing UI, as the process of detecting the target object 2, it is determined that the target object 2 is detected, for example, if the user 1 and the target object 2 approach each other, or if the user 1 gazes at the target object 2. With this, the related virtual objects 4 can be displayed before the user 1 picks up the target object 2.

In the process of arranging the related virtual objects 4 (Step 203 in FIG. 5), the related virtual objects 4 are arranged under and behind the target object 2. For example, the shape of the target object 2 is identified, and positions of its back surface and bottom surface are detected. The display regions 5 are set for displaying the related virtual objects 4 in planes respectively including these back surface and bottom surface.

In addition, as the process of setting, for example, the shapes of the related virtual objects 4 (Step 204 in FIG. 5), a process for displaying the related virtual objects 4 in a manner that the related virtual objects 4 are covered is executed. In this case, in the initial states (at a time point of starting presentation), the shapes of the related virtual objects 4 (display regions 5) are set such that a part of a region of each of the related virtual objects 4 can always be visually recognized by the user 1 even while the related virtual objects 4 are covered.

For example, if the related virtual object 4 is arranged behind the target object 2, a scale (size) is adjusted such that a lateral width of the related virtual object 4 is larger than a lateral width of the target object 2. Meanwhile, for example, if the related virtual object 4 is arranged under the target object 2, the scale of the related virtual object 4 is adjusted to a size of protruding from peripheries of the bottom surface of the target object 2. Alternatively, the related virtual object 4 arranged under the target object 2 may be displayed by using, for example, animation that demonstrates a state in which the related virtual object 4 cannot pop out by being sandwiched by the target object 2.

In such a way, in the initial state of the removing UI, behind and under the target object 2, the display regions 5 are each set to have a shape that demonstrates the state in which a corresponding one of the related virtual objects 4 is covered with the target object 2. These display region 5 correspond to the first regions related to the target object. Note that, as described below, the positions and the shapes of the display regions 5 (related virtual objects 4) vary in response to the gesture by the user 1 or in accordance with the position of his/her gazing point P.

After the virtual-object arrangement procedure has been ended, the action detection procedure is started (Step 102 in FIG. 4). In the action detection procedure, for example, it is determined whether or not the user 1 has made the predetermined gesture (Step 301 in FIG. 6). In the removing UI, the predetermined gesture is the gesture of moving the target object 2.

If it is determined that the user 1 has made the gesture of moving the target object 2 (Yes in Step 301), it is determined whether or not the gazing point P of the user 1 is present on one of the related virtual objects 4 (Step 302). Note that, if it is determined that the user 1 has not made the moving gesture (No in Step 301), the action detection procedure is ended.

If the gazing point P of the user 1 is present on the one of the related virtual objects 4 (Yes in Step 302), the process of increasing an information amount of the one of the related virtual objects 4 is executed (Step 303). Specifically, if the gazing point P of the user 1 is present in the display region 5 while the user 1 is making the gesture of moving the target object 2, the display 11 is controlled such that the information amount of the one of the related virtual objects 4 is increased.

In addition, if the gazing point P of the user 1 is absent from the one of the related virtual objects 4 (No in Step 302), the process of reducing the information amount of the one of the related virtual objects 4 is executed (Step 304). Specifically, if the gazing point P of the user 1 is present in the non-display region 6 out of the display region 5 while the user 1 is making the gesture of moving the target object 2, the display 11 is controlled such that the information amount of the one of the related virtual objects 4 is reduced.

Figure 18:
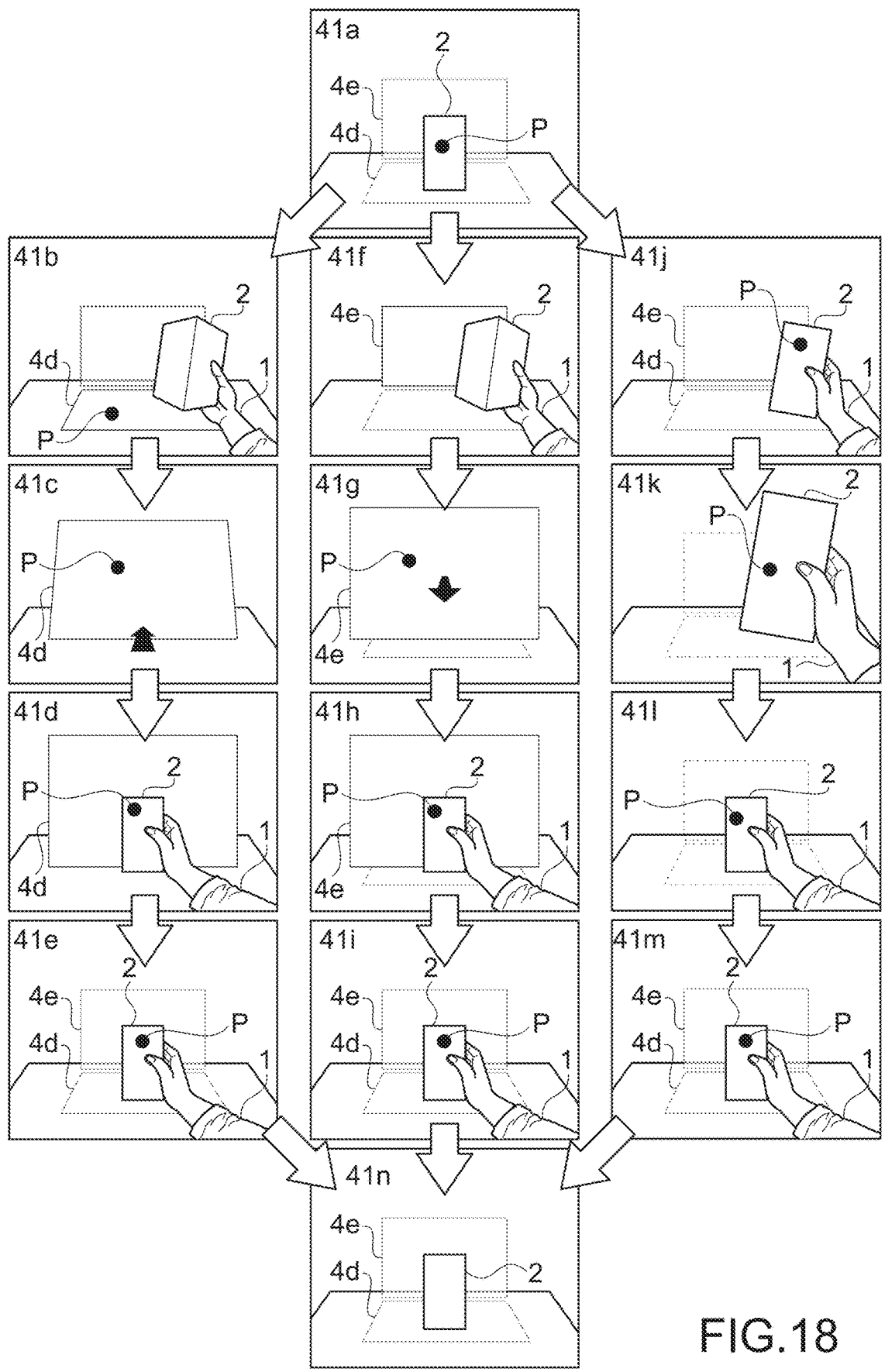
FIG. 18 A schematic view illustrating an example of an operation procedure in the removing UI.

FIG. 18 is a schematic view illustrating an example of an operation procedure in the removing UI. FIG. 18 schematically illustrates eighteen field-of-view images 41 (41a to 41n) depicting the field of view of the user 1. Hereinbelow, with reference to all the field-of-view images 41a to 41n, the operation procedure in the removing UI is described. Note that, solid circles in the field-of-view images 41 each indicate the gazing point P of the user 1. The gazing point P is not displayed in a real procedure.

The field-of-view image 41a is one of the field-of-view images 41 as viewed from the user 1 under the state in which the target object 2 is included in the field of view of the user 1 (imaging range of the outer camera 13). In the field-of-view image 41a, the target object 2 that has the rectangular-parallelepiped shape and that is put with its bottom surface facing down on a desk is detected. Under and behind the target object 2, the two related virtual objects 4d and 4e are displayed in the manner of being covered with the target object 2.

As depicted in the field-of-view image 41b, at a time when the user 1 picks up the target object 2, the gazing point P of the user 1 is present on the related virtual object 4d (display region 5) arranged below. In such a case, for example, the process of increasing an information amount of the related virtual object 4d is executed. In the field-of-view image 41c, the related virtual object 4d increased in information amount is schematically depicted.

As the process of increasing the information amount, for example, the content selection procedure shown in FIG. 12 and FIG. 13 is executed. In the content selection procedure, the interest amount is estimated on the basis of, for example, how long the related virtual object 4d (content) has been gazed at (Step 501 in FIG. 13). In addition, depending on the estimated interest amount, the determination accompanying process (Step 503) and the preparation process (Step 504) are executed.

For example, if the interest amount is smaller than a certain amount, as the preparation process, the related virtual object 4d is adjusted in position, orientation, size, and transparency such that the related virtual object 4d is gradually explicitly displayed. In addition, in the preparation process, the related virtual object 4d is enlarged toward the user 1. In other words, the information amount of the related virtual object 4d is continuously increased. Meanwhile, if the interest amount exceeds the certain amount, for example, the transparency of the related virtual object 4d is set to zero. Alternatively, watching resolution is set, and content reproduction or the like is started.

If the target object 2 is returned to its initial position as depicted in the field-of-view image 41d, the content reproduction or the like is stopped. Then, as depicted in the field-of-view image 41e, a process of initializing a state of the related virtual object 4d is executed. For example, the related virtual object 4d is increased in transparency and reduced to move away from the user 1. In addition, the related virtual object 4d is changed, for example, in arrangement angle to be flush with the bottom surface of the target object 2. For example, if a video movie or the like has been reproduced as the content, a process of, for example, stopping the reproduction at a time point when the target object 2 is returned to the arrangement position in the initial state is executed.

As depicted in the field-of-view image 41n, under a state in which the target object 2 has been returned to the initial position and released by the user 1, the related virtual objects 4d and 4e are displayed while covered as in the initial state again. Note that, the state need not necessarily be initialized, and, for example, a process of hiding all the related virtual objects 4 may be executed.

As depicted in the field-of-view image 41f, in such a case where the gazing point P of the user 1 is present on the related virtual object 4e (display region 5) displayed behind at the time when the user 1 picks up the target object 2, for example, the content selection procedure is executed for increasing an information amount of the related virtual object 4e. Specifically, as depicted in the field-of-view image 41g, the related virtual object 4e is reduced in transparency (increased in opacity), and is enlarged toward the user 1. Then, the content reproduction or the like is started.

In addition, if the target object 2 is returned to the initial position as depicted in the field-of-view image 41h, the related virtual object 4e is moved back to the initial position and changed in transparency as depicted in the field-of-view image 41i. Then, if the target object 2 is released, the state of the related virtual object 4d and a state of the related virtual object 4e are initialized such that the related virtual objects 4d and 4e are displayed while covered (field-of-view image 41n).

As depicted in the field-of-view image 41j, if the gazing point P of the user 1 is present on the front surface of the target object 2 (non-display region 6) at the time when the user 1 picks up the target object 2, the interest target for the user 1 is determined as the target object 2, and the process of reducing the information amounts of the related virtual objects 4d and 4e is executed.

As the process of reducing the information amounts, for example, the content deselection procedure shown in FIG. 12 and FIG. 13 is executed. In the content deselection procedure, the amounts of interest in the related virtual objects 4d and 4e (content) are estimated (Step 601 in FIG. 14), and depending thereon, the deselection accompanying process (Step 603) and the preparation process (Step 604) are executed. Note that, these processes are executed on each of the related virtual objects 4d and 4e.

For example, if the interest amounts are each larger than a certain amount, as the preparation process, a process such as the fade-out process is executed such that the related virtual objects 4d and 4e are gradually hidden. In other words, the information amounts of the related virtual objects 4d and 4e are continuously reduced. Meanwhile, if the interest amounts are each smaller than the certain amount, it is determined that the interest in the related virtual objects 4d and 4e has been substantially lost, and the deselection accompanying process is executed. With this, the related virtual objects 4d and 4e are set to be hidden. In the field-of-view image 41k, outer frames of the hidden related virtual objects 4d and 4e are schematically indicated by dotted lines. Note that, actually, the dotted lines and the like as the outer frames are not displayed.

If the target object 2 is returned to the initial position as depicted in the field-of-view image 41l, a fade-in process of causing the related virtual objects 4d and 4e to be gradually explicitly displayed such that the states of the related virtual objects 4d and 4e are initialized is executed as depicted in the field-of-view image 41m. For example, the transparency of each of the related virtual objects 4d and 4e that are perfectly transparent (for example, transparency of 100%) is gradually reduced to its initial value.

In such a way, in the removing UI, on the basis of where the gazing point P of the user 1 is present, that is, what the user 1 is viewing at the time when the user 1 moves the target object 2, the interest targets are distinguished from each other. Then, in accordance with the interest targets, the removing UI shifts, for example, to a corresponding one of the procedure of displaying the related virtual object 4b (field-of-view images 41b to 41e), the procedure of displaying the related virtual object 4b (field-of-view images 41f to 41i), and the procedure at the time of viewing the target object 2 itself (field-of-view images 41j to 41m).

Interaction in the removing UI is designed, for example, through the movement by the user 1 of "making visible something that I want to view but I can't (≈removing obstacles)." In this case, a movement of, for example, making the targets to be viewed (such as target object 2 and related virtual object 4) invisible can be set as a timing at which the interest is lost. Specifically, in the example illustrated in FIG. 18, on the basis of "hiding the content by returning the target object 2 to its original position," it can be discriminated that the interest in the related virtual objects 4 has been lost.

Note that, when the target object 2 is removed, whether the target object 2 itself remains held or the target object 2 is put somewhere cannot be uniquely estimated. Thus, if the target object 2 is merely released, it is not determined that the interest has been lost. Specifically, for example, in the field-of-view images 41c and 41g in FIG. 18, whether or not the user 1 is holding the target object 2 is not employed as a trigger to display/hide the related virtual objects 4. Meanwhile, if there is a certain distance or longer from the target object 2, it is determined that the interest in the target object 2 and the related virtual objects 4 therearound has been lost. Then, all the content is stopped and hidden.

In addition, it is conceivable to detect, as the timing at which the interest is lost, a gesture by the user 1 of, for example, "moving his/her head to an extent that the content gets out of his/her field of view." Specifically, this gesture of "moving his/her head to an extent that the content gets out of his/her field of view" is a movement that the user makes 1, for example, in leaving. It is conceivable that this gesture is suited to a method of determining whether the interest in the target object 2 has been lost.

Meanwhile, it is conceivable that, in a case where, for example, the content is displayed in front of the user 1 (for example, FIG. 18), the movement of the head to the extent that the content becomes invisible is unlikely to be made. For example, even if the interest in the content displayed in front of the user 1 has been lost, the user 1 is highly likely to have still been interested in other content or the target object 2 itself. In that case, the user 1 looks next at the other content or the target object 2 itself, and it is uncertain whether the content in front, which the user 1 is watching at this timing, gets out of the field of view. In addition, a case where, for example, the content that the user 1 is watching and the other content are present in the same direction, it may be difficult to discriminate whether the interest target has switched to another one.

As a countermeasure, in the removing UI, it is conceivable to also use such display control of the related virtual objects 4 as to induce the movement of the head (head gesture). Specifically, for example, in the content deselection procedure shown in FIG. 14, a determination that the related virtual objects 4 are hidden is made on the basis of, for example, whether or not the head gesture has been made. In addition, for example, in the interest discrimination process (Step 401) shown in FIG. 12, the interest target is discriminated on the basis of, for example, whether or not the head gesture has been made.

Figure 19:
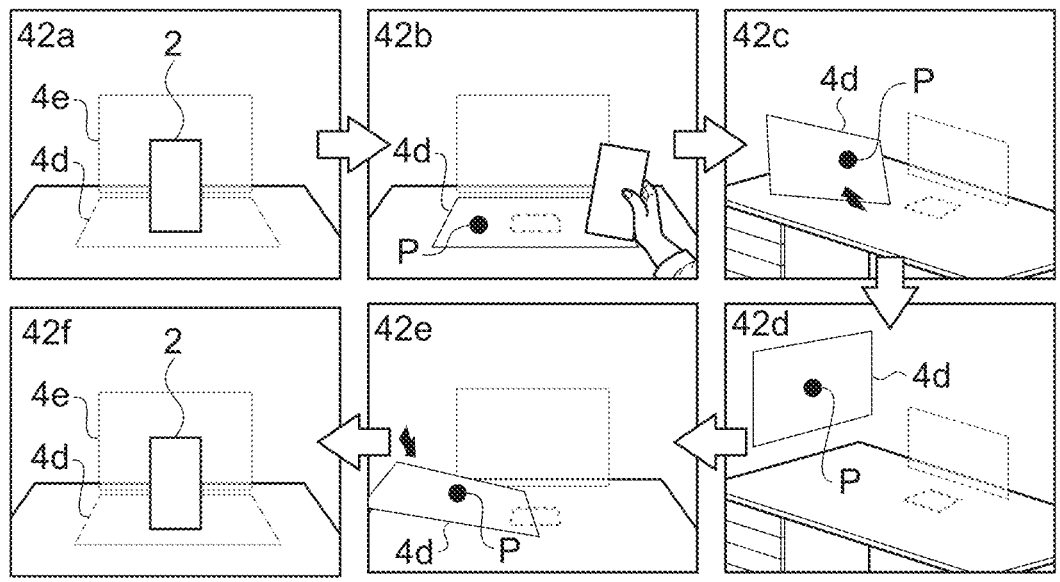
FIG. 19 A schematic view illustrating another example of the operation procedure in the removing UI.
Figure 20:
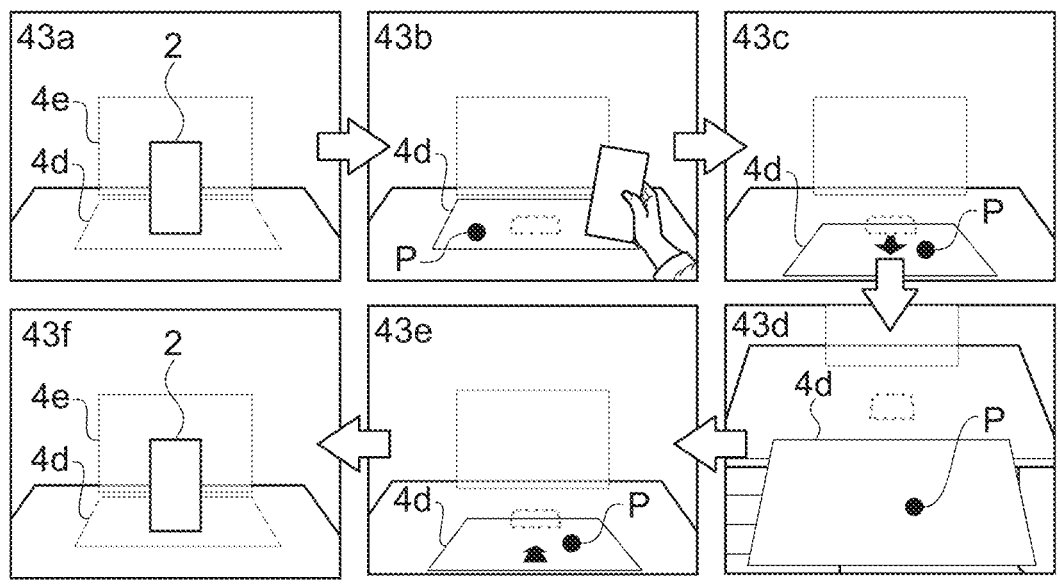
FIG. 20 A schematic view illustrating a still another example of the operation procedure in the removing UI.

FIG. 19 and FIG. 20 are each a schematic view illustrating another example of the operation procedure in the removing UI. In FIG. 19, how the related virtual objects 4 are displayed is controlled to induce the user 1 to make the head gesture of turning his/her head.

For example, in an initial state (field-of-view image 42a) in which the related virtual objects 4d and 4e are displayed under and behind the target object 2, if the gazing point P of the user 1 is present on the related virtual object 4d arranged under, and in this state, if the user 1 makes the gesture of moving the target object 2, the process of increasing the information amount of the related virtual object 4d is started (field-of-view image 42b).

The related virtual object 4d is moved from a horizontal plane in front of the user 1 (field-of-view image 42c), and is displayed in a perpendicular plane on the left of the user 1 (field-of-view image 42d). It is conceivable that, at this time, the user 1 interested in the related virtual object 4d not only keeps sight of the related virtual object 4d, but also turns his/her head to the left such that the related virtual object 4d is displayed in front. In other words, by intentionally moving the display position of the related virtual object 4 to a position where it is difficult for the user 1 viewing the front to view this related virtual object 4, the head gesture by the user 1 of moving his/her head is induced.

For example, the amount of the interest in the related virtual object 4d is estimated by detecting this head gesture of moving the head. With this, by using both the gazing point P of the user 1 and the head gesture, the interest targets for the user 1 can be discriminated from each other. As a result, the interest targets can be distinguished from each other with high accuracy. Note that, if the head gesture is not induced at this timing, a content presentation process (the determination accompanying process) such as the movie reproduction is not executed.

In addition, it is conceivable that, if the user 1 has lost the interest in the related virtual object 4d, the user 1 turns the head to the front, or makes a movement of, for example, looking away from the content. In other words, if the user 1 turns the head at a timing of finishing viewing the related virtual object 4d, a situation where the content gets out of the field of view occurs. In this way, the loss of the interest in the content can be demonstrated in a natural manner.

In this case, not only deviation of the gazing point P from the related virtual object 4d, but also the head gesture of, for example, turning the head back to the front is detected. By detecting these movement of the gazing point P and head gesture, it can be easily determined that the interest in the related virtual object 4d has been lost.

If it is determined that the interest has been lost, the arrangement position of the related virtual object 4d is initialized (field-of-view image 42e). Then, if the target object 2 is returned to its original position, the related virtual objects 4d and 4e are brought into their initial states (field-of-view image 42f) again.

In FIG. 20, how the related virtual objects 4 are displayed is controlled to induce the user 1 to make the head gesture of tilting his/her head. For example, if the gazing point P is present on the related virtual object 4d in the initial state (field-of-view image 43a) as in FIG. 19, and in this state, if the user 1 makes the gesture of moving the target object 2, the process of increasing the information amount of the related virtual object 4d is started (field-of-view image 43b).

The related virtual object 4d is moved from the horizontal plane in front of the user 1 (field-of-view image 43c), and is displayed horizontally before the user 1 (field-of-view image 43d). More specifically, in order that the related virtual object 4*d* is displayed within reach of the user 1, a process of enlarging the related virtual object 4*d* in the horizontal state is executed.

It is conceivable that, at this time, the user 1 interested in the related virtual object 4*d* turns his/her head downward such that the related virtual object 4*d* is displayed in front. By moving the display position of the related virtual object 4 into the reach of the user 1 in such a way, the head gesture by the user 1 of tilting his/her head is induced. For example, the amount of the interest in the related virtual object 4*d* is estimated by detecting this head gesture of tilting the head. With this, the interest targets can be distinguished from each other with high accuracy.

In addition, it is conceivable that, if the user 1 has lost the interest in the related virtual object 4*d*, the user 1 looking downward makes a movement of lifting his/her head to the front. By detecting the head gesture of lifting the head to the front in such a way, it can be easily detected that the interest in the related virtual object 4*d* has been lost. If it is determined that the interest has been lost, the arrangement position of the related virtual object 4*d* is initialized (field-of-view image 43*e*), whereby the related virtual object 4*d* is brought into its initial state (field-of-view image 43*f*) again.

By moving the related virtual object 4 into the reach of the user 1 in such a way, the user 1 can, for example, visually perceive the related virtual object 4 within his/her personal space that is free from interference from others. This enables the user 1, for example, to naturally watch the content and the like without caring about others, and hence excellent usability can be provided.

[Grabbing UI]

A UI on which how the related virtual object 4 is displayed is controlled in response to a gesture by the user 1 of grabbing a real object being the target object 2 (hereinafter, abbreviated as grabbing UI) is described.

Figure 21:
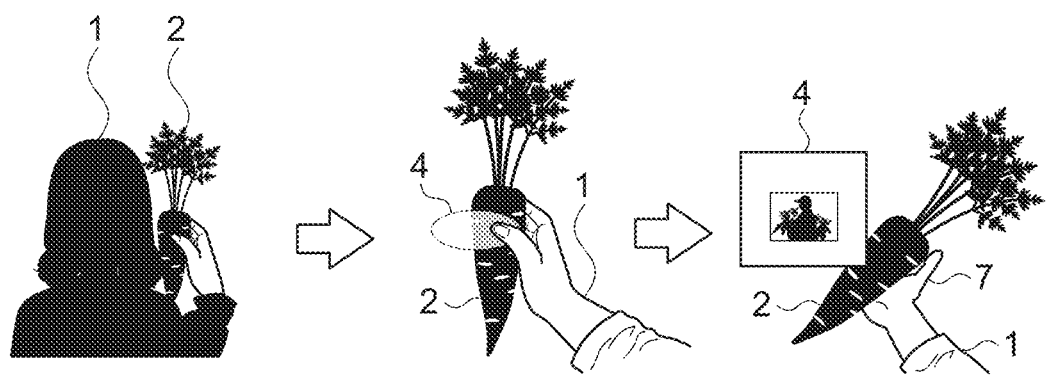
FIG. 21 A schematic view illustrating an example of how a grabbing UI is displayed.

FIG. 21 is a schematic view illustrating an example of how the grabbing UI is displayed. How the related virtual object 4 is displayed in the schematic illustration of FIG. 21 is that at time when the user 1 grabs the target object 2 (carrot). The grabbing UI illustrated in FIG. 21 is designed, for example, to induce a gesture of releasing a thumb when the target object 2 is grabbed.

In the example illustrated in FIG. 21, after the user 1 has grabbed the target object 2, the related virtual object 4 starts to be displayed. If the user 1 grabs the target object 2 (left in FIG. 21), the gesture of grabbing the target object 2 is recognized on the basis of, for example, the images taken by the outer camera 13. At this time, for example, an arrangement of each of the fingers of the user 1 is detected. In addition, a process of recognizing the target object 2 that the user 1 has grabbed is executed.

If the gesture of grabbing the target object 2 is recognized, the related virtual object 4 relating to the target object 2 is arranged (refer to Steps 203 and 204 in FIG. 5). As illustrated in a center part of FIG. 21, in the grabbing UI, the related virtual object 4 is arranged behind a thumb 7 of the user 1. For example, the related virtual object 4 is arranged at a position where the thumb 7 is held in touch with the target object 2. In addition, a shape of the related virtual object 4 is set as appropriate such that the related virtual object 4 is displayed under a state of being sandwiched between the thumb 7 and the target object 2.

As a result, the user 1 grabbing the carrot (target object 2) visually perceives the related virtual object 4 covered with the thumb 7. Thus, it is conceivable that, for example, if the user 1 has been interested in the related virtual object 4, the user 1 makes the gesture of shifting the thumb 7. In other words, the user 1 is highly likely to open his/her hand in a manner of separating the thumb 7 from the target object 2 so as to view the related virtual object 4 in more detail.

In the grabbing UI, if the gazing point P of the user 1 is present on the related virtual object 4 (display region 5) while the user 1 is making the gesture of shifting the thumb 7, the information amount of the related virtual object 4 is increased (refer to Step 303 in FIG. 6). On the right in FIG. 21, content of the related virtual object 4 (such as information about a producer of the carrot), which is displayed by opening the thumb 7, is schematically illustrated. With this, detailed content of the related virtual object 4 can be presented to the user 1 interested in the same.

Meanwhile, if the gazing point P of the user 1 is present on the target object 2 (non-display region 6) while the user 1 is making the gesture of shifting the thumb 7, the information amount of the related virtual object 4 is reduced (refer to Step 304 in FIG. 6). For example, if the user 1 opens his/her thumb while viewing the carrot, for example, a process of hiding the related virtual object 4 is executed as appropriate. As a result, if the user 1 has been uninterested in the related virtual object 4, the user 1 can view, for example, a surface of the carrot being the target object 2 in detail.

In such a way, in the grabbing UI, the display 11 is controlled such that a part of the related virtual object 4 is covered with the hand of the user 1 before the gesture of shifting the thumb 7 is made. With this, the user 1 interested in the related virtual object 4 can be induced to make the gesture of shifting the thumb 7.

In addition, from the gazing point P of the user 1 making the gesture of shifting the thumb 7, it can be discriminated which of the related virtual object 4 and the target object 2 is the interest target. As a result, whether to display/hide the related virtual object 4 can be switched with high accuracy, and information in which the user 1 is interested can be naturally presented.

Figure 22:
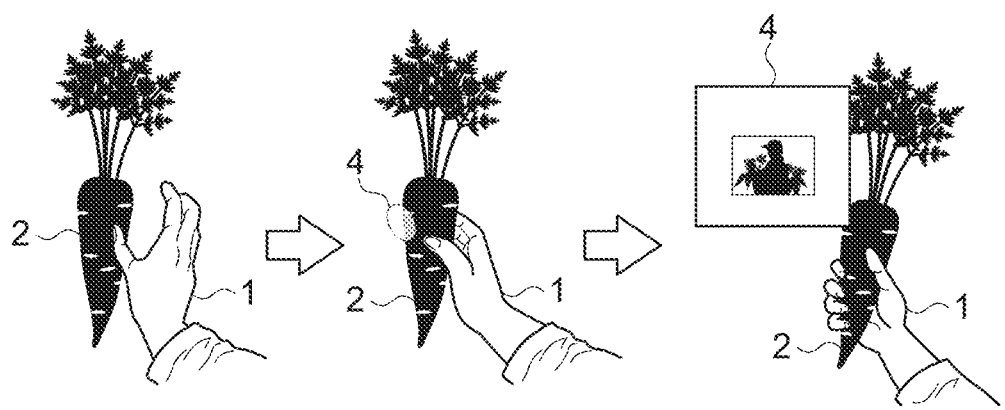
FIG. 22 A schematic view illustrating another example of how the grabbing UI is displayed.

FIG. 22 is a schematic view illustrating another example of how the grabbing UI is displayed. The grabbing UI illustrated in FIG. 22 is designed, for example, to induce the gesture of turning the target object 2 when the target object 2 (carrot) is grabbed.

For example, as illustrated on the left in FIG. 22, if the user 1 grabs the target object 2 with his/her right hand (left in FIG. 22) under a state in which the related virtual object 4 has not yet been displayed, the related virtual object 4 is displayed obliquely on the left of the target object 2 (central part of FIG. 22). Note that, if the user 1 grabs the target object 2 with his/her left hand, the related virtual object 4 is displayed on the right of target object 2.

If the target object 2 is turned while the related virtual object 4 (display region 5) is being viewed, the information amount of the related virtual object 4 is increased, and its detailed content is displayed (right in FIG. 22). Meanwhile, if the target object 2 is turned while the target object 2 (non-display region 6) is being viewed, the information amount of the related virtual object 4 is reduced, and the related virtual object 4 is hidden. These processes are similar to those in the above-described lateral UI.

By displaying the related virtual object 4 as appropriate near the lateral surface of the target object 2 irrespective of, for example, a form of the target object 2 in such a way, the gesture of turning the target object 2 can be induced. In addition, on the basis of the position of the gazing point P of the user 1 making the gesture, the interest targets for the user 1 can be properly distinguished from each other.

Figure 23:
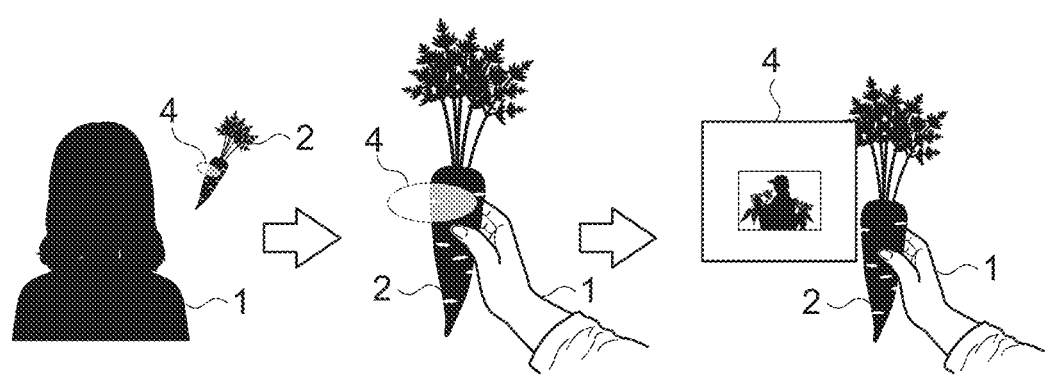
FIG. 23 A schematic view illustrating a still another example of how the grabbing UI is displayed.

FIG. 23 is a schematic view illustrating a still another example of how the grabbing UI is displayed. The grabbing UI illustrated in FIG. 23 is designed such that the gesture of grabbing the target object 2 (carrot) is made in accordance, for example, with which of the interest targets the user 1 grabs. More specifically, this UI is designed such that how the interest target is grabbed in a case where the user 1 has been interested in the related virtual object 4, and how the interest target is grabbed in a case where the user 1 has been interested in the target object 2 differ from each other.

As illustrated on the left in FIG. 23, the related virtual object 4 is displayed to overlap with a part of the target object 2 at a time point before the user 1 grabs the target object 2. In this case, it is conceivable that, if the user 1 has been interested in the related virtual object 4, the user 1 grabs the target object 2 in a manner that the overlapping related virtual object 4 is not hidden (center part of FIG. 23).

For example, if the gazing point P of the user 1 is present on the related virtual object 4 under the state in which the target object 2 is grabbed in the manner that the related virtual object 4 is not hidden, the related virtual object 4 is discriminated as the interest target, and its information amount is increased (right in FIG. 23).

Meanwhile, it is conceivable that, if the user 1 has been uninterested in the content of the related virtual object 4, the user 1 does not care even if the related virtual object 4 is hidden by his/her hand. Thus, if the target object 2 is grabbed in a manner that the related virtual object 4 is covered with the hand, for example, a process of hiding the related virtual object 4 by reducing its information amount is executed.

Note that, even when the target object 2 is grabbed without covering the related virtual object 4, if the gazing point P of the user 1 is absent from the related virtual object 4, the information amount of the related virtual object 4 is reduced. In contrast, even when the target object 2 is grabbed in the manner that the related virtual object 4 is covered, for example, if the gazing point P has been directed to the related virtual object 4 for a certain time period, the related virtual object 4 remains displayed. Such processes may be executed, for example.

As described above, the grabbing UI illustrated in FIG. 23 is also a UI that induces the user 1 to grab the interest target unconsciously in accordance with the interest targets. With this, information that the user 1 needs can be naturally presented.

Figure 24:
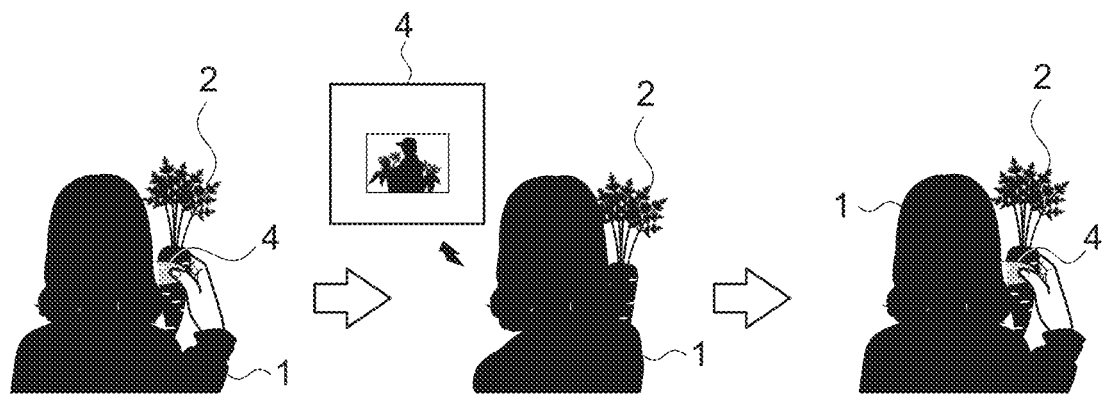
FIG. 24 A schematic view illustrating a yet another example of how the grabbing UI is displayed.

FIG. 24 is a schematic view illustrating a yet another example of how the grabbing UI is displayed. The grabbing UI illustrated in FIG. 24 is designed to induce the user 1 holding the target object 2 (carrot) to make a gesture of changing the orientation of his/her head (such as the gesture of turning the head or the gesture of tilting the head).

As illustrated on the left in FIG. 24, the related virtual object 4 is displayed under the state in which the target object 2 is held by the user 1. In this case, the related virtual object 4 is localized to be arranged as appropriate around the target object 2. In addition, if the gazing point P of the user 1 is present on the related virtual object 4, the information amount of the related virtual object 4 is increased.

In increasing the information amount, the display position of the related virtual object 4 is moved to a position out of the front of the user 1. For example, the position of the related virtual object 4 is moved to the left front or the right front of the user 1, into the reach of the user, or the like. At this time, it is conceivable that, if the user 1 has been interested in the related virtual object 4 to be moved, the user 1 makes the gesture of turning his/her head or the gesture of tiling the head in response to the movement of the target object 2.

If such a head gesture is made under the state in which the gazing point P of the user 1 is present on the related virtual object 4, the content of the related virtual object 4 is displayed in detail at a position out of the front of the user 1 (center part of FIG. 24). Meanwhile, it is conceivable that, if the user 1 has lost the interest in the related virtual object 4, the user 1 turns his/her head to the front (return the head to the original position). In this case, as illustrated on the right in FIG. 24, the process of initializing the state of the related virtual object 4 is executed.

The procedure illustrated in FIG. 24 is a procedure that induces the user 1 to make the head gestures as in the procedure in the removing UI described mainly with reference to FIG. 19 and FIG. 20. In such a way, even if the related virtual object 4 is displayed while localized to the target object 2 in the initial state, for example, the head gestures by the user 1 are induced. With this, for example, even if the target object 2 is small, and it is difficult, for example, to distinguish the interest targets from each other by using the gazing point P, the interest targets can be discriminated from each other with high accuracy.

Figure 25:
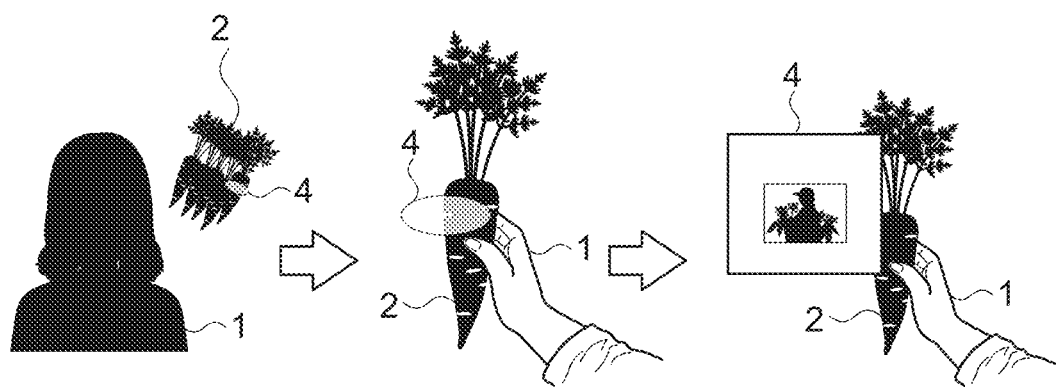
FIG. 25 A schematic view illustrating a yet another example of how the grabbing UI is displayed.

FIG. 25 is a schematic view illustrating a yet another example of how the grabbing UI is displayed. The grabbing UI illustrated in FIG. 25 is designed, for example, to induce a gesture of selecting and grabbing a certain one of a plurality of target objects 2 (carrots).

For example, if the user 1 approaches a place where the plurality of target objects 2 is displayed (such as vegetable section), as illustrated on the left in FIG. 25, the related virtual object 4 is displayed on one of the plurality of target objects 2. Note that, the target object 2 on which the related virtual object 4 is displayed may be arbitrarily set.

It is conceivable that, in such a state, if the user 1 has been interested in the related virtual object 4, the user 1 selects and grabs the target object 2 on which this related virtual object 4 is displayed (center part of FIG. 25). In this case, on the basis of the position of the gazing point P of the user 1, for example, the process of increasing the information amount of the related virtual object 4 is executed (right in FIG. 25).

Meanwhile, it is conceivable that, if the user 1 has been uninterested in the related virtual object 4, of the target objects 2, the user 1 selects and grabs another one on which the related virtual object 4 is not displayed. In this case, the related virtual object 4 is set to be hidden. If the plurality of target objects 2 is present in such a way, the interest targets for the user 1 can be easily distinguished from each other by displaying only one related virtual object 4.

Note that, the processes in each of the above-described grabbing UIs illustrated in FIG. 21 to FIG. 24 may be used in combination with each other as appropriate. For example, an UI such as that illustrated in FIG. 24, which induces the head gesture, may be used together with the gesture of shifting the thumb, which is illustrated in FIG. 21 (or gesture of turning the target object 2, which is illustrated in FIG. 22).

As described above, the controller 20 according to this embodiment acquires the movement information about the gesture by the user 1 and the information about the gazing point P of the user 1, and controls the display 11 on the basis of the movement information. On the display 11, the related virtual object 4 including the information relating to the target object 2 is displayed in the display region 5 related to the target object 2. How the related virtual object 4 is displayed is controlled to vary on the basis of the position of the gazing point P of the user 1 making the gesture. By varying how the related virtual object 4 is displayed in accordance with the gazing point P of the user 1 in such a way, information in which the user 1 is interested can be naturally presented.

In recent years, attention has been drawn to wearable devices that can be used while worn, such as a smart glass (HMD). These wearable devices are expected to widely prevail in the future. Meanwhile, due to their characteristics of being worn on a body, sizes, shapes, use purposes, and methods of interaction of these devices are significantly different from those of smartphones and the like. Thus, it is conceivable that development of these devices by extension of existing technologies becomes difficult.

In addition, with regard to the methods of interaction between users and devices, it is conceivable that there is a need for a big paradigm shift from existing device-centric interaction on a premise that the users concentrate on the devices to real-world-centric interaction that enables the users to concentrate not on the devices but on action in real world. Simplification of interaction from the users is a requirement of this paradigm shift, but it is conceivable that this simplification results in making it difficult for the user to input information of sufficiently quality and by a sufficient amount as before.

As a solution, interaction that introduces a concept of context awareness has been expected. It is conceivable that, by introducing the context awareness, for example, interaction such as "autonomously providing services by guessing intention of the user from surroundings or what situation the user is in" can be provided.

Specifically, if the user picks up a certain book in a bookstore or the like, since the user has picked up the certain book, it is understood that the user has been interested in this book. Since the user has picked up and viewed an item before purchase in the bookstore, it can be estimated that the user is considering whether or not to purchase this item. It can be estimated that, by presenting, for example, detailed information about the item, users' reviews, and information about relating books, benefits can be highly likely provided to the user. In addition, if information such as "on what kind of information the user places emphasis" or "the user checks reviews first of all" is obtained, for example, from activity logs at times when the user have purchased items, the information to be provided can be further narrowed down.

However, by what kind of factor the user is influenced and determines his/her action varies from situation to situation after all. For example, it is quite possible that even a person who is usually curious about evaluation of a book in which he/she has been interested becomes interested in a wraparound band of the book and thinks of "checking the table of contents". Then, in this case, it is impossible to achieve purposes of the user no matter what kind of information is offered. This is because the interest of the user has shifted to the content of the book. Thus, in this case, it is necessary to determine that information should not be offered. In such a way, even on the basis of the context, it may be difficult to perfectly uniquely estimate the intention of the user.

In this embodiment, the related virtual object 4 is displayed in the display region 5 related to the target object 2. This related virtual object 4 is displayed as appropriate to induce, for example, the gestures by the user 1 of turning the target object 2 (lateral UI), moving the target object 2 (removing UI), grabbing the target object 2 (grabbing UI), and the like. In such a way, by "inducing unconscious actions (gestures) by the user with use of the UIs," an environment in which intention of the user 1 is likely to be guessed can be prepared.

In addition, in this embodiment, the interest targets for the user 1 are discriminated on the basis of the respective positions of the gazing point P in the duration for which the gestures are being made. In other words, an object that the user 1 is viewing while making the gesture (such as target object 2 or related virtual object 4) is discriminated as the interest target. With this, the intention of the user 1 can be estimated with high accuracy, that is, the interest targets for the user 1 can be discriminated from each other with high accuracy.

In such a way, by inducing the user 1 to unconsciously make the gestures, the interest targets for the user 1 can be sufficiently narrowed down. With this, control of, for example, displaying/hiding the related virtual object 4 can be performed with high accuracy. Further, for example, even in a case where the plurality of related virtual objects 4 is present, of these objects, one in which the user 1 has become most interested can be presented.

Still further, for example, the related virtual object 4 can be prevented from being displayed on the basis of uncertain probability in situations (contexts) where the user 1 is placed. With this, for example, a risk that unnecessary information is presented to the user 1 can be prevented. As a result, without hindering observation of the target object 2, necessary information can be properly presented in accordance with the intention of the user 1. In addition, menu screens and the like need not be displayed to explicitly request the input (selection) by the user 1, and hence significantly high usability can be provided.

Second Embodiment

An HMD 100 according to a second embodiment of the present technology is described. Hereinbelow, description of the same configurations and the same functions as those of the HMD 100 according to the above-described embodiment is omitted or simplified.

Figure 26A:
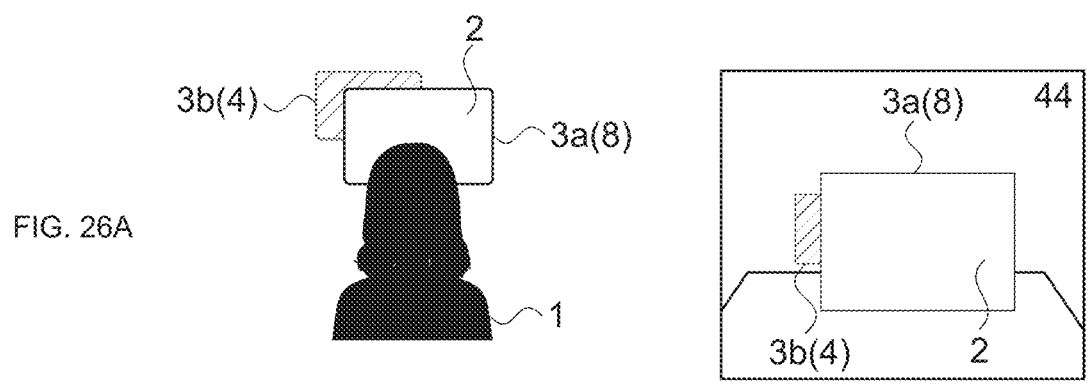
FIGS. 26A, 26B, and 26C Explanatory schematic views of an outline of display control of a virtual object according to a second embodiment.
Figure 26B:
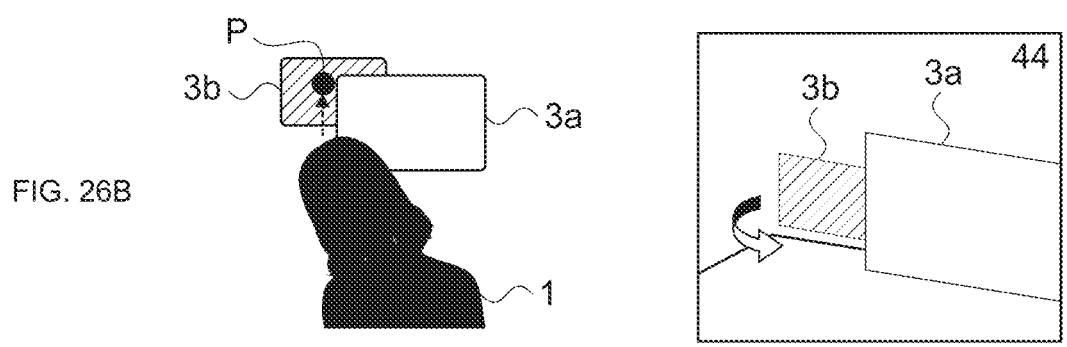
Figure 26C:
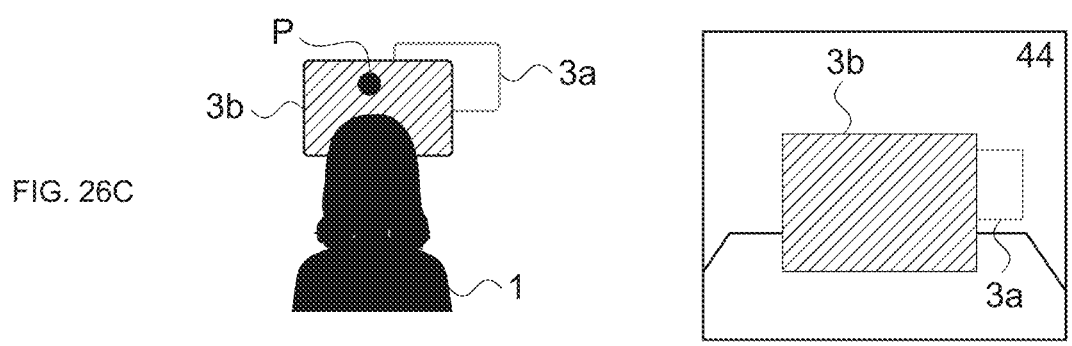

FIGS. 26A, 26B, and 26C are explanatory schematic views of an outline of display control of a virtual object according to the second embodiment. On the left in FIGS. 26A, 26B, and 26C, arrangement relationships between the head of the user 1 and the virtual object 3 are schematically illustrated. Meanwhile, on the right in A of FIGS. 26A, 26B, and 26C, respective field-of-view images 44 as viewed from the user 1 in the arrangement relationships are schematically illustrated.

In this embodiment, a plurality of virtual objects 3 is displayed in the display 11 of the HMD 100. How each of the virtual objects 3 is displayed is controlled such that, of the plurality of virtual objects 3, a virtual object 3 in which the user 1 has become interested is presented. The plurality of virtual objects 3 is, for example, is information relating to one real object (item or the like), such as reviews and a price thereof. In other words, the information items included respectively in the virtual objects 3 are information items correlating with each other.

Now, with reference to FIGS. 26A, 26B, and 26C, a case where two virtual objects 3 are displayed is described. Note that, as described below, the present technology is applicable also to a case where two or more virtual objects 3 are displayed.

In the above-described first embodiment, how the virtual object 3 (related virtual object 4) is displayed is controlled relative to the target object 2 being the real object present in the real space. In this embodiment, the target object 2 is the virtual object 3. Specifically, one of the plurality of virtual objects 3 to be displayed on the display 11 is set as the target object 2. Then, how each of the virtual objects 3 including the virtual object 3 being the target object 2 is displayed is controlled.

Hereinbelow, the virtual object 3 to be the target object 2 may be referred to as a target virtual object 8, and another virtual object 3 adjacent to the target virtual object 8 may be referred to as the related virtual object 4. The target virtual object 8 of this embodiment corresponds to a second virtual object. Meanwhile, the related virtual object 4 corresponds to the first virtual object.

Note that, the target virtual object 8 and the related virtual object 4 switch to each other at timings. Specifically, the virtual object 3 which is the target virtual object 8 at a certain timing may be related virtual object 4 at another timing. This feature is described in detail below.

FIG. 26A illustrates two virtual objects 3a and 3b to be displayed on the display 11 at the certain timing. The virtual object 3a is displayed in front of the user 1. Meanwhile, the virtual object 3b is displayed behind the virtual object 3a in a manner of being partially covered with the virtual object 3a. Note that, although the virtual object 3b is partially covered, the virtual object 3b is not covered to be perfectly invisible to the user 1.

In this case, the virtual object 3a is content to be mainly presented to the user 1. In such a way, the virtual object 3a to be mainly presented is the target virtual object 8 (target object 2). Meanwhile, the virtual object 3b is content to be partially presented to be partially visible to the user 1. The virtual object 3b to be partially presented is the related virtual object 4.

In such a way, in this embodiment, the display 11 is controlled such that the related virtual object 4 is displayed behind the target virtual object 8 as viewed from the user 1. With this, the related virtual object 4 (virtual object 3b) is partially covered with the target virtual object 8 (virtual object 3a).

For example, it is conceivable that, if the user 1 has been interested in the partially-covered virtual object 3b, the user 1 makes a gesture of looking in the virtual object 3b so as to view the virtual object 3b in more detail. In such a way, an UI illustrated in FIGS. 26A, 26B, and 26C are UI designed to induce the user 1 to make the looking-in gesture (hereinafter, abbreviated as looking-in UI).

In the looking-in UI, the display parameters (such as arrangement, angle, shape, external appearance, and size) of the related virtual object 4 are set to enable the user 1 to understand the content of the related virtual object 4 to some extent, or to bring the user 1 to view the related virtual object 4 in more detail. In addition, of these display parameters, the arrangement is made to make it difficult to view the details of the related virtual object 4 without looking in the related virtual object 4.

Note that, there is no limitation, for example, on respective arrangements of the virtual objects 3 to be displayed in the looking-in UI. Specifically, in order that the looking-in gesture is induced relative to the display region 5 of the target virtual object 8 to be displayed in front of the user 1, the display region 5 of the other related virtual object 4 may be set as appropriate.

FIG. 26B illustrates an example of how the virtual objects 3 are displayed if the user 1 looks in the virtual object 3b displayed behind. For example, if the gazing point P of the user 1 is present in the display region 5 of the virtual object 3b, and the user 1 makes a movement of looking in the virtual object 3b, an information amount of the virtual object 3b is increased. Specifically, a process of, for example, increasing a displayed area of the virtual object 3b, or reducing transparency of the virtual object 3b is executed.

In addition, as depicted in the field-of-view image 44 in FIG. 26B, a process of moving the virtual object 3b toward the user 1, that is, a process of gradually increasing a size of the virtual object 3b is executed. This enables the user 1 to visually perceive how the virtual object 3b displayed behind moves toward the user 1. Note that, the virtual object 3a moves away from the user 1 as the virtual object 3b approaches. At this time, a size of the virtual object 3a is gradually reduced.

As illustrated in FIG. 26C, when the virtual object 3b has come to the front of the user 1, the virtual object 3a that is arranged in front until then is arranged behind the virtual object 3b, and partially covered with the virtual object 3b. This enables the user 1 to view content of the virtual object 3b having come to the front in detail.

In such a way, in this embodiment, the display 11 is controlled on the basis of the gestures by the user 1 and his/her gazing point P such that the arrangement relationship between the related virtual object 4 (virtual object 3b) and the target virtual object 8 (virtual object 3a) is inverted front and rear.

Note that, the user 1 may become interested in the virtual object 3a after the virtual object 3b has been displayed in front. In this case, by gazing at the virtual object 3a and looking in the virtual object 3a, the virtual object 3a can be displayed in front. Thus, at such a timing, the virtual object 3a is the related virtual object 4, and the virtual object 3b is the target virtual object 8.

In such a way, in this embodiment, the procedure including displaying the related virtual object 4 including information relating to the target virtual object 8 in the display region 5 related to the target virtual object 8, and varying, on the basis of the position of the gazing point P in the duration for which the user 1 is making the looking-in gesture, how the related virtual object 4 is displayed is executed.

Figure 27:
FIG. 27 A schematic view illustrating examples of how the virtual object to be covered is displayed.

FIG. 27 is a schematic view illustrating examples of how the virtual object 3 to be covered is displayed. For example, the virtual object 3 to be arranged behind is displayed while partially covered. Thus, it is desired that an external appearance of the virtual object 3 to be covered be designed to interest the user 1 at a glance.

As the examples illustrated in FIG. 27, examples of how the virtual object 3 is displayed with use of text covers are schematically illustrated. The text covers are covers representing the content of the virtual object 3 with use of text.

For example, if the virtual object 3 is video information such as a promotional movie, a text cover such as "Movie" is used. Meanwhile, if the virtual object 3 is price information indicating a cheapest price or the like, a text cover such as "Cheapest Price" is used. Meanwhile, if the virtual object 3 is review information, a text cover such as "User Review" is used. As a matter of course, alternatively, arbitrary text covers in accordance with the content of the virtual object 3 may be used.

The text covers are used to display the partially-covered virtual object 3. By using the text covers, the information amount of the virtual object 3 can be further reduced, and information with higher visibility can be added. In other words, even if the information is partially covered, a visible part is easily readable. In addition, situations where curiosity about a continuation of the text is aroused can be created.

As a result, information that can interest the user 1 at a glance can be displayed, and the looking-in gesture can be easily induced. For example, when the user 1 makes the looking-in gesture as depicted in the field-of-view image 44 in FIG. 26B, an entirety of the text is displayed. With this, the content of the virtual object 3 can be explicitly displayed, and, for example, the gazing point P of the user 1 interested in the content can be maintained on the virtual object 3. In this way, the content (virtual object 3) in which the user 1 is interested can be properly presented.

For example, in order that detailed content of the virtual object 3 becomes gradually visible, the text cover fades out while the virtual object 3 is moving to the front. Specifically, transparency of the text cover is gradually increased, and the text information is transparentized. With this, for example, switching between the virtual objects 3 can be demonstrated, and excellent visual effect can be exerted. Note that, the text cover in accordance with content is added to the target virtual object 8 moved behind.

In the looking-in UI, the virtual-object arrangement procedure and the action detection procedure are executed (refer to FIG. 4). Now, a case where the looking-in UI is used in combination with the removing UI described mainly with reference to FIG. 16 is described. Note that, the looking-in UI may be used alone.

Figure 34:
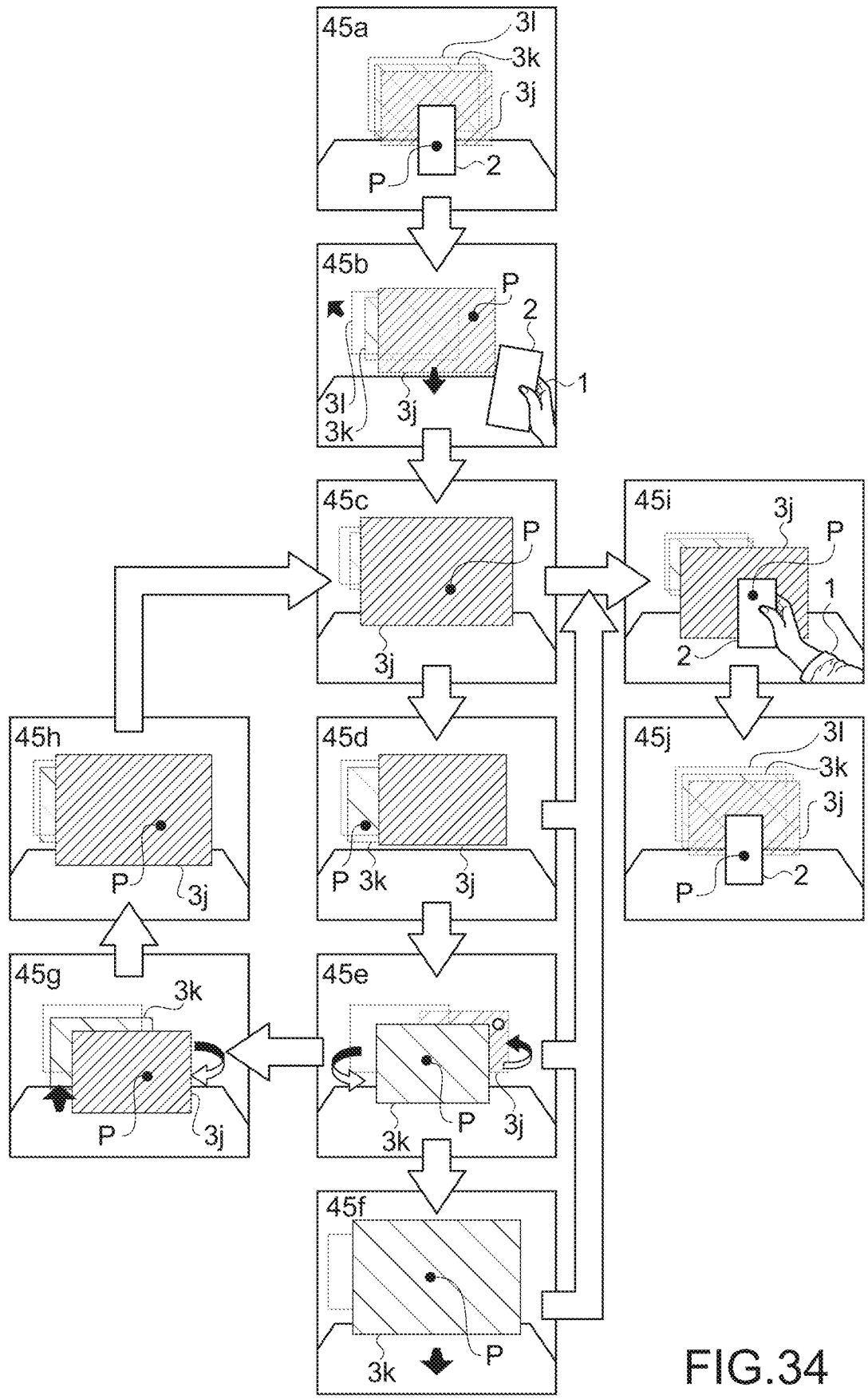
FIG. 34 A schematic view illustrating an example of an operation procedure in the looking-in UI.

In the virtual-object arrangement procedure, the plurality of virtual objects 3 is arranged behind a real object (target object 2) arranged in the real space (refer to a field-of-view image 45a in FIG. 34). For example, if the user 1 approaches the real object or gazes at the real object, the plurality of virtual objects 3 is displayed behind the real object along a depth direction.

For example, if there is a direction in which the looking-in gesture by the user 1 is to be induced (for example, left or right as viewed from the user 1), all the virtual objects 3 are arranged closer to this direction. In a leftward (rightward) arrangement, all the virtual objects 3 are arranged such that, for example, of the virtual objects 3, ones to be displayed on the depth side farther protrude more to the left (right) relative to the display region 5 of a foremost one of the virtual objects 3. With this, the looking-in direction of the user 1 can be controlled as appropriate.

Further, all the virtual objects 3 are arranged such that, under an initial state in which the virtual objects 3 start to be displayed, parts of their regions can always be visually recognized even while the virtual objects 3 are covered. For example, if the virtual objects 3 are arranged behind the real object, a lateral width of each of the virtual objects 3 is set to be larger than a lateral width of the real object. Still further, for example, the text covers illustrated in FIG. 27 are added as appropriate such that, content of the ones of the virtual objects 3, which are set to be away from the user 1, that is, content of ones that are set to be small in size is understood.

Figure 28:
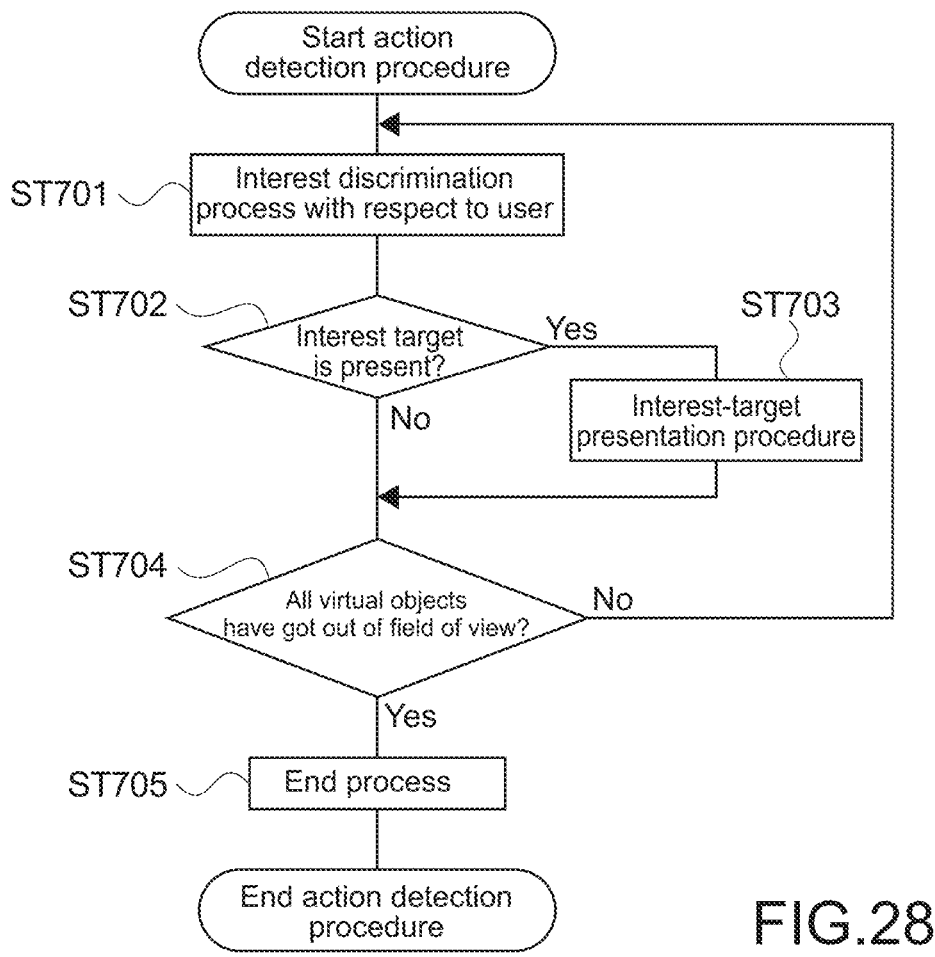
FIG. 28 A flowchart showing an example of an action detection procedure in a looking-in UI.

FIG. 28 is a flowchart showing an example of the action detection procedure in the looking-in UI. The procedure shown in FIG. 28 is a procedure to be started, for example, under a state in which the user 1 has moved the real object, and the foremost one of the virtual objects 3 (target virtual object 8) is displayed in front. Note that, the procedure shown in FIG. 28 may be started under a state in which the real object has not yet been moved.

The interest target for the user 1 is discriminated (Step 701). Specifically, of the plurality of virtual objects 3 arranged in the depth direction, a virtual object 3 in which the user 1 has been interested is discriminated as the interest target.

For example, it is assumed that the user 1 has been interested in the virtual object 3 displayed foremost in the initial state (target virtual object 8 in the initial state). In this case, it is conceivable that the user 1 does not make a gesture of looking in, for example, the related virtual object 4 arranged on the depth side. Thus, if the gazing point P of the user 1 is present on the virtual object 3 displayed foremost in the initial state, and the looking-in gesture or the like is not made, this virtual object 3 is discriminated as the interest target.

Meanwhile, for example, it is conceivable that, if the user 1 has been interested in the virtual object 3 displayed on the depth side in the initial state (related virtual object 4 in the initial state), the user 1 makes a gesture of looking in the depth side relative to the foremost target-virtual object 8 while viewing the related virtual object 4.

In this embodiment, it is determined whether or not the user 1 has made a predetermined gesture of, for example, looking in the depth side (refer to Step 301 in FIG. 6). Note that, the predetermined gesture is a gesture of varying a relative positional relationship between the target virtual object 8 and the head of the user 1. In other words, it is determined whether or not the user 1 has taken action of, for example, moving his/her viewpoint (head) so as to look in the depth side relative to the target virtual object 8 displayed foremost while avoiding the target virtual object 8.

For example, the predetermined gesture is the head gesture of varying the position of the head of the user 1. Specifically, it is conceivable that, as illustrated on the left in FIG. 26B, the user 1 tilts his/her head to look in the related virtual object 4. The tilt of the head is, for example, a tilt relative to a vertical direction. In such a case, the tilt of the head is detected with use of, for example, the IMU installed in the HMD 100 (sensor unit 14). If an amount of the tilt exceeds a threshold, it is determined that the gesture of tilting the head has been made.

Further, the user 1 may bend over to tilt an entirety of his/her upper body. Also in such a case, by using the IMU or the like, for example, an amount of the movement of the head relative to the foremost target-virtual object 8 can be detected. Specifically, if the amount of the movement of the head exceeds a threshold, it may be determined that the looking-in gesture has been made.

Still further, the user 1 may move from where he/she is standing to look in the related virtual object 4. In other words, it is conceivable that the user 1 takes action of, for example, moving around. In such a case, for example, it is determined whether a segment that connects the outer camera 13 (HMD 100) and the covered virtual object 3 to each other has been interrupted by a forward virtual object. Alternatively, by detecting an amount of the movement by the user 1 or a direction of his/her movement as appropriate, it may be determined that the looking-in gesture has been made.

A method of determining that the looking-in gesture has been made is not limited. For example, the viewpoint of the user 1 moves in conjunction with movements of the head, the upper body, the lower body, and the like of the user 1. Irrespective of the movement of the viewpoint of the user 1, the plurality of virtual objects 3 is displayed, for example, while localized to the position where the real object is arranged. Thus, it is conceivable that, as the viewpoint of the user 1 varies, an area in which the virtual object 3 to be displayed on the depth side is displayed varies on the display 11. If an amount of the variation of this display area exceeds a threshold, it may be determined that the looking-in gesture has been made. Such processes may be executed, for example.

In addition, in this embodiment, it is determined that on which of the related virtual objects 4 the gazing point P of the user 1 is present while the looking-in gesture is being made. Specifically, it is determined whether or not the gazing point P is present on any of the partially-displayed related virtual objects 4. Then, of the related virtual objects 4, one on which the gazing point P is present is discriminated as the interest target for the user 1.

It is determined whether or not the interest target for the user 1 is present (Step 702). If it is determined that the interest target is absent (No in Step 702), Step 704 is executed. Meanwhile, if it is determined that the interest target is present (Yes in Step 702), an interest-target presentation procedure is executed (Step 703), and then Step 704 is executed.

Figure 29:
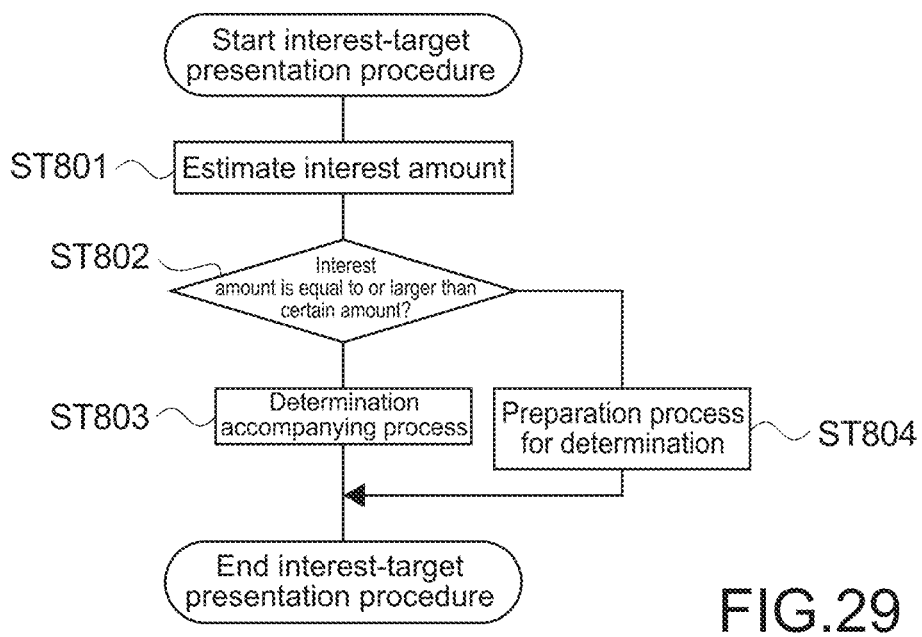
FIG. 29 A flowchart showing an example of an interest-target presentation procedure.

FIG. 29 is a flowchart showing an example of the interest-target presentation procedure. In the interest-target presentation procedure, an amount of interest in the interest target is estimated (Step 801). For example, the longer a time period in which the virtual object 3 to be the interest target is gazed at becomes, the larger the interest amount to be estimated becomes. Meanwhile, if the virtual object 3 has been moved, it is determined whether this virtual object 3 has been kept sight of. If this virtual object 3 has been kept sight of, it is estimated that the interest amount is large.

In addition, it is determined whether virtual objects 3 other than the virtual object 3 that has been discriminated as the interest target have been gazed at. If the other virtual objects 3 have been gazed at, the interest amount is set to be small. A method of estimating the interest amount is not limited. Specifically, for example, the method of estimating the interest amount, which is described mainly with reference to Step 501 in FIG. 13, may be used as appropriate.

It is determined whether or not the estimated interest amount is equal to or larger than a certain amount (Step 802). If the interest amount is equal to or larger than the certain amount (Yes in Step 802), it is determined to display content of the virtual object 3 discriminated as the interest target, and then the determination accompanying process is executed (Step 803). For example, the content reproduction process, the process of accepting the UI operation, and the like are executed as appropriate (refer mainly to Step 504 in FIG. 13).

If the interest amount is smaller than the certain amount (No in Step 802), the preparation process for the determination is executed (Step 804). In the preparation process, the display parameters such as a position, an orientation, the size, and transparency of the virtual object 3 discriminated as the interest target are controlled as appropriate. In this way, the process of explicitly displaying the virtual object 3 is executed. For example, the arrangement, the size, and the like of the virtual object 3 are adjusted such that the virtual object 3 moves toward the front of the user 1. In addition, for example, the text cover gradually becomes less visible to cause details of the content to be densely displayed.

In addition, as the preparation process, a process of varying a layout of the other ones of the virtual objects in response to the movement of the interest target is executed. For example, if the two or more virtual objects 3 are displayed, for example, a process of rotating a set of all the virtual objects 3 clockwise or counterclockwise is executed (refer mainly to FIGS. 30, 31, 32, 33A, 33B, 33C, 33D, 33E, 33F, and 33G). In addition, for example, a process of adding the text cover or the like to the virtual object 3 to move behind the interest target is executed.

Referring back to FIG. 28, it is determined whether or not all the virtual objects 3 have got out of the field of view of the user 1 (Step 704). If even one of the plurality of virtual objects 3 remains in the field of view of the user 1 (No in Step 704), the process of Step 701 and the subsequent processes are executed. Specifically, the interest target for the user 1 is discriminated, and, for example, the interest-target presentation procedure with regard to this interest target is executed.

If all the virtual objects 3 have got out of the field of view of the user 1 (Yes in Step 704), an end process is executed (Step 705). It is conceivable that, if the virtual objects 3 are absent from the field of view of the user 1, for example, the interest of the user 1 has shifted to a package of the real object or other items. In this case, for example, a process of hiding all the virtual objects 3 or initializing their states is executed, and the procedure in the looking-in UI is ended.

Figure 30:
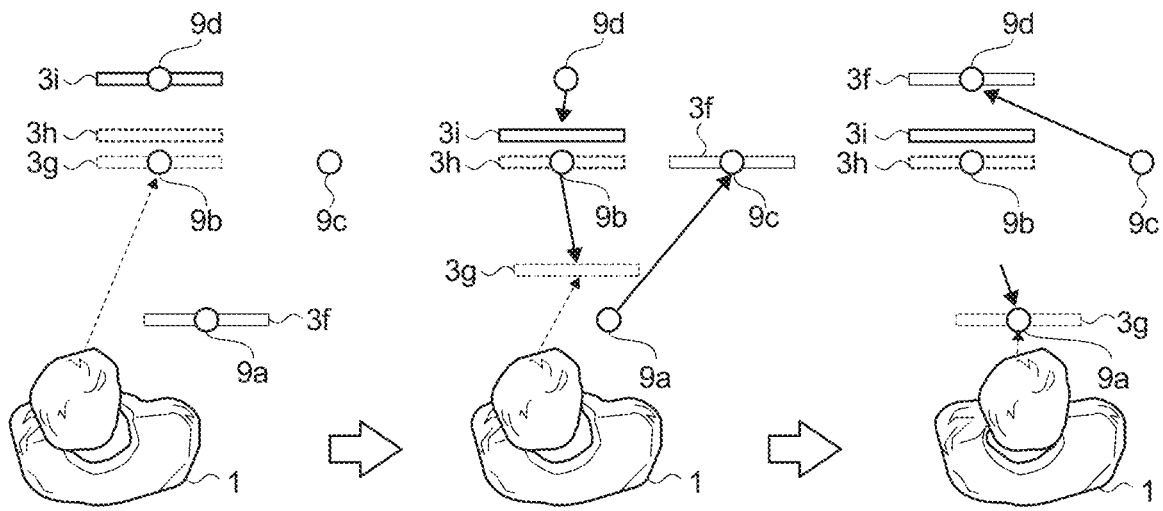
FIG. 30 A schematic view illustrating an example of how the looking-in UI is displayed.

FIG. 30 is a schematic view illustrating an example of how the looking-in UI is displayed. On the left, in the center part, and on the right in FIG. 30, display positions of four virtual objects 3f to 3i in a top view of the user 1 are schematically illustrated. The virtual objects 3f to 3i are displayed on the right and left displays 11 of the HMD 100 in appropriate sizes and at appropriate positions in accordance with arrangements illustrated respectively in the parts of FIG. 30. This enables the user 1 to visually perceive the virtual objects 3f to 3i displayed in a plane (display 11) exactly as these virtual objects 3f to 3i are arranged in the depth direction.

In addition, in FIG. 30, the line-of-sight direction of the user 1 and respective moving directions of the virtual objects 3 are schematically indicated respectively by a dotted-line arrow and solid-line arrows. Note that, hollow circles in the illustration respectively indicate reference positions 9a to 9d for respectively displaying the virtual objects 3. The reference position 9a is arranged in front of the user 1. Reference positions 9b and 9c are arranged at equivalent distances respectively on a left rear and a right rear of the reference position 9a in the depth direction. The reference position 9d is arranged behind the reference position 9b.

On the left in FIG. 30, the virtual object 3f is displayed at the reference position 9a in front of the user 1. Further, a virtual object 3g is displayed at the reference position 9b at the left rear, and a virtual object 3h is displayed therebehind. Still further, the virtual object 3i is displayed at the reference position 9d behind the virtual object 3h. In this state, the virtual object 3f is the target virtual object 8, and the virtual object 3g is the related virtual object 4.

As illustrated on the left in FIG. 30, if the user 1 makes a gesture of looking in the left while viewing the virtual object 3g displayed foremost at the left rear (reference position 9a). In this case, it is conceivable that the user 1 has been interested in the virtual object 3g, and the virtual object 3g is discriminated as the interest target.

If an amount of the interest in the virtual object 3g (such as gazing time period) increases, as illustrated in the center part of FIG. 30, a process of moving the virtual object 3g to the reference position 9a in front is executed. Specifically, for example, while a size of the virtual object 3g is increased, a process of reducing transparency, or a process of fading out the text cover is executed.

At this time, the virtual object 3f retracts to the reference position 9c at the right rear. In other words, the virtual object 3f that is displayed until then in front moves to the right opposite to the left in which the user 1 looks. This enables the user 1 to visually perceive the virtual object 3g being subsequent content easily. In addition, the virtual object 3h moves foremost at the left rear (reference position 9b), and the virtual object 3*i* moves forward from a tail end (reference position 9*d*) to be arranged behind the virtual object 3*h*.

As illustrated on the right in FIG. 30, after the virtual object 3*g* being the interest target has been arranged in front of the user 1, details of the virtual object 3*g* starts to be displayed. In this case, the virtual object 3*f* having moved to the reference position 9*c* at the right rear moves to the tail end. As a result, the virtual object 3*f* is displayed in a small size, which enables the user 1 to concentrate on watching content of the virtual object 3*g* in front.

Meanwhile, if the user 1 has lost the interest in the virtual object 3*g*, and looks in the left rear, for example, a process of moving the virtual object 3*h* displayed foremost at the left rear to the front is executed. In such a way, all the virtual objects 3*f* to 3*i* are displayed while switched in a manner of passing the reference positions 9*a*, 9*b*, 9*c*, and 9*d* in this order.

For example, at a timing when the user 1 looks, for example, in the virtual object 3*g* on the depth side, it can be estimated that the user 1 has lost interest in the virtual object 3*f* on a near side. Thus, it is conceivable to execute a process of presenting the virtual object 3*g* on the depth side, and a process of hiding the virtual object 3*f* on the near side.

Note that, the "looking-in" gestures that humans usually make may be made not only when they "carefully view what they want to view," but also when they take, for example, faint interest to be instantly lost, specifically, when they "see how things are going." It is uncertain whether such interest remains in the virtual object 3*f* on the near side, or shifts to the virtual object 3*g* on the depth side.

As a countermeasure, in this embodiment, as illustrated in FIG. 30, a process of starting the virtual objects 3*f* to 3*i* moving at the timing when the looking-in is performed, and a process of determining, on the basis of to which of the virtual objects 3*f* and 3*g* the line-of-sight is attracted during the movement, which of the virtual objects 3 to present.

Note that, in the example illustrated in FIG. 30, the virtual object g on the depth side is visible out of a left-hand end of the virtual object 3*f* on the near side, and hence a leftward movement of the head is induced. Thus, at the time of shifting the virtual object 3*f* on the near side, the virtual object 3*f* is once oppositely moved to the right, and then moved to a waiting position (such as the reference position 9*d*). With this, the virtual object 3*f* can be smoothly shifted to the waiting position without blocking the line-of-sight of the user 1.

Figure 31:
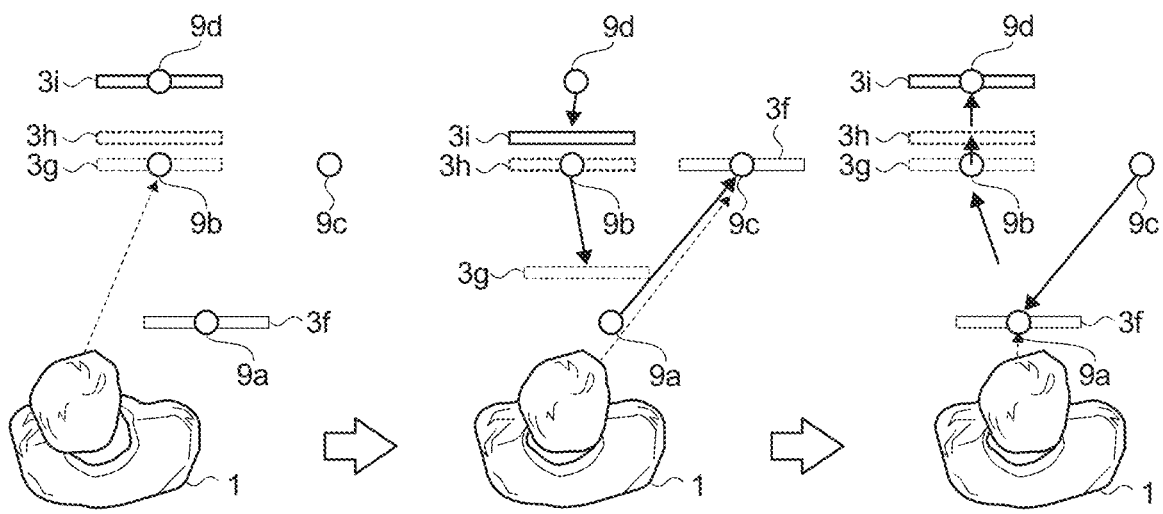
FIG. 31 A schematic view illustrating another example of how the looking-in UI is displayed.

FIG. 31 is a schematic view illustrating another example of how the looking-in UI is displayed. A state on the left in FIG. 31 is similar to that on the left in FIG. 30. In FIG. 31, the interest target for the user 1 is switched while the virtual objects 3*f* to 3*g* are being moved.

For example, if the virtual object 3*g* displayed foremost at the left rear (reference position 9*a*) is discriminated as the interest target (left in FIG. 31), the virtual object 3*g* is moved to the front (center part of FIG. 31). At this time, the user 1 gazes at the virtual object 3*f* to retract to the right rear, that is, the gazing point P of the user 1 moves to keep sight of content that has retracted from the front.

In this case, the retracted virtual object 3*f* is discriminated as the interest target again. If the gazing point P of the user 1 remains on the virtual object 3*f*, the virtual object 3*f* is moved back to the reference position 9*a* in front, and its information amount is increased. As a result, as illustrated on the right in FIG. 31, the virtual object 3*f* is displayed in front of the user 1.

Note that, if the interest target is switched from the virtual object 3*g* to the virtual object 3*f*, the virtual object 3*g* is returned to an immediately-preceding waiting position (reference position 9*b*). In addition, the virtual objects 3*h* and 3*i* arranged behind the virtual object 3*g* are also returned to their immediately-preceding waiting positions. As a result, all the virtual objects 3*f* to 3*i* are arranged as at the timing when the user 1 looks in the left (left in FIG. 31).

In such a way, in the looking-in UI, if the interest target for the user 1 is switched halfway, processes up to an immediately-preceding process are cancelled. Then, the process of displaying the virtual object 3 being another interest target in front is started. In addition, for example, the process of returning, to the front, the virtual object 3 that retracts from the front also may be executed. With this, for example, the virtual object 3 in which the user 1 has become interested can be promptly displayed.

Figure 32:
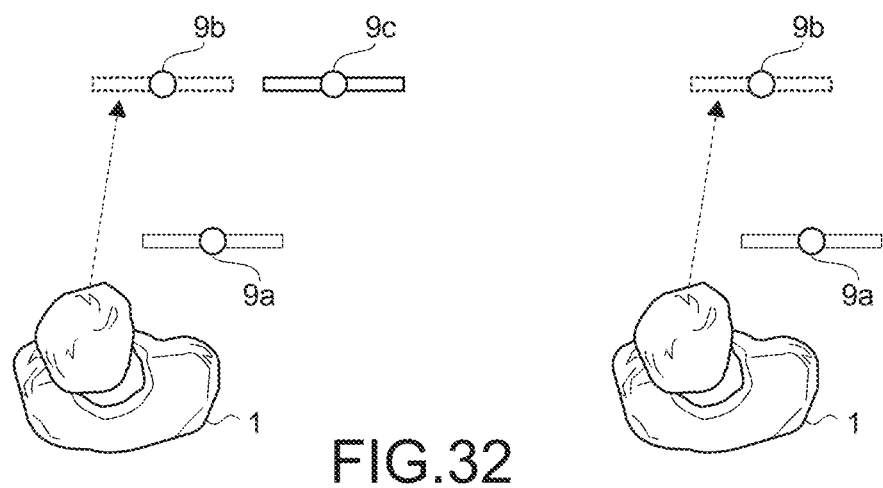
FIG. 32 A schematic view illustrating a still another example of how the looking-in UI is displayed.

FIG. 32 is a schematic view illustrating a still another example of how the looking-in UI is displayed. On the right in FIG. 32, an arrangement example of a case where three virtual objects 3 are displayed is schematically illustrated. Specifically, the reference position 9*a* in front, the reference position 9*b* at the left rear of the reference position 9*a*, and the reference position 9*c* at the right rear of the reference position 9*a* are set. A process of setting reference positions 9*a* to 9*c* as the waiting positions, and a process of sequentially moving all the virtual objects 3 are executed. Such an arrangement of the three virtual objects 3 enables the user 1 to visually recognize these virtual objects 3 easily. In addition, of the virtual objects 3, one that is discriminated as the interest target can be promptly displayed.

Meanwhile, on the left in FIG. 32, an arrangement example of a case where two virtual objects 3 are displayed is schematically illustrated. Specifically, the reference position 9*a* in front and the reference position 9*b* at the left rear of the reference position 9*a* are set. A process of switching which of these two virtual objects 3 is displayed is executed with the reference positions 9*a* and 9*b* set as the waiting positions. Such processes may be executed, for example.

FIGS. 33A, 33B, 33C, 33D, 33E, 33F, and 33G are schematic views illustrating a yet another example of how the looking-in UI is displayed. The looking-in UI in FIGS. 33A, 33B, 33C, 33D, 33E, 33F, and 33G is designed such that the user 1 looks in the left.

In FIGS. 33A, 33B, 33C, 33D, 33E, 33F, and 33G, the reference position 9*a* arranged in front of the user 1, the reference positions 9*b* and 9*c* arranged at the left rear and the right rear of the reference position 9*a*, and the reference position 9*d* arranged behind the reference position 9*b* are set. In addition, the four virtual objects 3*f* to 3*i* are moved in a manner of making rounds of the four reference positions 9*a* to 9*d* set as the waiting positions. In other words, in FIGS. 33A, 33B, 33C, 33D, 33E, 33F, and 33G, all the virtual objects 3*f* to 3*i* are rotationally displayed as in Cover Flow, that is, displayed as covers that continuously make the rounds.

In FIG. 33A, the virtual object 3*f* is displayed in front (reference position 9*a*) of the user 1. The virtual object 3*g* is displayed at the left rear (reference position 9*b*) of the virtual object 3*f*, and the virtual object 3*i* is displayed at the right rear (reference position 9*c*) of the same. In addition, the virtual object 3*h* is displayed behind (reference position 9*d*) the virtual object 3*g*.

Now, how the virtual objects 3 are rotationally displayed in the arrangement illustrated in FIG. 33A is described. In this arrangement, the virtual object 3*f* is the target virtual object 8 (second virtual object), and the virtual object 3*g* is the related virtual object 4 (first virtual object). In addition, the virtual object 3h corresponds to a third virtual object, and the virtual object 3i corresponds to a fourth virtual object.

Under the state illustrated in FIG. 33A, if the user 1 makes the gesture of looking in the left, the line-of-sight (gazing point P) of the user 1 is directed, for example, to the virtual object 3g arranged foremost at the left rear. As a result, as illustrated in FIG. 33B, the virtual object 3g is moved to the reference position 9a in front. Meanwhile, the other virtual objects 3f, 3h, and 3i are moved respectively to the reference positions 9c, 9b, and 9d. In such a way, the positions where the virtual objects 3f to 3i are respectively displayed are caused to make a counterclockwise shift.

Note that, while the arrangement illustrated in FIG. 33A is shifting to the arrangement illustrated in FIG. 33B, the user 1 maintains the posture of looking in the left rear without moving his/her line-of-sight (gazing point P). In other words, the movement of, for example, keeping sight of the virtual object 3g, or keeping sight of the virtual object 3f to retract to the rear is not detected. In still other words, the gazing point P of the user 1 does not remain on the virtual object 3g or 3f arranged at positions that are easily visible to the user 1.

In such a case, as illustrated in FIG. 33C, an information amount of the subsequent virtual object 3h is increased. Specifically, the virtual object 3h that is arranged behind the virtual object 3g (reference position 9d) at the timing of FIG. 33A is moved to the front.

In such a way, in this embodiment, if the gazing point P of the user 1 does not remain on any one of the virtual object 3g and the virtual object 3f while the virtual object 3h is displayed behind the virtual object 3g as viewed from the user 1, and at the same time, while the user 1 is making the looking-in gesture, the information amount of the virtual object 3h is increased while the virtual object 3g and the virtual object 3f are moved in the depth direction.

In other words, if the gazing point P of the user 1 has not been fixed to any one of the target virtual object 8 (virtual object 3f) to be displayed in front of the user 1 and the related virtual object 4 (virtual object 3g) to be displayed foremost on the side in which the user 1 looks, a process of mainly displaying the virtual object 3 arranged behind the related virtual object 4 on the side in which the user 1 looks is executed.

Meanwhile, in FIG. 33C, in conjunction with the movement of the virtual object 3h to the reference position 9a in front, the positions where the other virtual objects 3g, 3f, and 3i are respectively displayed are caused to make a counterclockwise shift. Specifically, the virtual object 3g moves to the reference position 9c at the right rear, and the virtual object 3f moves to the reference position 9d at the tail end.

The virtual object 3i is moved foremost at the left rear (reference position 9b). The reference position 9b is, for example, a position where the virtual object 3g is displayed as the related virtual object 4 in (a), and is also a display position of the virtual object 3 to be subsequently displayed in front. In other words, the virtual object 3i arranged at the right rear (reference position 9c) of the virtual object 3f at the timing of (a) is moved to the position where the related virtual object 4 was displayed.

In such a way, in this embodiment, if the gazing point P of the user 1 does not remain on any one of the virtual object 3g and the virtual object 3f while the virtual object 3i is displayed behind the virtual object 3f as viewed from the user 1, and at the same time, while the user 1 is making the looking-in gesture, the virtual object 3i is moved to the position where the virtual object 3g is located until the looking-in gesture is started while the virtual object 3g and the virtual object 3f are moved in the depth direction.

In other words, if the gazing point P of the user 1 has not been fixed to any one of the target virtual object 8 (virtual object 3f) to be displayed in front of the user 1 and the related virtual object 4 (virtual object 3g) to be displayed foremost on the side in which the user 1 looks, the virtual objects 3 are circularly shifted to positions where the virtual object 3 displayed behind is a subsequent display candidate.

By displaying all the virtual objects 3 in the circularly shifted manner, the plurality of virtual objects 3 can be efficiently explicitly displayed. In addition, since all the virtual objects 3 are rotationally displayed as in Cover Flow, UIs that are not only intuitive but also exert excellent visual effect can be provided.

Note that, in FIG. 33C, the gazing point P of the user 1 does not remain on the virtual object 3i, and is directed therebehind. As a result, as illustrated in FIG. 33D, the respective positions where the virtual objects 3f to 3i are displayed are caused to make a counterclockwise shift.

In FIG. 33E, the gazing point P of the user is detected on the virtual object 3f to move from the reference position 9b at the left rear to the reference position 9a in front. In other words, it is determined that the user 1 has gazed at the virtual object 3f to move, and the virtual object 3f is discriminated as the interest target. Note that, the other virtual objects 3g, 3h, and 3i have been moved respectively to the reference positions 9b, 9d, and 9c.

As illustrated in FIG. 33F, if the virtual object 3f has been gazed at, a moving speed of the virtual objects 3 is reduced. Specifically, a moving speed of the virtual object 3 that has been discriminated as the interest target is reduced. With this, for example, the discrimination of the interest target and the estimation of the interest amount can be performed with high accuracy.

In FIG. 33G, the virtual object 3f being the interest target is displayed in front (reference position 9a) of the user 1, and content of the virtual object 3f is displayed in detail. In such a way, in the looking-in UI involving the rotational displaying, by gazing at the plurality of virtual objects 3f to 3i to be circularly shifted, an interesting one of the virtual objects 3 can be naturally selected. In addition, since the moving speed of the gazed virtual object 3 is reduced, the user 1 can be notified that this virtual object 3 has been selected. With this, intuitive operations can be performed.

FIG. 34 is a schematic view illustrating an example of an operation procedure in the looking-in UI. The operation procedure illustrated in FIG. 34 is a procedure to be executed in combination with the above-described removing UI. FIG. 34 schematically illustrates field-of-view images 45a to 45j depicting the field of view of the user 1. Now, with reference to all the field-of-view images 45a to 45j, the operation procedure in the looking-in UI is described.

In the field-of-view image 45a, three virtual objects 3j to 3l are displayed behind the real object to be the target object 2. The virtual object 3j to 3l are each displayed in response, for example, to approach of the user 1 to the real object or the gaze of the user 1. Note that, the three virtual objects 3j to 3l are displayed substantially at equal intervals in this order along the depth direction from a side closer to the user 1.

With regard to the determination as to whether the target object 2 itself is interesting or the virtual object 3 is interesting, the determination process common to that in the removing UI is executed. Note that, when the plurality of virtual objects 3 is developed and presented at a time point when the user 1 approaches the target object 2, if the user 1 has been interested in the target object 2, it is expected that his/her experience is hindered.

As a countermeasure, in order to primarily inform that the plurality of virtual objects 3 is present, and inform what representative content is, an arrangement of an UI to be presented when the user 1 approaches is set as depicted in the field-of-view image 45a. Note that, if the user 1 removes the target object 2 while viewing the virtual object 3, subsequently, of the virtual objects 3, one that is mainly presented (foremost) is displayed as the interest target, and the interest target is switched to other ones of the virtual objects 3 at the rear if the user 1 looks in these ones.

As depicted in the field-of-view image 45b, if the user 1 removes the real object while viewing the foremost virtual object 3j, the virtual object 3j is discriminated as the interest target, and moved toward the user 1. At this time, the virtual object 3j is reduced, for example in transparency to be increased in information amount. Meanwhile, the other virtual objects 3k and 3l are moved rearward.

In the field-of-view image 45c, the foremost virtual object 3j covers the virtual objects 3k and 3l. At this time, the virtual objects 3k and 3l are displayed to be partially visually recognized on the left of the virtual object 3j. This enables the user who has become interested in the covered virtual object 3 to be induced to make a gesture of looking in the left. As a matter of course, the looking-in UI may be designed to induce a gesture of looking-in the right of the virtual object 3.

As depicted, for example, in the field-of-view image 45d, if the user 1 looks in the left while viewing the covered virtual object 3k, a display area of the virtual object 3k is increased. In addition, if the gazing point P of the user 1 remains on the virtual object 3k (field-of-view image 45e), the virtual object 3k is discriminated as the interest target, and moved toward the user 1. At this time, the virtual object 3j is moved behind the virtual object 3l.

As depicted in the field-of-view image 45f, if the virtual object 3k is continuously gazed at, a process of detecting details of content of the virtual object 3k is executed. Note that, the virtual objects 3l and 3j at the rear are arranged to be partially visible on the left of the virtual object 3k. In such a way, even when the content being the interest target is displayed, the gesture of looking in the left can be induced.

Note that, if the user 1 is interested in the virtual object 3j to move behind at the timing of the field-of-view image 45e, the gazing point P (hollow circle in the image) of the user 1 is detected on the virtual object 3j. In such a way, the user 1 may keep sight of the virtual object 3j to move behind.

In this case, as depicted in the field-of-view image 45g, the movement of the virtual object 3k toward the user 1 is cancelled. In addition, the virtual object 3j being retracted is moved toward the user 1, and is displayed foremost (field-of-view image 45h). In such a way, even if the interesting virtual object 3 (interest target) is switched halfway, of the virtual objects 3, one that the user 1 desires can be properly displayed.

For example, if the user 1 finishes watching the virtual object 3, and returns the target object 2 to its original position (field-of-view image 45i), all the virtual objects 3j to 3l move behind the target object 2. Note that, if the gesture of returning the target object 2 to the original position is made in each of the states depicted in the field-of-view images 45d to 45f and 45h, a process of shifting each of the states to the state depicted in the field-of-view image 45i is executed as appropriate.

Note that, a concept of how the interest in the target object 2 itself is lost is basically common to that in the removing UI, specifically, initialization is performed if the target object 2 is put at the initial position. For example, as depicted in the field-of-view image 45j, if the target object 2 is arranged at the initial position, states of all the virtual objects 3j to 3l are initialized to those as depicted in the field-of-view image 45a.

Meanwhile, with regard to a process at a time when all the virtual objects 3j to 3l get out of an angular field (out of field of view), since the plurality of virtual objects 3 is presented, it is conceivable that, a situation such as "While a certain one of the virtual objects 3 is being gazed at, the other virtual objects 3 get out of the angular field." is likely to occur.

As a countermeasure, a trigger of the loss of the interest in the target object 2 is applied only to the foremost virtual object 3 including main content. In addition, it is expected that, if not the foremost virtual object 3 but the other virtual objects 3 are interesting, a gesture of looking in the virtual objects 3 at the rear is made. Thus, if the interest in the foremost virtual object 3 is lost (specifically, if, for example, foremost virtual object 3 gets out of the angular field), it is determined that interests in all the information have been lost. Then, presentation of all the virtual objects 3 is ended.

For example, in UIs such as the lateral UI and the removing UI described above, the number of the virtual objects 3 that can be presented is small, and it may be difficult to increase, for example, variety of the content. In contrast, in the looking-in UI, a large number of virtual objects 3 can be displayed. With this, the variety and the number of the virtual objects 3 can be increased. In addition, the looking-in UI enables the user 1 to select an interesting one of the virtual objects 3 by unconsciously looking in this virtual object 3. With this, various information can be naturally presented, and hence usability can be significantly increased.

OTHER EMBODIMENTS

The present technology is not limited to the embodiments described hereinabove, and various other embodiments may be made.

In the embodiments described hereinabove, how the virtual object 3 is displayed on the transmissive HMD 100 equipped with the transmissive display 11 is controlled is described. Alternatively, the present technology is applicable also, for example, to a case where an immersive HMD that covers the field of view of the user 1 is used.

Figure 35A:
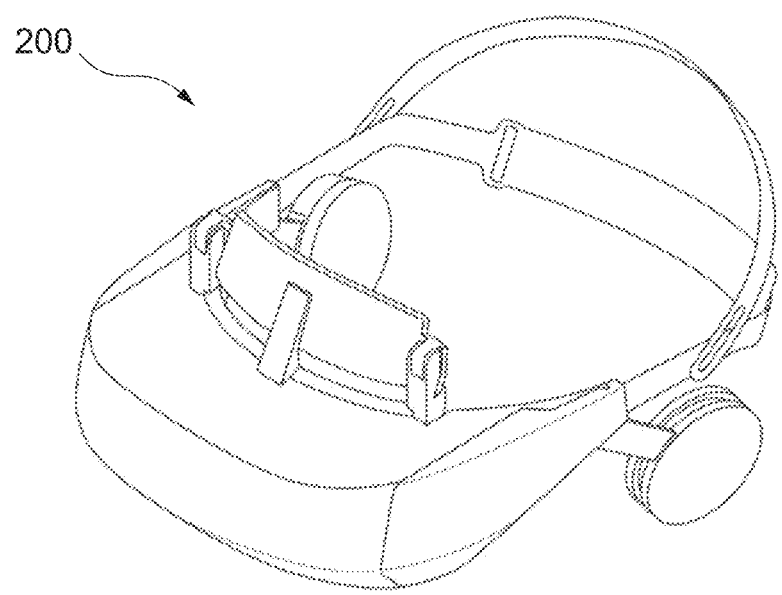
FIGS. 35A and 35B Schematic views of an external appearance of an HMD according to another embodiment.
Figure 35B:
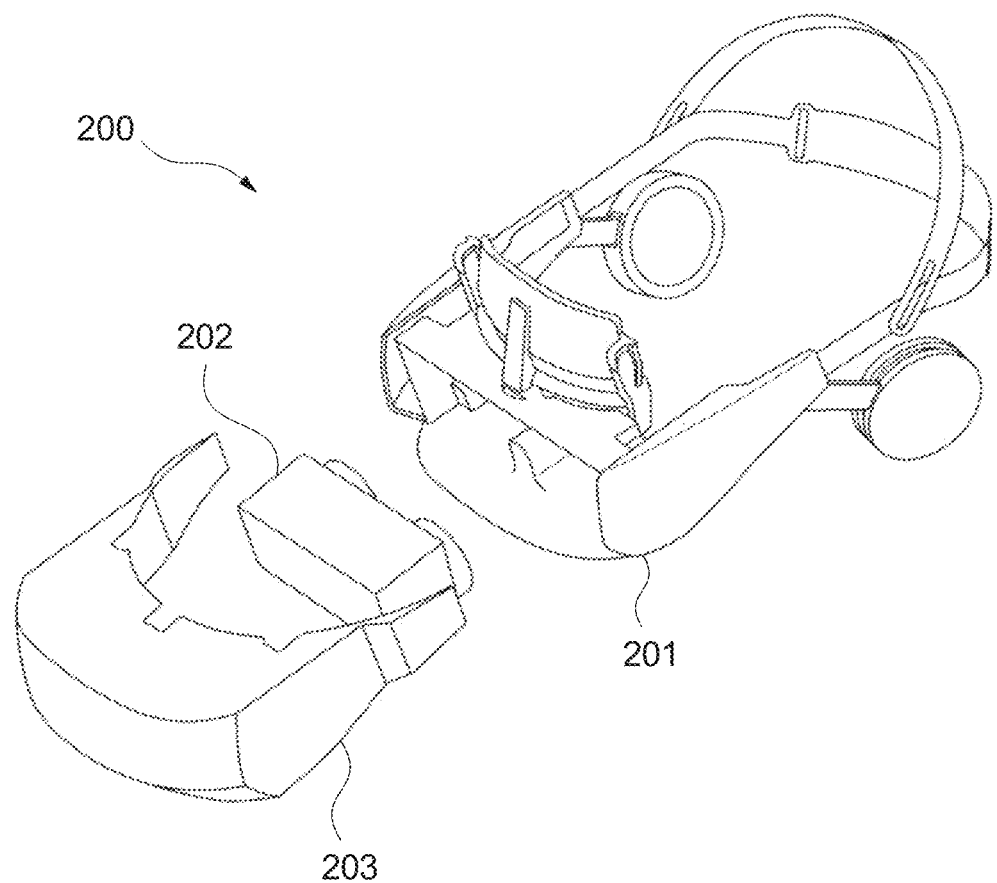

FIGS. 35A and 35B are schematic views of an external appearance of an HMD according to another embodiment. FIG. 35A is a schematic perspective view of an external appearance of an HMD 200. FIG. 35B is a schematic perspective view illustrating a disassembled state of the HMD 200. The HMD 200 includes a mount portion 201 to be mounted to the head of the user 1, a display unit 202 to be arranged in front of both the eyes of the user 1, and a cover portion 203 configured to cover the display unit 202. The HMD 200 is an immersive head-mount display configured to cover the field of view of the user 1.

The HMD 200 is equipped with an outer camera (not shown). By displaying images taken by this outer camera on the display unit 202, the user 1 can visually recognize a video of the real world. In addition, on the display unit, various virtual objects are displayed in a manner of being superimposed on the images taken by the outer camera. In this way, virtual experience using augmented reality (AR) can be provided.

For example, how the virtual object 3 and the like are displayed on the display unit 202 is controlled with use of, for example, the controller 20 described with reference to FIG. 2. Specifically, for example, a process of varying how the virtual object 3 is displayed is executed on the basis of the gestures by the user 1 and the positions of his/her gazing point. With this, information in which the user 1 is interested (such as information about the virtual object 3 and information about a real object) can be naturally presented.

In addition, the present technology is applicable also to a virtual reality (VR) space. For example, how related virtual objects related to an arbitrary virtual object arranged in the VR space are displayed is controlled. With this, for example, information relating to a target virtual object and information about the target virtual object itself can be distinguished as appropriate from each other, and then presented to the user. In this way, even in the VR space, the information in which the user has been interested can be naturally presented as in the real space.

At least two of the features described hereinabove according to the present technology may be combined with each other. In other words, various features described respectively in the embodiments may be arbitrarily combined with each other regardless of all these embodiments. In addition, the various advantages described hereinabove are merely examples, and hence are not limited thereto. Thus, other advantages may be additionally obtained.

Note that, the present technology may also employ the following configurations.

(1) An information processing device, including:
    a movement-information acquisition unit that acquires movement information about a gesture by a user;
    a gaze-information acquisition unit that acquires information about a gazing point of the user; and
    a display control unit that controls a display device on the basis of the movement information,
    the display control unit causing the display device
        to display a first virtual object including information relating to a target object in a first region related to the target object, and
        to vary, on the basis of a position of the gazing point in duration for which the user is making the gesture, how the first virtual object is displayed.

(2) The information processing device according to (1), in which
    the display control unit causes the display device to increase an information amount of the first virtual object if the gazing point of the user is present in the first region while the user is making the gesture.

(3) The information processing device according to (2), in which
    the display control unit causes the display device to reduce the information amount of the first virtual object if the gazing point of the user is present in a second region out of the first region while the user is making the gesture.

(4) The information processing device according to (3), in which
    the second region is a region that does not include the first virtual object.

(5) The information processing device according to (4), in which
    the second region is a lateral surface of the target object.

(6) The information processing device according to (5), in which
    the display control unit causes the display device to display the first virtual object in a manner that, before the gesture is made, at least a part of the lateral surface of the target object can be visually recognized.

(7) The information processing device according to any one of (4) to (6), in which
    the second region is a back surface of the target object.

(8) The information processing device according to any one of (4) to (7), in which
    the display control unit causes the display device to continuously reduce the information amount of the first virtual object in response to the gesture if the gazing point of the user is present in the second region while the user is making the gesture.

(9) The information processing device according to (8), in which
    the display control unit causes the display device not to display the first virtual object at a time point when the gesture is finished if the gazing point of the user is maintained in the second region while the user is making the gesture.

(10) The information processing device according to any one of (1) to (9), in which
    the gesture is a hand gesture of turning the target object.

(11) The information processing device according to any one of (1) to (10), in which
    the gesture is a gesture of varying a relative positional relationship between the target object and a head of the user.

(12) The information processing device according to (11), in which
    the gesture is a head gesture of varying a position of the head of the user.

(13) The information processing device according to any one of (1) to (12), in which
    the gesture is a gesture of moving the target object.

(14) The information processing device according to any one of (1) to (13), in which
    the target object is a real object, and
    the display control unit causes the display device to display the first virtual object in a manner that a relative positional relationship between a part of the real object and the first virtual object is fixed.

(15) The information processing device according to any one of (1) to (14), in which
    the target object is a second virtual object, and
    the display control unit causes the display device to display the first virtual object behind the second virtual object as viewed from the user.

(16) The information processing device according to (15), in which
    the display control unit causes the display device
        to display a third virtual object behind the first virtual object as viewed from the user, and
        to increase an information amount of the third virtual object while moving the first virtual object and the second virtual object in a depth direction if the gazing point of the user does not remain on any one of the first virtual object and the second virtual object while the user is making the gesture.

(17) The information processing device according to (15) or (16), in which
    the display control unit causes the display device
        to display a fourth virtual object behind the second virtual object as viewed from the user, and
        to move the fourth virtual object to a position where the first virtual object is located until the gesture is started while moving the first virtual object and the second virtual object in a depth direction if the gazing point of the user does not remain on any one of the first virtual object and the second virtual object while the user is making the gesture.
(18) The information processing device according to any one of (1) to (17), in which
the display control unit controls the display device so that a part of the first virtual object is covered with a hand of the user before the gesture is made.
(19) An information processing method that is performed by a computer system, the information processing method including:
acquiring movement information about a gesture by a user;
acquiring information about a gazing point of the user; and
controlling a display device on the basis of the movement information,
the display device being controlled so that a first virtual object including information relating to a target object is displayed in a first region related to the target object,
the display device being controlled so that how the first virtual object is displayed is varied on the basis of a position of the gazing point in duration for which the user is making the gesture.
(20) A program for causing a computer system to perform the steps of:
acquiring movement information about a gesture by a user;
acquiring information about a gazing point of the user;
controlling a display device on the basis of the movement information;
controlling the display device so that a first virtual object including information relating to a target object is displayed in a first region related to the target object; and
controlling the display device so that how the first virtual object is displayed is varied on the basis of a position of the gazing point in duration for which the user is making the gesture.

REFERENCE SIGNS LIST

P gazing point
1 user
2 target object
3, 3a to 3i virtual object
4, 4b to 4e related virtual object
5 display region
6 non-display region
8 target virtual object
11 display
13 outer camera
14 sensor unit
15 storage unit
20 controller
21 gaze-information acquisition unit
22 movement-information acquisition unit
23 target-object recognition unit
24 movement determination unit
25 display control unit
100, 200 HMD

The invention claimed is:
1. An information processing device, comprising:
a processor configured to:
acquire movement information about a gesture by a user;
acquire information about a gazing point of the user;
control a display device based on the movement information;
cause the display device to display a first virtual object including information relating to a target object in a first region related to the target object, wherein the first region is on the display device;
vary the display of the first virtual object based on a position of the gazing point in duration for which the user makes the gesture;
cause the display device to increase an information amount of the first virtual object based on presence of the gazing point in the first region while the gesture is made by the user, wherein
the increase in the information amount of the first virtual object corresponds to a switch of a texture of the first virtual object from a still image to a moving image, and
the target object is a second virtual object;
cause the display device to display the first virtual object behind the second virtual object as viewable from the user;
cause the display device to display a fourth virtual object behind the second virtual object as viewed from the user; and
move the fourth virtual object to a position where the first virtual object is located until the gesture of the user is started during movement of the first virtual object and the second virtual object in a depth direction if the gazing point of the user does not remain on one of the first virtual object and the second virtual object while the gesture is made by the user.
2. The information processing device according to claim 1, wherein
the processor is further configured to cause the display device to reduce the information amount of the first virtual object based on presence of the gazing point of the user in a second region while the gesture is made by the user, and
the second region is out of the first region.
3. The information processing device according to claim 2, wherein the second region excludes the first virtual object.
4. The information processing device according to claim 3, wherein the second region is a lateral surface of the target object.
5. The information processing device according to claim 4, wherein
the processor is further configured to cause the display device to display the first virtual object in a manner that, before the gesture is made, at least a part of the lateral surface of the target object is visually recognizable.
6. The information processing device according to claim 3, wherein the second region is a back surface of the target object.
7. The information processing device according to claim 3, wherein
the processor is further configured to cause the display device to continuously reduce the information amount of the first virtual object in response to the gesture of the user, and
the information amount of the first virtual object is continuously reduced based on the presence of the gazing point of the user in the second region while the gesture is made by the user.
8. The information processing device according to claim 7, wherein the processor is further configured to cause the display device not to display the first virtual object at a time point based on completion of the gesture while the gazing point of the user is maintained in the second region, and the time point is related to finish of the gesture of the user.

9. The information processing device according to claim 1, wherein the gesture is a hand gesture to turn the target object.

10. The information processing device according to claim 1, wherein a relative positional relationship between the target object and a head of the user is varied based on the gesture.

11. The information processing device according to claim 10, wherein the gesture is a head gesture to vary a position of the head of the user.

12. The information processing device according to claim 1, wherein the target object is moved based on the gesture.

13. The information processing device according to claim 1, wherein
the target object is a real object, and
the processor is further configured to cause the display device to display the first virtual object in a manner that a relative positional relationship between a part of the real object and the first virtual object is fixed.

14. The information processing device according to claim 1, wherein
the processor is further configured to:
cause the display device to display a third virtual object behind the first virtual object as viewable from the user, and
increase an information amount of the third virtual object during movement of the first virtual object and the second virtual object in a depth direction if the gazing point of the user does not remain on one of the first virtual object and the second virtual object while the gesture is made by the user.

15. The information processing device according to claim 1, wherein the processor is further configured to control the display device so that a part of the first virtual object is covered with a hand of the user before the gesture is made.

16. An information processing method, comprising:
acquiring movement information about a gesture by a user;
acquiring information about a gazing point of the user;
controlling a display device based on the movement information;
controlling the display device to display a first virtual object including information relating to a target object is displayed in a first region related to the target object, wherein the first region is on the display device;
varying the display of the first virtual object based on a position of the gazing point in duration for which the user is making the gesture; and
causing the display device to increase an information amount of the first virtual object based on presence of the gazing point in the first region while the gesture is made by the user, wherein
the increase in the information amount of the first virtual object corresponds to a switch of a texture of the first virtual object from a still image to a moving image, and
the target object is a second virtual object;
causing the display device to display the first virtual object behind the second virtual object as viewable from the user;
causing the display device to display a fourth virtual object behind the second virtual object as viewed from the user; and
moving the fourth virtual object to a position where the first virtual object is located until the gesture of the user is started during movement of the first virtual object and the second virtual object in a depth direction if the gazing point of the user does not remain on one of the first virtual object and the second virtual object while the gesture is made by the user.

17. A non-transitory computer-readable medium having stored thereon computer-executable instructions that, when executed by a processor, cause the processor to execute operations, the operations comprising:
acquiring movement information about a gesture by a user;
acquiring information about a gazing point of the user;
controlling a display device based on the movement information;
causing the display device to display a first virtual object including information relating to a target object is displayed in a first region related to the target object, wherein the first region is on the display device;
varying the display of the first virtual object based on a position of the gazing point in duration for which the user is making the gesture; and
causing the display device to increase an information amount of the first virtual object based on presence of the gazing point in the first region while the gesture is made by the user, wherein
the increase in the information amount of the first virtual object corresponds to a switch of a texture of the first virtual object from a still image to a moving image, and
the target object is a second virtual object;
causing the display device to display the first virtual object behind the second virtual object as viewable from the user;
causing the display device to display a fourth virtual object behind the second virtual object as viewed from the user; and
moving the fourth virtual object to a position where the first virtual object is located until the gesture of the user is started during movement of the first virtual object and the second virtual object in a depth direction if the gazing point of the user does not remain on one of the first virtual object and the second virtual object while the gesture is made by the user.

18. An information processing device, comprising:
a processor configured to:
acquire movement information about a gesture by a user;
acquire information about a gazing point of the user;
control a display device based on the movement information;
cause the display device to display a first virtual object including information relating to a target object in a first region related to the target object, wherein the first region is on the display device;
vary the display of the first virtual object based on a position of the gazing point in duration for which the user makes the gesture;
cause the display device to increase an information amount of the first virtual object based on presence of the gazing point in the first region while the gesture is made by the user, wherein the information amount of the first virtual object corresponds to a resolution of the first virtual object, and the target object is a second virtual object; and cause the display device to display the first virtual object behind the second virtual object as viewable from the user;

cause the display device to display a third virtual object behind the first virtual object as viewable from the user; and increase an information amount of the third virtual object during movement of the first virtual object and the second virtual object in a depth direction if the gazing point of the user does not remain on one of the first virtual object and the second virtual object while the gesture is made by the user.

* * * * *